(12) United States Patent　　(10) Patent No.: US 8,061,384 B2
Isono　　(45) Date of Patent: Nov. 22, 2011

(54) PRESSURE CONTROL DEVICE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 927 days.

(21) Appl. No.: 12/063,061

(22) PCT Filed: Jul. 20, 2007

(86) PCT No.: PCT/JP2007/064367
§ 371 (c)(1),
(2), (4) Date: Feb. 6, 2008

(87) PCT Pub. No.: WO2008/010579
PCT Pub. Date: Jan. 24, 2008

(65) Prior Publication Data
US 2010/0154899 A1　　Jun. 24, 2010

(30) Foreign Application Priority Data
Jul. 20, 2006　　(JP) .................................. 2006-198717

(51) Int. Cl.
*F16K 11/10*　　(2006.01)
(52) U.S. Cl. ................................. 137/596.18; 137/81.1
(58) Field of Classification Search .................. 137/78.5, 137/81.1, 596.17, 596.18; 251/14, 129.03
See application file for complete search history.

(56) References Cited

U.S. PATENT DOCUMENTS

| | | | |
|---|---|---|---|
| 4,305,566 A | 12/1981 | Grawunde | |
| 4,557,527 A * | 12/1985 | Stumpe | 303/15 |
| 5,309,944 A | 5/1994 | Chikamatsu et al. | |
| 2005/0217740 A1 | 10/2005 | Segi et al. | |

FOREIGN PATENT DOCUMENTS

| | | |
|---|---|---|
| EP | 1 582 791 A1 | 10/2005 |
| JP | 63-157579 | 10/1988 |
| JP | 1-99754 | 4/1989 |
| JP | 4 83981 | 3/1992 |
| JP | 4 124387 | 4/1992 |

(Continued)

OTHER PUBLICATIONS

Office Action issued Nov. 9, 2010, in Japan Patent Application No. 2007-190212 (with English-language Translation).

(Continued)

*Primary Examiner* — Craig Schneider
(74) *Attorney, Agent, or Firm* — Oblon, Spivak, McClelland, Maier & Neustadt, L.L.P.

(57) ABSTRACT

In a pressure controller, a drive piston and pressure control valve are freely movably supported in a housing, the drive piston is supported by being energized and the pressure control valve is supported by being energized to make a pressure chamber and a decompression chamber communicatively connectible, the drive piston and the pressure control valve are moved by an electromagnetic force of a solenoid via a ring piston to make a hyperbaric chamber and the pressure chamber communicatively connectible and also an external piston is freely movably provided facing the drive piston and by making a control pressure acting on the external piston from a rear pressure chamber on a drive piston side equal to or greater than an external pressure acting from outside from an input unit, pressure control can properly be performed by readily moving a drive valve by pressure from outside when a power supply is defective.

7 Claims, 16 Drawing Sheets

FOREIGN PATENT DOCUMENTS

| | | |
|---|---|---|
| JP | 5-324092 | 12/1993 |
| JP | 11-50918 | 2/1999 |
| JP | 2000 120909 | 4/2000 |
| JP | 3110861 | 11/2000 |
| JP | 2004 60806 | 2/2004 |

OTHER PUBLICATIONS

Extended Search Report issued Nov. 23, 2010 in Europe Application No. 07791104.8.

* cited by examiner

PRESSURE CONTROL DEVICE

TECHNICAL FIELD

The present invention relates to a pressure controller for controlling a differential pressure by moving a poppet valve or a spool valve by means of an electromagnetic force to block/open a channel.

BACKGROUND ART

A poppet type or spool type electromagnetic valve is known as a general pressure controller and the electromagnetic valve blocks (or opens) the channel by energizing a valve element with energizing force of a spring in one direction and opens (or blocks) the channel by moving the valve element with energization of a solenoid in another direction against energizing force of the spring. Since such an electromagnetic valve cannot control pressure by moving a valve element when a power supply feeding a current value to a solenoid is defective, the electromagnetic valve has a so-called fail-safe function.

Electromagnetic valves having the fail-safe function include those described in Patent Documents 1 and 2 listed below.

An electromagnetic proportional decompression valve described in Patent Document 1 is provided with a spool for causing a control pressure port to generate a pressure in accordance with communicative connection between a supply port and a tank port and also provided with a first solenoid plunger for pressing against an end face of the spool and a second solenoid plunger for pressing against an end face of the first solenoid and, when a current is shut off, the fail-safe function under abnormal conditions is fulfilled by retaining the first solenoid plunger at a predetermined position by being pressed by the second solenoid plunger with energizing force of a spring to maintain a predetermined control pressure even when a solenoid exciting current is shut off.

Also, an electromagnetic valve described in Patent Document 2 can operate a spool with energizing force of a compression spring to communicate an input port and an output port and also makes a drain port and the output port communicable by operating the spool against energizing force of the compression spring with electromagnetic force and, when the spool does not operate due to a coil defect, the output port is made controllable to open/close even when a defect appears by supplying a predetermined oil pressure to an oil pressure supply mechanism to move the spool against energizing force of the compression spring to change the valve opening state of the output port.

Patent Document 1: Japanese Patent No. 3110861
Patent Document 2: Japanese Patent Application Laid-Open No. 2004-060806

DISCLOSURE OF THE INVENTION

Problem to be Solved by the Invention

However, the aforementioned conventional electromagnetic proportional decompression valve described in Patent Document 1 requires two solenoids and plungers for fail-safe operation, increasing manufacturing costs. When the power supply is under normal operating conditions, there is also a problem that power consumption increases greatly out of necessity to retain the plunger of the second solenoid at a position where the plunger does not come into contact with that of the first solenoid against energizing force of the spring by always energizing the second solenoid. Further, when a current is shut off, the plunger of the first solenoid is retained at a predetermined position only by energizing force of the spring and at this time, pressure control cannot be performed. Also, the electromagnetic valve described in Patent Document 2 has a problem that an oil pressure supply mechanism for operating the spool is separately needed when the valve is defective, increasing manufacturing costs.

The present invention is intended for solving the above problems and an object thereof is to provide a pressure controller enabling appropriate pressure control by readily moving a drive valve by means of an external pressure even when the power supply is defective.

Means for Solving Problem

To solve the problems as described above and to achieve an object, a pressure controller according to the present invention includes a housing in a hollow shape having a first port and a second port, a drive valve freely movably supported in the housing, an energizing unit communicatively connecting or blocking the first port and the second port by energizing the drive valve in a direction in which the drive valve is caused to approach a valve seat or separate from the valve seat, a solenoid controlling a differential pressure by communicatively connecting or blocking the first port and the second port with a movement of the drive valve by means of an electromagnetic force against an energizing force of the energizing unit, an external piston capable of pressing the drive valve against the energizing force of the energizing unit from outside the housing, and a pressure control unit performing pressure control so that a control pressure acting on the external piston from a side of the drive valve is equal to or greater than an external pressure acting from outside.

In the pressure controller according to the present invention, the pressure control unit performs pressure control so that the control pressure acting on the external piston from the side of the drive valve is equivalent to a pressure equal to or greater than the external pressure acting on the external piston from outside.

In the pressure controller according to the present invention, the drive valve has a first piston in an annular shape freely movable along an inner surface of the housing and movable by the solenoid and a second piston freely movable relative to the first piston along the inner surface of the first piston, and a redoubling unit that redoubles a driving force of the drive valve is provided between the first piston and the second piston.

The pressure controller according to the present invention, further includes a front pressure chamber and a rear pressure chamber provided in front and in rear of the direction of movement of the second piston, wherein the front pressure chamber and the rear pressure chamber are communicatively connected by a communicating path formed inside the first piston, and a control pressure acts on the rear pressure chamber.

In the pressure controller according to the present invention, the drive valve has a first piston and a second piston freely movably supported relatively to each other in a serially disposed state in the housing, the first piston is movable by the solenoid, the second piston serves also as the external piston, and the control pressure and the external pressure are exerted on the second piston by the pressure control unit.

In the pressure controller according to the present invention, the drive valve has a first piston and a second piston freely movably supported relatively to each other in a serially disposed state in the housing, the first piston is movable by the solenoid, the external piston is provided freely movably and the second piston pressably on an outer circumference of the second piston, and the control pressure and the external pressure are exerted on the external piston by the pressure control unit.

In the pressure controller according to the present invention, the external piston is serially and relatively freely movably supported on one side of the direction of movement of the drive valve and the control pressure and the external pressure are exerted on the external piston by the pressure control unit, and the drive valve is movable by the solenoid disposed on another side of the direction of movement of the drive valve.

In the pressure controller according to the present invention, a hyperbaric port and a decompression port are provided as the first port and a control pressure port is provided as the second port, a pressure control valve positioned in front of the direction of movement of at least one of the drive valve and the first piston in the housing is freely movably supported by being energized in the direction blocking the hyperbaric port and the control pressure port, and at least one of the drive valve and the first piston is moved by an electromagnetic force of the solenoid to press against the pressure control valve to block the decompression port and the control pressure port and to make the hyperbaric port and the control pressure port communicatively connectible, at least one of the drive valve and the first piston is moved by a reduced electromagnetic force of the solenoid to reduce a pressing force of the pressure control valve to communicatively connect the decompression port and the control pressure port and to make the hyperbaric port and the control pressure port blockable, and at least one of the drive valve and the first piston is moved by the external piston to press against the pressure control valve to block the decompression port and the control pressure port and to make the hyperbaric port and the control pressure port communicatively connectible.

In the pressure controller according to the present invention, a hyperbaric port and a decompression port are provided as the first port and a control pressure port is provided as the second port, at least one of the drive valve and the first piston is supported by being energized in the direction blocking the hyperbaric port and the control pressure port, and at least one of the drive valve and the first piston is moved by an electromagnetic force of the solenoid to block the decompression port and the control pressure port and to make the hyperbaric port and the control pressure port communicatively connectible, a driving force of at least one of the drive valve and the first piston is reduced by a reduced electromagnetic force of the solenoid to communicatively connect the decompression port and the control pressure port and to make the hyperbaric port and the control pressure port blockable, and at least one of the drive valve and the first piston is moved by the external piston to block the decompression port and the control pressure port and to make the hyperbaric port and the control pressure port communicatively connectible.

In the pressure controller according to the present invention, the drive valve and the external piston are relatively freely movably supported coaxially in the housing, the solenoid is provided on the side of the drive valve in the housing, and an external pressure port on which an external pressure of the pressure control unit acts is provided on a side of the external piston in the housing.

In the pressure controller according to the present invention, the drive valve has a first piston and a second piston serially and relatively freely movably supported in the housing, the first piston is movable in one direction by the solenoid and the second piston is movable in one direction by the first piston, and the external piston is movable in another direction by the external pressure, and the second piston is movable in the other direction by the external piston.

In the pressure controller according to the present invention, a hyperbaric port and a decompression port are provided as the first port and a control pressure port is provided as the second port, a pressure control valve positioned in front of the direction of movement of the drive valve in the housing is relatively freely movably supported in the external piston by being energized in the direction blocking the hyperbaric port and the control pressure port, and the drive valve is moved by an electromagnetic force of the solenoid to press against the pressure control valve to block the decompression port and the control pressure port and to make the hyperbaric port and the control pressure port communicatively connectible, the drive valve is moved by a reduced electromagnetic force of the solenoid to reduce a pressing force of the pressure control valve to communicatively connect the decompression port and the control pressure port and to make the hyperbaric port and the control pressure port blockable, and the drive valve is moved by the external piston to press against the pressure control valve to block the decompression port and the control pressure port and to make the hyperbaric port and the control pressure port communicatively connectible.

In the pressure controller according to the present invention, the external piston is freely movably provided on an outer circumference of the drive valve, the drive valve is movable in one direction by the solenoid, and the external piston is movable in another direction by the external pressure.

In the pressure controller according to the present invention, a hyperbaric port and a decompression port are provided as the first port and a control pressure port is provided as the second port, the drive valve is supported by being energized in the direction blocking the hyperbaric port and the control pressure port, and the drive valve is moved by an electromagnetic force of the solenoid to block the decompression port and the control pressure port and to make the hyperbaric port and the control pressure port communicatively connectible, a driving force of the drive valve is reduced by a reduced electromagnetic force of the solenoid to communicatively connect the decompression port and the control pressure port and to make the hyperbaric port and the control pressure port blockable, and the external piston is moved by the external pressure to block the decompression port and the control pressure port and to make the hyperbaric port and the control pressure port communicatively connectible.

The pressure controller according to the present invention, further includes a positioning mechanism that adjusts an initial relative position of the drive valve and the external piston.

Further, a pressure controller according to the present invention includes a housing in a hollow shape having a first port and a second port, a first drive valve freely movably supported in the housing, a second drive valve freely movably supported in the housing and freely movable relative to the first drive valve, an energizing unit communicatively connecting and blocking the first port and the second port by energizing the first drive valve in one direction, a first drive unit controlling a differential pressure by communicatively connecting or blocking the first port and the second port after moving the first drive valve by means of an adjustable first external pressure against energizing force of the energizing unit, a second drive unit controlling the differential pressure by communicatively connecting and blocking the first port and the second port after moving the second drive valve by means of a second external pressure, and a pressure control unit performing pressure control so that a control pressure acting on the second drive valve from a side of the first drive valve is equal to or greater than the second external pressure.

In the pressure controller according to the present invention, the first drive valve and the second drive valve are serially and relatively freely movably supported and energized by the energizing unit in a direction to bring the first drive valve and the second drive valve closer, and the first external pressure by the first drive unit acts on a first external pressure chamber provided between the first drive valve and the second drive valve.

The pressure controller according to the present invention includes a volume absorption mechanism that changes a volume of the first external pressure chamber in accordance with the first external pressure acting on the first external pressure chamber.

In the pressure controller according to the present invention, the first drive valve and the second drive valve are relatively freely movably supported coaxially in the housing, a first external pressure port on which the first external pressure acts is provided on a side of the first drive valve in the housing, and a second external pressure port on which the second external pressure acts is provided on a side of the second drive valve in the housing.

EFFECT OF THE INVENTION

According to a pressure controller of the present invention, in a housing in a hollow shape having a first port and a second port, a drive valve is freely movably supported and the drive valve is energized by an energizing unit in a direction to cause the drive valve to approach a valve seat or separate from the valve seat to make the first port and the second port communicatively connectible or blockable, and the drive valve is moved by means of an electromagnetic force of a solenoid against energizing force of the energizing unit to communicatively connect or block the first port and the second port to be configured so as to make a differential pressure controllable, an external piston that can press the drive valve against energizing force of the energizing unit from outside the housing is provided, and a pressure control unit performing pressure control so that a control pressure acting on the external piston from the drive valve side is equal to or greater than an external pressure acting from outside is provided and therefore, when the power supply is working normally, a differential pressure can be controlled by communicatively connecting or blocking the first port and the second port through movement of the drive valve by means of an electromagnetic force of the solenoid, when the power supply is defective, a differential pressure can be controlled by communicatively connecting or blocking the first port and the second port through movement of the drive valve by means of the external piston and thus, pressure control can properly be performed without using a switching mechanism separately and with the control pressure on the external piston controlled by the pressure control unit to be equal to or greater than the external pressure, reliability can be improved without the drive valve being adversely affected by the external pressure when the power supply is working normally.

Also, according to a pressure controller of the present invention, in a housing in a hollow shape having a first port and a second port, a first drive valve and a second drive valve are relatively freely movably supported, the first drive valve is energized in one direction by an energizing unit to make the first port and the second port communicatively connectible or blockable, and the first drive valve is moved by means of an adjustable first external pressure of a first drive unit against energizing force of the energizing unit to communicatively connect or block the first port and the second port to make a differential pressure controllable, and also the second drive valve is moved by means of a second external pressure of a second drive unit to communicatively connect or block the first port and the second port to be configured so as to make a differential pressure controllable and pressure control is performed so that a control pressure acting on the second drive valve by means of a pressure control unit from a first drive valve side is equal to or greater than a second external pressure and therefore, when the first drive unit is working normally, a differential pressure can be controlled by communicatively connecting or blocking the first port and the second port through movement of the first drive valve by means of the first external pressure, when the first drive unit is defective, a differential pressure can be controlled by communicatively connecting or blocking the first port and the second port through movement of the second drive valve by means of the second external pressure of the second drive unit and thus, pressure control can properly be performed without using a switching mechanism separately and with the control pressure on the second drive valve controlled by the pressure control unit to be equal to or greater than the second external pressure, reliability can be improved without the first drive valve being adversely affected by the second external pressure when the first drive unit is working normally.

Figure 1:
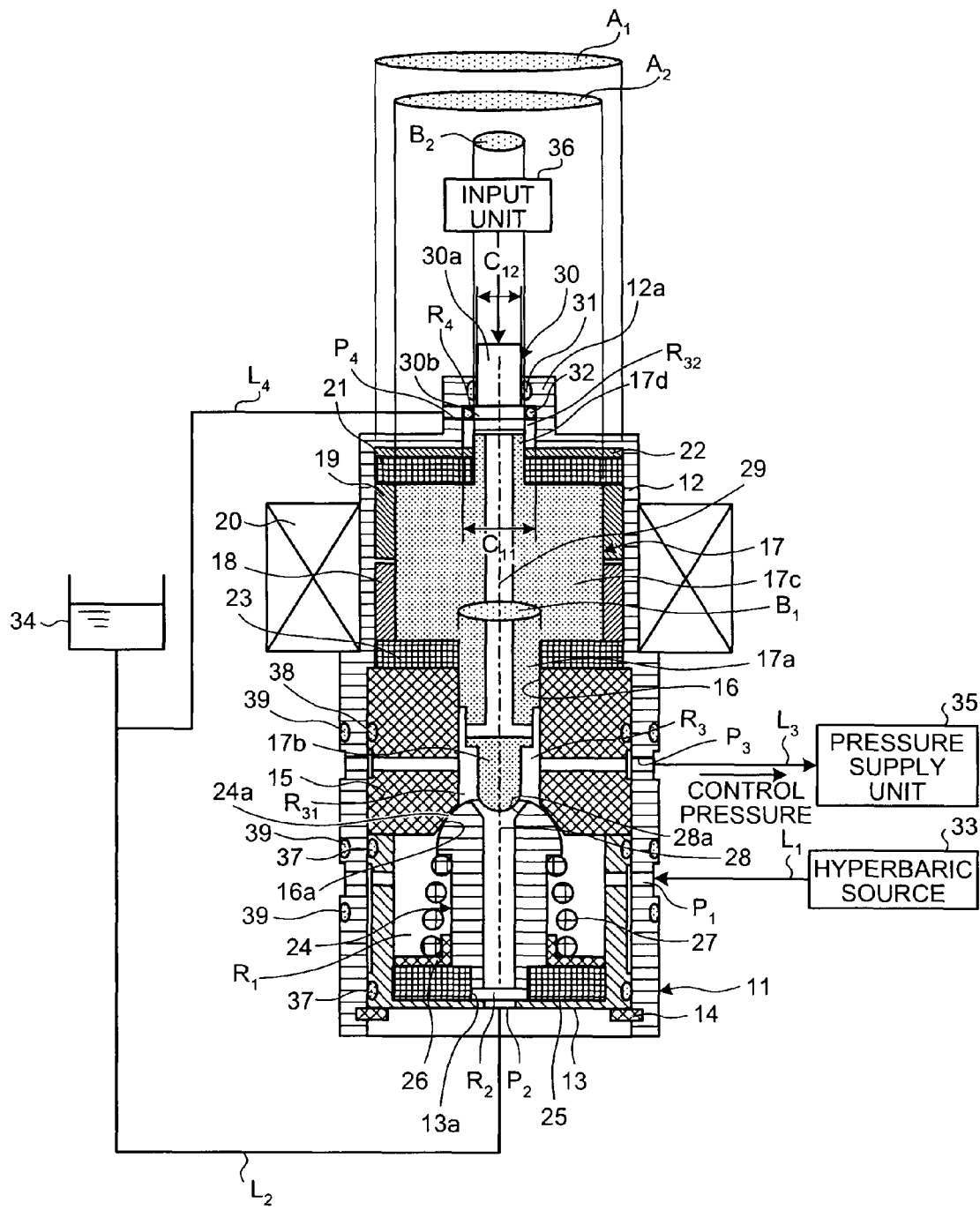
FIG. 1 is a schematic block diagram showing a pressure controller according to a first embodiment of the present invention.

EXPLANATIONS OF LETTERS OR NUMBERS 11, 111, 211, 311, 411, 511, 611, 711, 811, 911, 1011 Housing
15, 114, 214, 312, 412, 413 Support block
17, 117, 223, 316, 416, 515, 614 Drive piston (drive valve)
18 Permanent magnet
19 Ring piston (drive valve, solenoid)
20, 120, 228, 320, 420, 520, 623 Coil (solenoid)
21 Reaction disk (redoubling unit)
23 Reaction disk (energizing unit)
24, 124, 219, 522, 716, 917 Pressure control valve
30, 226, 318, 418, 521, 613 External piston
33, 130, 229, 322, 422, 524, 630 Hyperbaric source
34, 131, 230, 323, 423, 525, 631, 722, 826, 921, 1026 Reservoir tank
35, 132, 231, 324, 424, 526, 632 Pressure supply part
36, 134, 233, 326, 426, 527, 633 Input part (pressure control unit)
122, 225, 317, 417, 517, 523, 618, 619, 715, 718, 817, 818, 915, 918, 1015, 1016 Return spring (energizing unit)
119, 227, 319 Pressing piston (drive valve)
220 Hyperbaric valve
221 Decompression valve
516 Intermediate piston (drive valve)
551, 616 Positioning mechanism
713, 815, 913, 1013 First drive piston (first drive valve)
714, 914 Intermediate piston
719, 816, 851, 916, 1014 Second drive piston (second drive valve)
720, 824, 919, 1024 Oil pressure pump (hyperbaric source, first drive unit)
721, 825, 920, 1025 Accumulator (hyperbaric source, first drive unit)
723, 827, 922, 1027 Brake master cylinder (second drive unit)
724, 725, 829, 830, 923, 924, 1028, 1029 Electromagnetic valve
751, 852 Volume absorption piston (volume absorption mechanism)
$R_1$ Hyperbaric chamber
$R_2$ Decompression chamber
$R_3$ Pressure chamber
$R_{31}$ Front pressure chamber
$R_{32}$ Rear pressure chamber
$R_4$, $R_{41}$, $R_{43}$ Pressure regulated chamber
$R_5$ External pressure chamber
$P_1$ Hyperbaric port
$P_2$ Decompression port
$P_3$ Control pressure port
$P_4$ Pressure regulating port
$P_5$ External pressure port

BEST MODES FOR CARRYING OUT THE INVENTION

Embodiments of a pressure controller according to the present invention will be described below based on drawings. However, the present invention is not limited by these embodiments.

First Embodiment

FIG. 1 is a schematic block diagram showing a pressure controller according to a first embodiment of the present invention.

In a poppet type three-way valve as a pressure controller in the first embodiment, as shown in FIG. 1, a housing 11 having a hollow cylindrical shape includes an upper housing 12 whose longitudinal section has an open-side square shape and a lower housing 13 and the upper housing 12 and the lower housing 13 are integrally fixed by the lower housing 13 being fitted into the upper housing 12 before being locked by a ring-shaped locking member 14 and the inside thereof is in a sealed state.

Inside the housing 11, a support block 15 is fixed at an intermediate part in a vertical direction thereof and a bearing hole 16 cut through in the vertical direction is formed in a central part of the support block 15 and also a valve seat 16a widening downward is formed in a lower part of the bearing hole 16. Then, a drive piston (second piston) 17 is freely movably fitted into the bearing hole 16 of the support block 15.

The drive piston 17 includes a first supporter 17a in a cylindrical shape, a valve portion 17b in a spherical shape formed at a tip part (lower end in FIG. 1) of the first supporter 17a, a flange 17c formed in a posterior part (upper part in FIG. 1) of the first supporter 17a, and a second supporter 17d in a cylindrical shape formed at a rear end part (upper end in FIG. 1). Then, the first supporter 17a is freely movably fitted into the bearing hole 16.

Also, a permanent magnet 18 in a cylindrical shape positioned above the support block 15 is fixed to an inner wall surface of the upper housing 12 and also a ring piston (first piston) 19 in a cylindrical shape made of iron and positioned above the permanent magnet 18 is freely movably supported along the vertical direction and the flange 17c of the drive piston 17 is relatively freely movable with respect to the inner circumferential surface of the permanent magnet 18 and the ring piston 19. Then, a coil 20 is wound outside the upper housing 12 facing the ring piston 19 and, by passing a current to the coil 20, an electromagnetic force is provided to the ring piston 19 and the ring piston 19 can move upward by repulsion between the ring piston 19 and the permanent magnet 18.

In the present embodiment, a drive valve of the present invention includes the drive piston 17 and the ring piston 19 and a solenoid of the present invention includes the ring piston 19 and the coil 20.

A disc-shaped reaction disc 21 and a disc-shaped guide plate 22 are arranged at an upper end of the upper housing 12 and also a reaction disc 23 is arranged between the support block 15 and the flange 17c of the drive piston 17 and permanent magnet 18. The reaction disc 21 functions as a redoubling unit of the drive valve including the drive piston 17 and the ring piston 19 and is formed of a rubber member as an elastic member. The guide plate 22 comes into contact with the reaction disc 21 to prevent deformation thereof. Then, the second supporter 17d of the drive piston 17 cuts through central parts of the reaction disc 21 and the guide plate 22 and the flange 17c and a top surface of the ring piston 19 are in contact. The reaction disc 23, on the other hand, provides restoring force (energizing force) to restore the drive piston 17 to an initial position, that is, a position shown in FIG. 1 and functions as an energizing unit and is formed of a rubber member as an elastic member.

Therefore, the drive piston 17 is restricted to a position where the flange 17c is in contact with the reaction disk 21 due to energizing force of the reaction disc 23 and when the ring piston 19 moves upward to press against the reaction disc 21, the pressing force is redoubled by the reaction disk 23 before being transmitted to the drive piston 17 and the drive piston 17 can move downward against energizing force of the reaction disc 23. Then, when driving force is no longer transmitted to the drive piston 17 from the ring piston 19 via the reaction disc 21, the drive piston 17 can return to the initial position by moving upward with energizing force of the reaction disc 23.

That is, with upward movement inside the housing 11 and movement outward and inward in the diameter direction being restricted, the reaction disc 21 is allowed to move only in the contact direction (downward in FIG. 1) of the drive piston 17 and the ring piston 19. If an area corresponding to the outside diameter of the reaction disc 21 is defined as $A_1$ and that corresponding to the outside diameter of the flange 17c of the drive piston 17 is defined as $A_2$, the outside diameter of the reaction disc 21 and that of the flange 17c are designed so that the relationship $A_1-A_2<A_2$ holds, that is, the contact area of the drive piston 17 and the reaction disc 21 becomes larger than that of the ring piston 19 and the reaction disc 21.

Thus, the reaction disc 21 is provided between the drive piston 17 and the ring piston 19 and the area where the reaction disc 21 presses against the drive piston 17 with its elastic force becomes larger than that where the reaction disc 21 is pressed against the ring piston 19 and consequently, the pressing load pressed against the drive piston 17 by the reaction disc 21 is redoubled so that the drive piston 17 can obtain a large driving force from a small load moving the ring piston 19.

A pressure control valve 24 is disposed in the central part of the lower housing 13 and the pressure control valve 24 has a valve portion 24a in a spherical umbrella shape formed at a tip part (upper end in FIG. 1). A ring-shaped rubber reaction disc 25 is mounted at a lower end of the lower housing 13 and a disc-shaped spring support 26 is mounted on the reaction disc 25 with a return spring 27 set between the pressure control valve 24 and the spring support 26. In this case, the spring support 26 functions as a support unit for freely movably supporting the pressure control valve 24 along the vertical direction and the reaction disc 25 functions as an energizing unit for energizing the pressure control valve 24 upward, and the pressure control valve 24 is freely movable along the vertical direction and also supported by being energized in a direction in which the valve portion 24a is seated in the valve seat 16a of the support block 15.

That is, the spring support 26 is positioned by the lower housing 13 and the pressure control valve 24 is supported by the positioned spring support 26. Thus, movement of the pressure control valve 24 is made smooth by the spring support 26 so that propulsion properties can be promoted. The pressure control valve 24 is also supported by being energized by elastic force of the reaction disc 25 and energizing force of the return spring 27 in a direction in which the valve portion 24a is seated in the valve seat 16a of the support block 15. Further, a sealing nature is ensured by the reaction disc 25 set between the lower housing 13 and the pressure control valve 24.

In the central part of the pressure control valve 24, a through hole 28 cut through in the vertical direction is formed and also a valve seat 28a widening upward is formed in an upper part of the through hole 28. Moreover, the valve portion 17b in the drive piston 17 is seatable in the valve seat 28a of the pressure control valve 24. Further, the lower housing 13 has a through hole 13a formed for communicative connection with the through hole 28.

Since, in a pressure controller in the present embodiment, the drive piston 17 and the pressure control valve 24 are freely movably supported inside the housing 11, as described above, a hyperbaric chamber $R_1$ demarcated by the lower housing 13, support block 15, and pressure control valve 24, a decompression chamber $R_2$ demarcated by the lower housing 13 and through hole 28 of the pressure control valve 24, and a pressure chamber $R_3$ demarcated by the upper housing 12, support block 15, drive piston 17, and pressure control valve 24 are provided.

Then, the pressure chamber $R_3$ includes a front pressure chamber $R_{31}$ and a rear pressure chamber $R_{32}$ provided back and forth along the movement direction of the drive piston 17, and the front pressure chamber $R_{31}$ and the rear pressure chamber $R_{32}$ are communicatively connected by a communicating hole 29 formed inside the drive piston 17. In this case, if a pressure receiving area on the advancing side of the drive piston 17 is defined as $B_1$ and that on the receding side of the drive piston 17 is defined as $B_2$, the outside diameters of each of the supporter 17a and supporter 17d of the drive piston 17 are determined so that relationship $B_1-B_2<B_2$ holds, that is, the pressure receiving area $B_2$ from the rear pressure chamber $R_{32}$ in the drive piston 17 becomes smaller than the pressure receiving area $B_1$ from the front pressure chamber $R_{31}$.

Also, a protruding part 12a protruding upward is formed at an upper end of the upper housing 12, and an external piston 30 is serially connected to the protruding part 12a concentrically with the drive piston 17 and freely movably supported along the same movement direction. The external piston 30 has a pressing part 30a that protrudes upward from the upper housing 12 and can be pressed from outside and a disc-shaped stopper 30b and is freely movably supported by the protruding part 12a via sealing members 31 and 32. Then, the external piston 30 is positioned opposite to the second supporter 17d of the drive piston 17 via the rear pressure chamber $R_{32}$ and the stopper 30b of the external piston 30 functions as a pressure receiving part. In this case, a seal diameter $C_{11}$ of the drive piston 17 for the rear pressure chamber $R_{32}$ is set to be larger than a seal diameter $C_{12}$ of the external piston 30 in the upper housing 12.

Then, a hyperbaric port $P_1$ communicatively connected to the hyperbaric chamber $R_1$ is formed by cutting through the upper housing 12 and lower housing 13, and also a decompression port $P_2$ communicatively connected to the decompression chamber $R_2$ is formed by cutting through the lower housing 13. Also, a control pressure port $P_3$ communicatively connected to the pressure chamber $R_3$ (front pressure chamber $R_{31}$) is formed by cutting through the upper housing 12 and the support block 15. In this case, the hyperbaric port $P_1$ and the decompression port $P_2$ function as the first port of the present invention and the control pressure port $P_3$ functions as the second port of the present invention. The hyperbaric port $P_1$ is connected to a hyperbaric source 33 via a hyperbaric line $L_1$, the decompression port $P_2$ is connected to a reservoir tank 34 via a decompression line $L_2$, and the control pressure port $P_3$ is connected to a pressure supply unit 35 via a control line $L_3$.

In addition, the front pressure chamber $R_{31}$ in the pressure chamber $R_3$ is communicatively connected to the rear pressure chamber $R_{32}$ via the communicating hole 29 and the external piston 30 receives pressure from the rear pressure chamber $R_{32}$ and therefore, a control pressure supplied to the pressure supply unit 35 from the control pressure port $P_3$ via the control line $L_3$ will act on the external piston 30 via the front pressure chamber $R_{31}$, communicating hole 29, and rear pressure chamber $R_{32}$. On the other hand, an external pressure can be introduced to the external piston 30 from outside by an input unit (pressure control unit) 36 and in the present embodiment, the external pressure is set to the aforementioned control pressure. Moreover, a pressure regulated chamber $R_4$ is demarcated between the sealing members 31 and 32 in the protruding part 12a of the upper housing 12, a pressure regulating port $P_4$ communicatively connected to the pressure regulated chamber $R_4$ is formed, and the pressure regulating port $P_4$ is connected to the reservoir tank 34 via a pressure regulating line $L_4$. Therefore, in the present embodiment, while a control pressure acts on the external piston 30 from the rear pressure chamber $R_{32}$ on the drive piston 17 side, an external pressure equal to the control pressure acts from the input unit 36 and the seal diameter $C_{11}$ of the drive piston 17 for the rear pressure chamber $R_{32}$ is set to be larger than the seal diameter $C_{12}$ of the external piston 30 in the upper housing 12 and therefore, the control pressure acting on the external piston 30 from the rear pressure chamber $R_{32}$ on the drive piston 17 side is greater than the external pressure acting from the input unit 36.

Therefore, when the coil 20 is not energized, the drive piston 17 is positioned by energizing force of the reaction disc 23 in such a way that the flange 17c is in contact with the reaction disc 21, and the pressure control valve 24 is positioned by energizing force of the reaction disc 25 and return spring 27 in such a way that the valve portion 24a is seated in the valve seat 16a of the support block 15 with the valve portion 17b of the drive piston 17 being separated from the valve seat 28a of the pressure control valve 24 to open the passage.

Then, when the coil 20 is energized, an electromagnetic force is provided to the ring piston 19, the ring piston 19 moves upward due to repulsion from the permanent magnet 18 to press against the reaction disc 21, the pressing pressure is transmitted to the drive piston 17 after being redoubled, and the drive piston 17 moves downward against energizing force of the reaction disc 23. Then, the valve portion 17b of the drive piston 17 is seated in the valve seat 28a of the pressure control valve 24 to block the passage and also the pressure control valve 24 is moved against energizing force of the reaction disc 25 and return spring 27 and the valve portion 24a in the pressure control valve 24 is separated from the valve seat 16a of the support block 15 so that the passage can be opened.

If the external piston 30 is pressed while the coil 20 is not energized, the pressing force is directly transmitted to the drive piston 17 and the drive piston 17 moves downward against energizing force of the reaction disc 23. Then, like the foregoing, the valve portion 17b of the drive piston 17 is seated in the valve seat 28a of the pressure control valve 24 to block the passage and also the valve portion 24a in the pressure control valve 24 is separated from the valve seat 16a of the support block 15 so that the passage can be opened.

With a seal member 37 set between the upper housing 12 and lower housing 13, a seal member 38 set between the upper housing 12 and support block 15, the reaction disc 23 as a seal member set between the support block 15 and drive piston 17, the reaction disc 25 as a seal member set between the lower housing 13 and pressure control valve 24, and the reaction disc 21 as a seal member set among the upper housing 12, support block 15, and drive piston 17, the sealing nature is ensured. Moreover, the housing 11 is supported by a casing (not shown) and a seal member 39 is set between the upper housing 12 and the casing to ensure the sealing nature.

Here, pressure control by the aforementioned pressure controller in the present embodiment will be described in detail.

In a pressure controller in the present embodiment, when the coil 20 is demagnetized, the drive piston 17 is positioned by the reaction disc 23 in such a way that the flange 17c is in contact with the reaction disc 21 and the pressure control valve 24, on the other hand, is positioned by the reaction disc 25 and return spring 27 in such a way that the valve portion 24a is seated in the valve seat 16a of the support block 15 with the valve portion 17b of the drive piston 17 being separated from the valve seat 28a. Therefore, the hyperbaric chamber $R_1$ and the pressure chamber $R_3$ are blocked and the pressure chamber $R_3$ and the decompression chamber $R_2$ are communicatively connected.

If the coil 20 is energized in this state, the ring piston 19 moves upward due to repulsion from the permanent magnet 18 to press against the reaction disc 21, the pressing pressure is transmitted to the drive piston 17, and the drive piston 17 moves downward against energizing force of the reaction disc 23. At this time, the reaction disc 21 is allowed to move only in the contact direction of the drive piston 17 and the ring piston 19 and a contact area between the drive piston 17 and the reaction disc 21 is set to be larger than that between the ring piston 19 and the reaction disc 21. Thus, the area where the drive piston 17 is pressed by elastic force of the reaction disc 21 becomes larger than that where the ring piston 19 is pressed by the reaction disc 21 and consequently driving force for moving the drive piston 17 is redoubled so that a large driving force is obtained.

Also, since the control pressure acting on the external piston 30 from the rear pressure chamber $R_{32}$ on the drive piston 17 side is greater than an external pressure acting from outside by the input unit 36, the drive piston 17 can properly be moved downward without a driving force for moving the drive piston 17 downward being adversely affected by the external pressure acting on the external piston 30.

Also, since the front pressure chamber $R_{31}$ and the rear pressure chamber $R_{32}$ constituting the pressure chamber $R_3$ are communicatively connected by the communicating hole 29 and the pressure receiving area $B_2$ from the rear pressure chamber $R_{32}$ in the drive piston 17 is set to be smaller than the pressure receiving area $B_1$ from the front pressure chamber $R_{31}$. Thus, when the drive piston 17 moves, it is sufficient that an electromagnetic force provided to the ring piston 19, that is, the current value passed to the coil 20 is such that a resultant force of a driving force corresponding to a difference of pressure receiving areas $B_1-B_2$ in the front and the rear of the drive piston 17, an energizing force of the reaction disc 23, and a driving force corresponding to various kinds of sliding resistance is assured, enabling reduction in power consumption.

Then, when the drive piston 17 moves downward, first the valve portion 17b is seated in the valve seat 28a of the pressure control valve 24 to block the through hole 28 and when the drive piston 17 further moves downward, next the pressure control valve 24 is moved downward against energizing force of the reaction disc 25 and return spring 27. Then, the valve portion 24a of the pressure control valve 24 is separated from the valve seat 16a of the support block 15 to open the passage.

Therefore, while the decompression chamber $R_2$ and the pressure chamber $R_3$ are blocked by the valve portion 17b of the drive piston 17 being seated in the valve seat 28a of the pressure control valve 24, the hyperbaric chamber $R_1$ and the pressure chamber $R_3$ are communicatively connected by the valve portion 24a of the pressure control valve 24 being separated from the valve seat 16a of the support block 15. Thus, a pressure acting on the hyperbaric chamber $R_1$ from the hyperbaric source 33 through the hyperbaric port $P_1$, that is, a high-pressure hydraulic oil flows into the pressure chamber $R_3$ by passing through a gap between the valve portion 24a of the pressure control valve 24 and the valve seat 16a of the support block 15 before being supplied to the pressure supply unit 35 as a control pressure from the control pressure port $P_3$ through the control line $L_3$.

When the aforementioned drive piston 17 operates downward, the volume of the pressure regulated chamber $R_4$ increases and thus, a hydraulic oil is supplied from the reservoir tank 34 via the pressure regulating port $P_4$ and pressure regulating line $L_4$.

Then, if the current value passed to the coil 20 is reduced in this state, the ring piston 19 moves downward due to reduced repulsion from the permanent magnet 18 after a generated electromagnetic force decreases and pressing force against the reaction disc 21 decreases and thus, the drive piston 17 moves upward due to energizing force of the reaction disc 23. At this time, the drive piston 17 goes up in accordance with recovery of the original form after deformation of the reaction disc 21 and thus, a damping force acts due to reaction and restoring force of rubber to improve responsiveness. Also, since deformation upward in the reaction disc 21 is prevented by the guide plate 22, sufficient drive transmission force can be ensured.

Then, when the drive piston 17 moves upward, the pressure control valve 24 moves upward due to energizing force of the reaction disc 25 and return spring 27 while the valve portion 17b is seated in the valve seat 28a of the pressure control valve 24 to block the through hole 28, and the valve portion 24a is seated in the valve seat 16a of the support block 15 to block the passage. Next, when the drive piston 17 further moves upward, the valve portion 17b is separated from the valve seat 28a of the pressure control valve 24 to open the through hole 28.

Therefore, while the hyperbaric chamber $R_1$ and the pressure chamber $R_3$ are blocked by the valve portion 24a of the pressure control valve 24 being seated in the valve seat 16a of the support block 15, the decompression chamber $R_2$ and the pressure chamber $R_3$ are communicatively connected by the valve portion 17b of the drive piston 17 being separated from the valve seat 28a of the pressure control valve 24. Thus, a control pressure acting on the pressure supply unit 35 from the pressure chamber $R_3$ through the pressure control port $P_3$ and control line $L_3$, that is, a hydraulic oil flows from the through hole 28 into the decompression chamber $R_2$ by passing through a gap between the valve portion 17b of the drive piston 17 and the valve seat 28a of the pressure control valve 24 before being discharged to the reservoir tank 34 from the decompression port $P_2$ through the decompression line $L_2$.

Then, when the drive piston 17 operates upward, the volume of the pressure regulated chamber $R_4$ decreases and thus, a hydraulic oil is discharged to the reservoir tank 34 via the pressure regulating port $P_4$ and pressure regulating line $L_4$.

If a power supply system or control system connected to the coil 20 is defective, no electromagnetic force is generated even if the coil 20 is energized, the drive piston 17 and pressure control valve 24 cannot be moved by the ring piston 19 through the reaction disc 21, and no control pressure can be supplied to the pressure supply unit 35 by communicatively connecting the hyperbaric chamber $R_1$ and the pressure chamber $R_3$.

However, in the present embodiment, the external piston 30 is provided opposite to the drive piston 17 and the drive piston 17 is pressed by the external piston 30 by increasing a control pressure acting on the external piston 30 from the input unit 36. Then, the drive piston 17 moves downward against energizing force of the reaction disc 23, the valve portion 17b is seated in the valve seat 28a of the pressure control valve 24 to block the through hole 28, the pressure control valve 24 moves downward against energizing force of the reaction disc 25 and return spring 27, and the valve portion 24a is separated from the valve seat 16a of the support block 15 to open the passage.

Therefore, like the foregoing, while the decompression chamber $R_2$ and the pressure chamber $R_3$ are blocked, the hyperbaric chamber $R_1$ and the pressure chamber $R_3$ are communicatively connected and a high-pressure hydraulic oil is supplied from the hyperbaric source 33 to the hyperbaric chamber $R_1$ through the hyperbaric port $P_1$, which then flows into the pressure chamber $R_3$ by passing through a gap between the valve portion 24a of the pressure control valve 24 and the valve seat 16a of the support block 15 before being supplied to the pressure supply unit 35 as a control pressure from the control pressure port $P_3$ through the control line $L_3$. Thus, even if a power supply system or control system is defective, pressure control can properly be performed.

In a pressure controller in the first embodiment as described above, the drive piston 17 and pressure control valve 24 are freely movably supported in the housing 11, the drive piston 17 is supported by being energized and the pressure control valve 24 is supported by being energized to make the pressure chamber $R_3$ and the decompression chamber $R_2$ communicatively connectible, and the drive piston 17 and pressure control valve 24 are moved by an electromagnetic force of a solenoid via the pressing piston 19 to make the hyperbaric chamber $R_1$ and pressure chamber $R_3$ communicatively connectible. In addition, by providing the external piston 30 freely movably opposite to the drive piston 17, a control pressure acting on the external piston 30 from the rear pressure chamber $R_{32}$ on the drive piston 17 side is made equal to or greater than an external pressure acting from outside by the input unit 36.

Therefore, even when a power supply system or control system is defective, if the external piston 30 is pressed with an external pressure from the input unit 36, the external piston 30 moves downward with a driving force being transmitted to the drive piston 17 to block the through hole 28 by the valve portion 17b and also the passage can be opened by separating the valve portion 24a from the valve seat 16a with the pressure control valve 24 being moved downward so that a hydraulic oil in the hyperbaric chamber $R_1$ can reliably be supplied to the pressure chamber $R_3$ before being supplied to the pressure supply unit 35 as a control pressure. As a result, pressure control can properly be performed without using a switching mechanism or the like separately and when the power supply system and control system work normally, reliability can be improved without the drive piston 17 being adversely affected by an external pressure.

In this case, an external pressure acting on the external piston 30 can reliably be transmitted to the drive piston 17 by freely movably supporting the external piston 30 on the upper end of the housing 11 and arranging the external piston 30 serially with the drive piston 17, and reliability of operation can thereby be improved and also the controller can be made more compact.

Also in the present embodiment, a redoubling unit is constituted by freely movably supporting the drive piston 17 on the support block 15 in the housing 11, relatively freely movably supporting the ring piston 19 between the housing 11 and the drive piston 17, and providing the reaction disc 21 between the drive piston 17 and the ring piston 19. Therefore, when the ring piston 19 moves due to an electromagnetic force of a solenoid, the driving force thereof is redoubled by the reaction disc 21 before being transmitted to the drive piston 17 and the force required for the solenoid to drive the ring piston 19 is reduced so that a pressure of a large flow rate can be controlled with low current, whereby a responsiveness is improved.

Also, the drive valve of the present invention includes the drive piston 17 and the ring piston 19, the rubber reaction disc 21 is applied as a redoubling unit and an elastic member of the present invention, and the reaction disc 21 is arranged so that the reaction disc 21 is in contact with an end of the housing 11 between the drive piston 17 and the ring piston 19. Therefore, the controller can be made compact and also driving force can easily be redoubled by making the drive piston 17 and the ring piston 19 relatively movable by arranging the both concentrically inside the housing 11 and arranging the reaction disc 21 at the end. Also, by applying the rubber reaction disc 21, assembliability can be improved and also compactification of the controller and improvement of the redoubling function can be realized.

Also in the present embodiment, the pressure chamber $R_3$ includes the front pressure chamber $R_{31}$ and the rear pressure chamber $R_{32}$ in the front and the rear of the movement direction of the drive piston 17, the front pressure chamber $R_{31}$ and the rear pressure chamber $R_{32}$ are communicatively connected by the communicating hole 29 formed inside the drive piston 17, and the outside diameters of each of the supporter 17a and supporter 17d of the drive piston 17 are determined so that the pressure receiving area $B_2$ from the rear pressure chamber $R_{32}$ in the drive piston 17 becomes smaller than the pressure receiving area $B_1$ from the front pressure chamber $R_{31}$. Therefore, when the drive piston 17 moves, it is sufficient that an electromagnetic force provided to the ring piston 19, that is, the current value passed to the coil 20 is such that a resultant force of a driving force corresponding to a difference of pressure receiving areas $B_1-B_2$ in front and the rear of the drive piston 17, an energizing force of the reaction disc 23, and a driving force corresponding to various kinds of sliding resistance is assured, enabling reduction in power consumption of the coil 20.

Then, in the present embodiment, the pressure controller of the present invention is configured as a poppet type three-way valve. Therefore, when the drive piston 17 is moved downward by the ring piston 19 according to an electromagnetic force, the valve portion 17b is seated in the valve seat 28a of the pressure control valve 24, and the pressure control valve 24 is moved downward to separate the valve portion 24a from the valve seat 16a of the support block 15, the hyperbaric chamber $R_1$ and the pressure chamber $R_3$ are communicatively connected while the decompression chamber $R_2$ and the pressure chamber $R_3$ are blocked, and a high-pressure hydraulic oil can be output as a control pressure from the control pressure port $P_3$ after being flown from the hyperbaric chamber $R_1$ to the pressure chamber $R_3$. Also, when the drive piston 17 is moved upward by reducing an electromagnetic force via the ring piston 19, the pressure control valve 24 is moved upward to seat the valve portion 24a in the valve seat 16a of the support block 15 and to separate the valve portion 17b of the drive piston 17 from the valve seat 28a of the pressure control valve 24, the decompression chamber $R_2$ and the pressure chamber $R_3$ are communicatively connected while the hyperbaric chamber $R_1$ and the pressure chamber $R_3$ are blocked, and a hydraulic oil can be discharged from the decompression port $P_2$ for reducing pressure after being flown from the pressure chamber $R_3$ to the decompression chamber $R_2$. As a result, the communicating state and blocked state of the hyperbaric chamber $R_1$ and the decompression chamber $R_2$ with the pressure chamber $R_3$ can easily be switched by moving the drive piston 17 and the pressure control valve 24 and thus, the control pressure can easily be regulated.

In the above embodiment, the rubber reaction disc 21 is used as an elastic member serving as the redoubling unit of the present invention, but the present invention is not limited to this and, for example, a hydraulic oil may be sealed or a plurality of ball screws or planetary gears may be applied.

Second Embodiment

Figure 2:
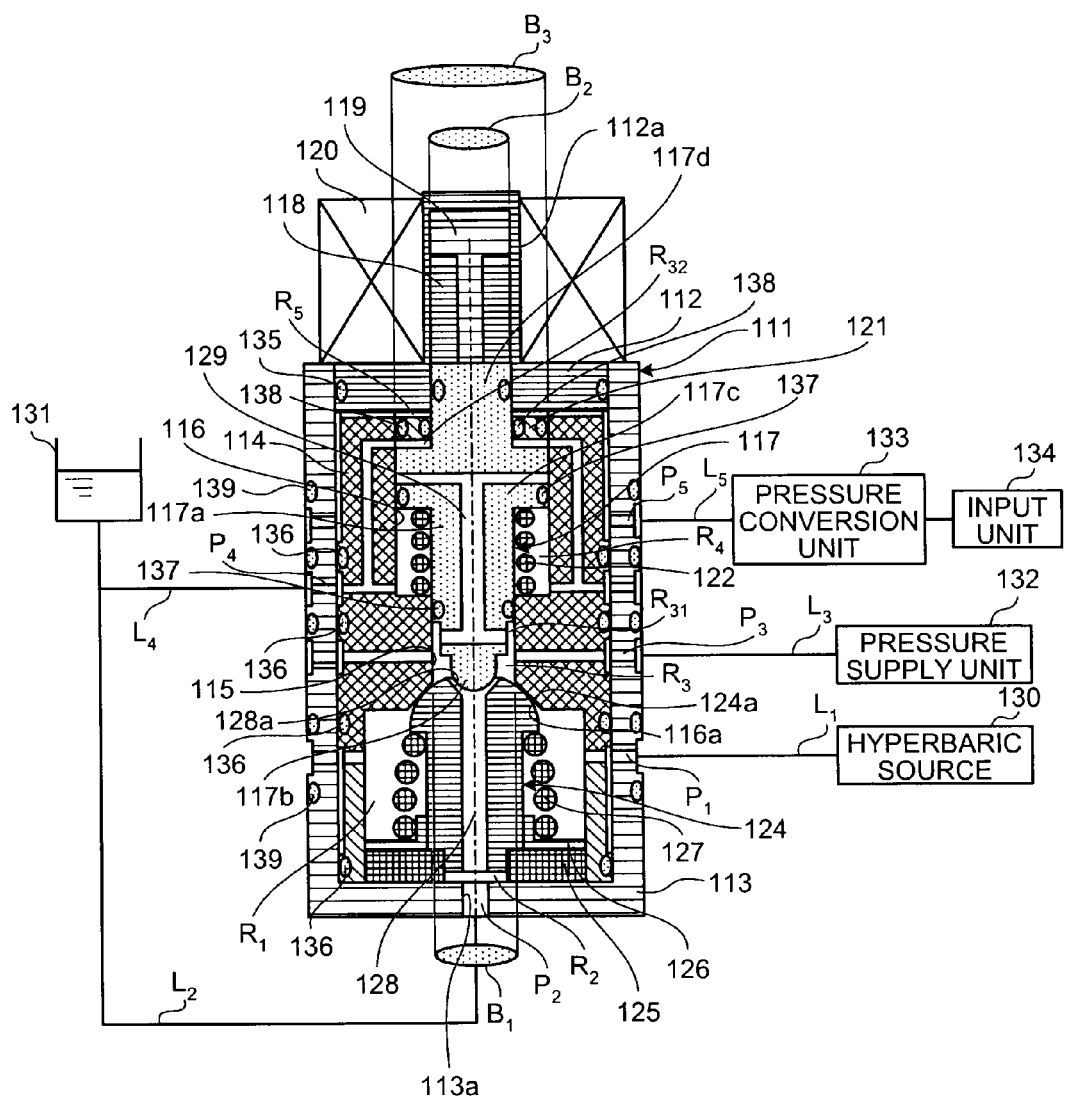
FIG. 2 is a schematic block diagram showing a pressure controller according to a second embodiment of the present invention.

FIG. 2 is a schematic block diagram showing a pressure controller according to a second embodiment of the present invention.

In a poppet type three-way valve as a pressure controller in the second embodiment, as shown in FIG. 2, a housing 111 having a hollow cylindrical shape includes an upper housing 112 and a lower housing 113 whose longitudinal section has an open-side square shape and the upper housing 112 and the lower housing 113 are integrally fixed by the upper housing 112 being fitted into the lower housing 113 and the inside thereof is in a sealed state.

Inside the housing 111, a support block 114 is fixed and a first bearing hole 115 and a second bearing hole 116 cut through in the vertical direction are formed in the central part of the support block 114 and also a valve seat 116a widening downward is formed in a lower part of the second bearing hole 116. Then, a drive piston (second piston) 117 is freely movably fitted into the first bearing hole 115 and the second bearing hole 116 of the support block 114.

The drive piston 117 includes a first supporter 117a in a cylindrical shape, a valve portion 117b in a spherical shape formed at a tip part (lower end in FIG. 2) of the first supporter 117a, a second supporter 117c formed in a disc shape formed at a rear end part (upper end in FIG. 2) of the first supporter 117a, and a third supporter 117d in a cylindrical shape formed at a rear end part (upper end in FIG. 2) of the second supporter 117c. Then, the first supporter 117a is freely movably fitted into the first bearing hole 115 and the second supporter 117c is freely movably fitted into the second bearing hole 116.

Also, a pressing piston 119 is freely movably supported along the vertical direction by a fixed guide 118 made of iron inside a protruding portion 112a of the upper housing 112 and a coil 120 is wound outside the upper housing 112 facing the guide 118 and the pressing piston 119. The third supporter 117d in the drive piston 117 is freely movably fitted into the upper housing 112 and the pressing piston 119 and the drive piston 117 are arranged serially with their ends in contact. Also, an external piston 121 is freely movably fitted between the second bearing hole 116 of the support block 114 and the third supporter 117d of the drive piston 117. And, a return spring (energizing unit) 122 is set between the second supporter 117c of the drive piston 117 and the support block 114.

Therefore, the drive piston 117 is energized upward by energizing force of the return spring 122 and positioned by the upper end thereof being in contact with the pressing piston 119. Then, an electromagnetic force is provided to the guide 118 by passing a current to the coil 120 and when the pressing piston 119 is moved downward by attraction of the guide 118, the drive piston 117 is pressed by the pressing piston 119 so that the drive piston 117 can move downward against energizing force of the return spring 122.

In the present embodiment, a drive valve of the present invention includes the drive piston 117 and the pressing piston 119 and a solenoid of the present invention includes the guide 118 and the coil 120.

A pressure control valve 124 is disposed in the central part of the lower housing 113 and the pressure control valve 124 has a valve portion 124a in a spherical umbrella shape formed at a tip part (upper end in FIG. 2). A ring-shaped rubber reaction disc 125 is mounted at a lower end of the lower housing 113 and a disc-shaped spring support 126 is mounted on the reaction disc 125 with a return spring 127 set between the pressure control valve 124 and the spring support 126. In this case, the spring support 126 functions as a support unit for freely movably supporting the pressure control valve 124 along the vertical direction and the reaction disc 125 functions as an energizing unit for energizing the pressure control valve 124 upward, and the pressure control valve 124 is freely movable along the vertical direction and also supported by being energized in a direction in which the valve portion 124a is seated in the valve seat 116a of the support block 114.

That is, the spring support 126 is positioned by the lower housing 113 and the pressure control valve 124 is supported by the positioned spring support 126. Thus, movement of the pressure control valve 124 is made smooth by the spring support 126 so that propulsion properties can be promoted. The pressure control valve 124 is also supported by being energized by elastic force of the reaction disc 125 and energizing force of the return spring 127 in a direction in which the valve portion 124a is seated in the valve seat 116a of the support block 114. Further, a sealing nature is ensured by the reaction disc 125 set between the lower housing 113 and the pressure control valve 124.

In the central part of the pressure control valve 124, a through hole 128 cut through in the vertical direction is formed and also a valve seat 128a widening upward is formed in an upper part of the through hole 128. Moreover, the valve portion 117b in the drive piston 117 is seatable in the valve seat 128a of the pressure control valve 124. Further, the lower housing 113 has a through hole 113a formed for communicative connection with the through hole 128.

Since, in a pressure controller in the present embodiment, the drive piston 117 and the pressure control valve 124 are freely movably supported inside the housing 111, as described above, the hyperbaric chamber $R_1$ demarcated by the lower housing 113, support block 114, and pressure control valve 124, the decompression chamber $R_2$ demarcated by the lower housing 113 and through hole 128 of the pressure control valve 124, and the pressure chamber $R_3$ demarcated by the support block 114, drive piston 117, and pressure control valve 124 are provided.

The pressure chamber $R_3$ includes the front pressure chamber $R_{31}$ and the rear pressure chamber $R_{32}$ provided back and forth along the movement direction of the drive piston 117, and the front pressure chamber $R_{31}$ and the rear pressure chamber $R_{32}$ are communicatively connected by a communicating hole 129 formed inside the drive piston 117.

Then, the hyperbaric port $P_1$ communicatively connected to the hyperbaric chamber $R_1$ is formed by cutting through the lower housing 113 and support block 114, and also the decompression port $P_2$ communicatively connected to the decompression chamber $R_2$ is formed by cutting through the lower housing 113. Also, the control pressure port $P_3$ communicatively connected to the pressure chamber $R_3$ (front pressure chamber $R_{31}$) is formed by cutting through the lower housing 113 and the support block 114. In this case, the hyperbaric port $P_1$ and the decompression port $P_2$ function as the first port of the present invention and the control pressure port $P_3$ functions as the second port of the present invention. The hyperbaric port $P_1$ is connected to a hyperbaric source 130 via the hyperbaric line $L_1$, the decompression port $P_2$ is connected to a reservoir tank 131 via the decompression line $L_2$, and the control pressure port $P_3$ is connected to a pressure supply unit 132 via the control line $L_3$.

Also, the external pressure chamber $R_5$ is demarcated by the external piston 121, third supporter 117d of the drive piston 117, upper housing 112, and support block 114 to form the external pressure port $P_5$ communicatively connected to the external pressure chamber $R_5$ by cutting through the lower housing 113 and support block 114. The external pressure port $P_5$ is connected to a pressure conversion unit 133 and an input unit (pressure control unit) 134 via the external pressure line $L_5$. Also, a pressure regulated chamber $R_4$ is demarcated by the external piston 121, third supporter 117d of the drive piston 117, and support block 114 and the pressure regulating port $P_4$ communicatively connected to the pressure regulated chamber $R_4$ is formed by cutting through the lower housing 113 and support block 114. The pressure regulating port $P_4$ is connected to the reservoir tank 131 via the pressure regulating line $L_4$. The pressure regulating port $P_4$ is communicatively connected, after being branched, to an outer circumference of the second supporter 117c of the drive piston 117.

In this case, the front pressure chamber $R_{31}$ in the pressure chamber $R_3$ is communicatively connected to the rear pressure chamber $R_{32}$ via the communicating hole 129 and the drive piston 117 receives pressure from the rear pressure chamber $R_{32}$ and therefore, a control pressure supplied to the pressure supply unit 132 from the control pressure port $P_3$ via the control line $L_3$ will act on the drive piston 117 via the front pressure chamber $R_{31}$, communicating hole 129, and rear pressure chamber $R_{33}$ as an upward force. On the other hand, an external pressure is introduced to the external pressure chamber $R_5$ from the input unit 134 by the pressure conversion unit 133 via the external pressure line $L_5$ and external pressure port $P_5$ and the external pressure acts on the external piston 121 as a downward force. In the present embodiment, the external pressure is set to the aforementioned control pressure.

Moreover, in the present embodiment, while a control pressure acts on the drive piston 117 from the pressure chamber $R_3$ on the pressure supply unit 132 side, an external pressure equal to the control pressure from the input unit 134 acts on the external piston 121 and a pressure in balance with the external piston 121 acts on the rear pressure chamber $R_{32}$. In this case, the control pressure on the drive piston 117 from the pressure chamber $R_3$ corresponds to the pressure receiving area $B_1$ of the first supporter 117a of the drive piston 117 and the control pressure on the drive piston 117 from the input unit 134 corresponds to a difference of the pressure receiving areas $B_3-B_2$ obtained by subtracting the pressure receiving area $B_2$ of the third supporter 117d from the pressure receiving area $B_3$ of the second supporter 117c of the drive piston 117. Thus, the outside diameters of the supporters 117a, 117c, and 117d of shapes of the drive piston 117 are set in such a way that the relationship $B_1 \geqq B_3-B_2$ holds.

Therefore, when the coil 120 is not energized, the drive piston 117 is positioned by energizing force of the return spring 122 by being in contact with the guide 118, and the pressure control valve 124 is positioned by energizing force of the reaction disc 125 and return spring 127 in such a way that the valve portion 124a is seated in the valve seat 116a of the support block 114 with the valve portion 117b of the drive piston 117 being separated from the valve seat 128a of the pressure control valve 124 to open the passage.

Then, when the coil 120 is energized, the pressing piston 119 moves downward due to attraction of the guide 118 to press against the drive piston 117 and the drive piston 117 moves downward against energizing force of the return spring 122. Then, the valve portion 117b of the drive piston 117 is seated in the valve seat 128a of the pressure control valve 124 to block the passage and also the pressure control valve 124 is moved against energizing force of the reaction disc 125 and return spring 127 and the valve portion 124a in the pressure control valve 124 is separated from the valve seat 116a of the support block 114 so that the passage can be opened.

With a seal member 135 set between the upper housing 112 and lower housing 113, a seal member 136 set between the lower housing 113 and support block 114, a seal member 137 set between the support block 114 and drive piston 117, the reaction disc 125 as a seal member set between the lower housing 113 and pressure control valve 124, and a seal member 138 set between the support block 114 and external piston 121, the sealing nature is ensured. Moreover, the housing 111 is supported by a casing (not shown) and a seal member 139 is set between the lower housing 113 and the casing to ensure the sealing nature.

Here, pressure control by the aforementioned pressure controller in the present embodiment will be described in detail.

In a pressure controller in the present embodiment, when the coil 120 is demagnetized, the drive piston 117 is positioned by being in contact with the upper housing 112 by the return spring 122 and the pressure control valve 124, on the other hand, is positioned by the reaction disc 125 and return spring 127 in such a way that the valve portion 124a is seated in the valve seat 116a of the support block 114 with the valve portion 117b of the drive piston 117 being separated from the valve seat 128a. Therefore, the hyperbaric chamber $R_1$ and the pressure chamber $R_3$ are blocked and the pressure chamber $R_3$ and the decompression chamber $R_2$ are communicatively connected.

If the coil 120 is energized in this state, the pressing piston 119 moves downward due to a generated electromagnetic force to press against the drive piston 117 and the drive piston 117 moves downward against energizing force of the return spring 122. Since, at this time, a control pressure acting on the drive piston 117 from the return spring 122 is equal to or greater than an external pressure acting from the external pressure chamber $R_5$, the external pressure from the external pressure chamber $R_5$ acts on the external piston 121 and thus, the drive piston 117 can properly be moved downward without a driving force for moving the drive piston 117 downward being adversely affected.

Then, when the drive piston 117 moves downward, first the valve portion 117b is seated in the valve seat 128a of the pressure control valve 124 to block the through hole 128 and when the drive piston 117 further moves downward, next the pressure control valve 124 is moved downward against energizing force of the reaction disc 125 and return spring 127. Then, the valve portion 124a in the pressure control valve 124 is separated from the valve seat 116a of the support block 114 to open the passage.

Therefore, while the decompression chamber $R_2$ and the pressure chamber $R_3$ are blocked by the valve portion 117b of the drive piston 17 being seated in the valve seat 128a of the pressure control valve 124, the hyperbaric chamber $R_1$ and the pressure chamber $R_3$ are communicatively connected by the valve portion 124a of the pressure control valve 124 being separated from the valve seat 116a of the support block 114.

Thus, a pressure acting on the hyperbaric chamber $R_1$ from the hyperbaric source 130 through the hyperbaric port $P_1$, that is, a high-pressure hydraulic oil flows into the pressure chamber $R_3$ by passing through a gap between the valve portion 124a of the pressure control valve 124 and the valve seat 114a of the support block 114 before being supplied to the pressure supply unit 132 as a control pressure from the control pressure port $P_3$ through the control line $L_3$.

When the aforementioned drive piston 117 operates downward, the volume of the pressure regulated chamber $R_4$ decreases and thus, a hydraulic oil is discharged into the reservoir tank 131 via the pressure regulating port $P_4$ and pressure regulating line $L_4$.

Then, if the current value passed to the coil 120 is reduced in this state, the pressing piston 119 moves upward as a result of a reduced generated electromagnetic force and pressing force against the drive piston 117 decreases and thus, the drive piston 117 moves upward due to energizing force of the return spring 122. Then, the pressure control valve 124 moves upward due to energizing force of the reaction disc 125 and return spring 127 while the through hole 128 remains blocked with the valve portion 117b seated in the valve seat 128a of the pressure control valve 124, and the valve portion 124a is seated in the valve seat 116a of the support block 114 to block the passage. When the drive piston 117 further moves upward, the valve portion 117b is separated from the valve seat 128a of the pressure control valve 124 to open the through hole 128.

Therefore, while the hyperbaric chamber $R_1$ and the pressure chamber $R_3$ are blocked by the valve portion 124a of the pressure control valve 124 being seated in the valve seat 116a of the support block 114, the decompression chamber $R_2$ and the pressure chamber $R_3$ are communicatively connected by the valve portion 117b of the drive piston 117 being separated from the valve seat 128a of the pressure control valve 124. Thus, a control pressure acting on the pressure supply unit 132 from the pressure chamber $R_3$ through the pressure control port $P_3$ and control line $L_3$, that is, a hydraulic oil flows from the through hole 128 into the decompression chamber $R_2$ by passing through a gap between valve portion 117b of the drive piston 117 and the valve seat 128a of the pressure control valve 124 before being discharged to the reservoir tank 131 from the decompression port $P_2$ through the decompression line $L_2$.

Then, when the drive piston 117 operates upward, the volume of the pressure regulated chamber $R_4$ increases and thus, a hydraulic oil is supplied to the reservoir tank 131 via the pressure regulating port $P_4$ and pressure regulating line $L_4$.

If a power supply system or control system connected to the coil 120 is defective, no electromagnetic force is generated even if the coil 120 is energized, the drive piston 117 and pressure control valve 124 cannot be moved by the pressing piston 119, and no control pressure can be supplied to the pressure supply unit 132 by communicatively connecting the hyperbaric chamber $R_1$ and the pressure chamber $R_3$.

However, in the present embodiment, the external pressure chamber $R_5$ is demarcated above the drive piston 117 and the drive piston 117 is pressed downward by the external piston 121 by a high-pressure hydraulic oil being converted to a predetermined pressure by the pressure conversion unit 133 by raising an external pressure from the input unit 134 before being output to the external pressure line $L_5$ and supplied to the external pressure chamber $R_5$ through the external pressure port $P_5$. Then, the drive piston 117 moves downward against energizing force of the return spring 122, the valve portion 117b is seated in the valve seat 128a of the pressure control valve 124 to block the through hole 128, the pressure control valve 124 moves downward against energizing force of the reaction disc 125 and return spring 127, and the valve portion 124a is separated from the valve seat 116a of the support block 114 to open the passage.

Therefore, like the foregoing, while the decompression chamber $R_2$ and the pressure chamber $R_3$ are blocked, the hyperbaric chamber $R_1$ and the pressure chamber $R_3$ are communicatively connected and a high-pressure hydraulic oil is supplied from the hyperbaric source 130 to the hyperbaric chamber $R_1$ through the hyperbaric port $P_1$, which then flows into the pressure chamber $R_3$ by passing through a gap between the valve portion 124a of the pressure control valve 124 and the valve seat 116a of the support block 114 before being supplied to the pressure supply unit 132 as a control pressure from the control pressure port $P_3$ through the control line $L_3$. Thus, even if a power supply system or control system is defective, pressure control can properly be performed.

In a pressure controller in the second embodiment as described above, the pressing piston 119, drive piston 117, and pressure control valve 124 are serially arranged and freely movably supported in the housing 111, the pressure chamber $R_3$ and the decompression chamber $R_2$ are supported by being energized so as to make them communicatively connectible, and the drive piston 117 and pressure control valve 124 are moved by an electromagnetic force of a solenoid via the pressing piston 119 to make the hyperbaric chamber $R_1$ and the pressure chamber $R_3$ communicatively connectible. In addition, by freely movably supporting the external piston 121 in the housing 111 and demarcating the external pressure chamber $R_5$ above the external piston 121, an external pressure from the input unit 134 is made suppliable to the external pressure chamber $R_5$ from the external pressure line $L_5$ through the external pressure port $P_5$.

Therefore, even when a power supply system or control system is defective, by supplying an external pressure from the input unit 134 to the external pressure chamber $R_5$, a driving force can be transmitted to the drive piston 117 via the external piston 121 to move the drive piston 117 downward to block the through hole 128 by the valve portion 117b and also the passage can be opened by moving the pressure control valve 124 downward to separate the valve portion 124a from the valve seat 116a so that a hydraulic oil in the hyperbaric chamber $R_1$ can reliably be supplied to the pressure chamber $R_3$ before being supplied to the pressure supply unit 132 as a control pressure. As a result, pressure control can properly be performed without using a switching mechanism or the like separately and when the power supply system and control system work normally, the external piston 121 does not affect the drive piston 117 adversely so that reliability can be improved.

The external piston 121 is provided on an outer circumference of the drive piston 117, but the controller may be made more compact by using the drive piston 117 both as a drive valve and an external piston of the present invention.

Third Embodiment

Figure 3:
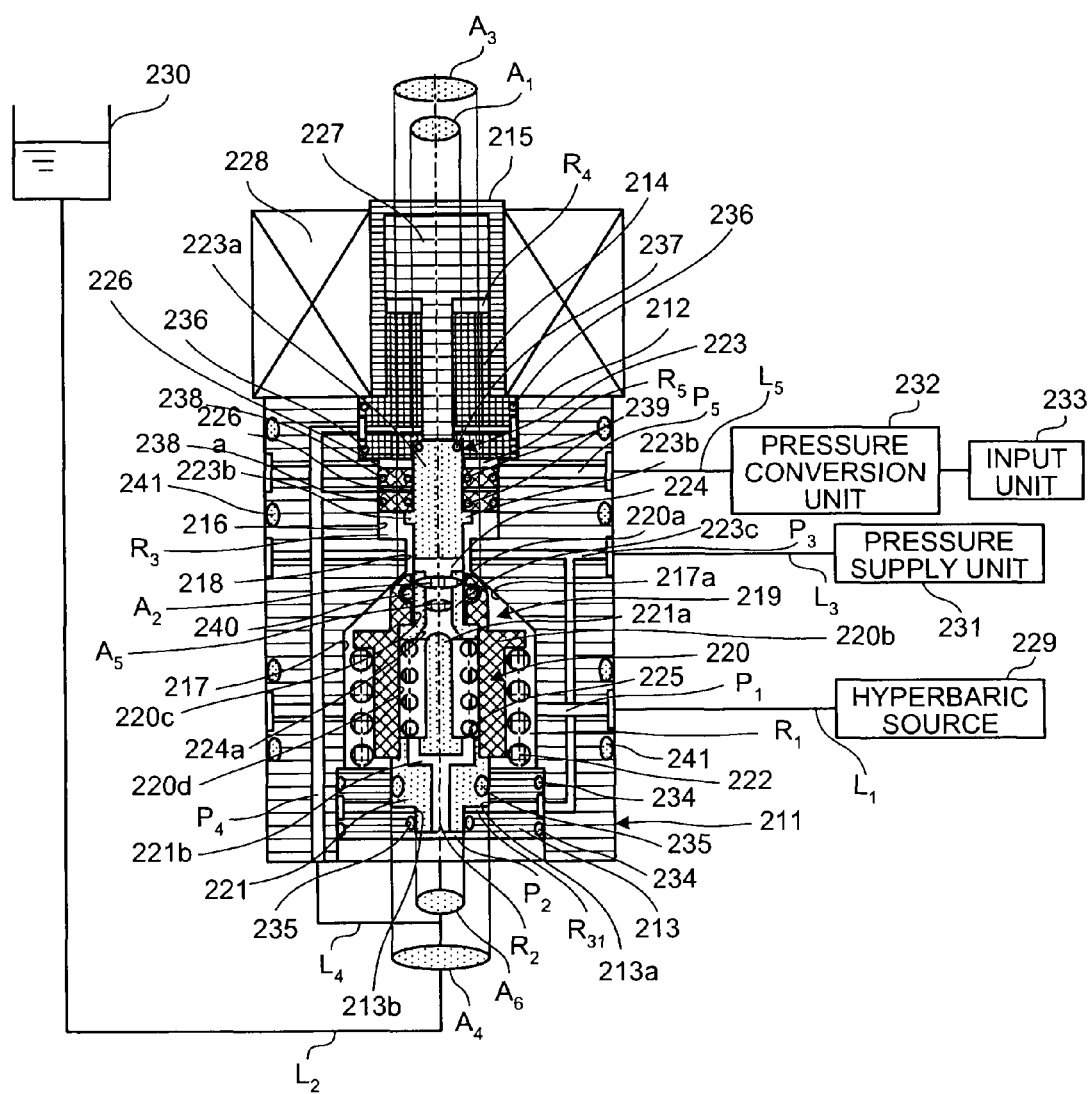
FIG. 3 is a schematic block diagram showing a pressure controller according to a third embodiment of the present invention.
Figure 4:
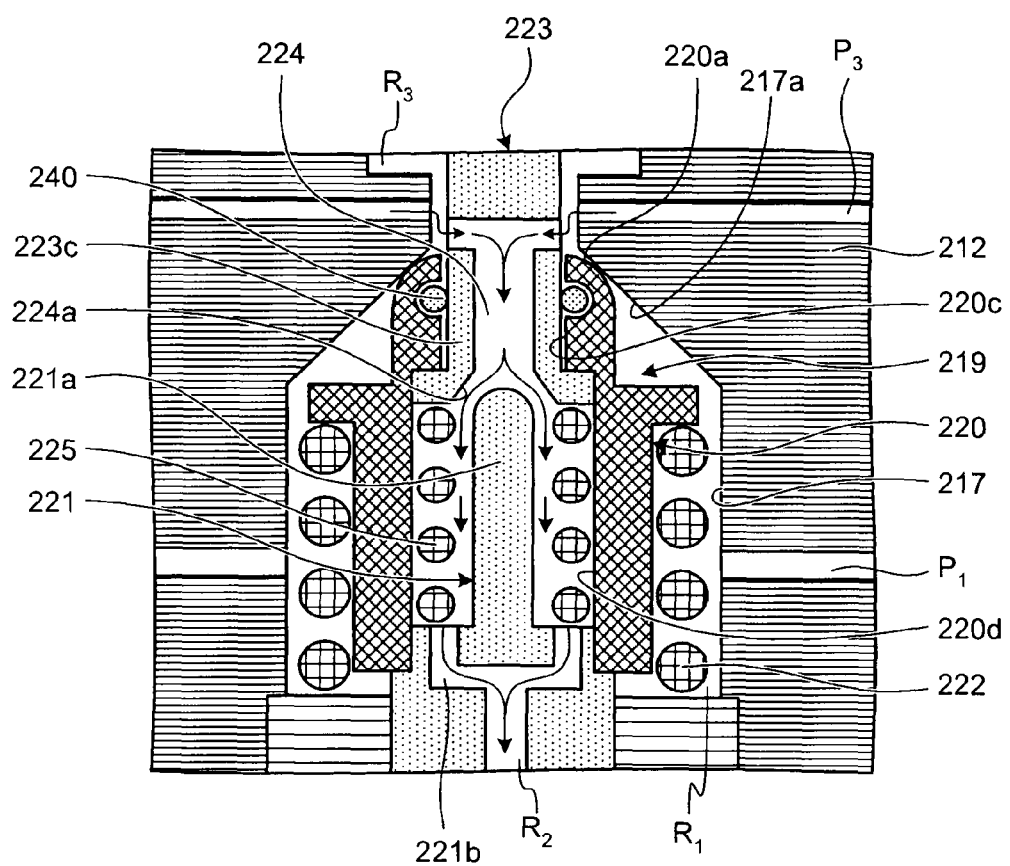
FIG. 4 is a sectional view of principal parts showing an operating state under reduced pressure conditions of the pressure controller in the third embodiment.

FIG. 3 is a schematic block diagram showing a pressure controller according to a third embodiment of the present invention, and FIG. 4 is a sectional view of principal parts showing an operating state under reduced pressure conditions of the pressure controller in the third embodiment.

In a poppet type three-way valve as a pressure controller in the third embodiment, as shown in FIG. 3 and FIG. 4, a housing 211 includes an upper housing 212 having a cylindrical shape and a lower housing 213 and the upper housing 12 and the lower housing 13 are integrally fixed by the lower housing 213 being fitted into the upper housing 212. Then, the inside of the housing 211 is in a sealed state by a support block 214 being fitted into an upper part of the upper housing 212 and a case 215 being fitted into the support block 214.

Inside the housing 211, an upper bearing hole 216 and a lower bearing hole 217 are formed along the vertical direction and also a central bearing hole 218 communicatively connecting the upper bearing hole 216 and lower bearing hole 217 is formed and a valve seat 217a widening downward is formed in an upper part of the lower bearing hole 217.

A pressure control valve 219 is disposed in the central part of the lower bearing hole 217 in the upper housing 212. The pressure control valve 219 is formed by integrally connecting a hyperbaric valve 220 and a decompression valve 221. The hyperbaric valve 220 has a valve portion 220a in a spherical umbrella shape formed at a tip part (upper end in FIG. 3) and a return spring 222 is set between a flange 220b of the hyperbaric valve 220 and the lower housing 213. The hyperbaric valve 220 also has an upper through hole 220c and a lower through hole 220d cutting through vertically formed therein. The decompression valve 221, on the other hand, is integrally connected by being fitted into a lower end of the hyperbaric valve 220 and is freely movably fitted into through holes 213a and 213b of the lower housing 213 along the vertical direction. Then, the tip side (upper end in FIG. 3) of the decompression valve 221 advances into the lower through hole 220d of the hyperbaric valve 220 to form the valve portion 221a whose end has a spherical umbrella shape. The decompression valve 221 also has a through hole 221b cutting through along the vertical direction inside the decompression valve 221 and communicatively connecting to the lower through hole 220d of the hyperbaric valve 220.

Therefore, the pressure control valve 219 in which the hyperbaric valve 220 and the decompression valve 221 are integrally connected is freely movably supported along the vertical direction inside the lower bearing hole 217 of the housing 211 and also supported by being energized upward by energizing force of the return spring 222 and the valve portion 220a of the hyperbaric valve 220 is seated in the valve seat 217a of the upper housing 212.

A drive piston 223 is disposed in the central part of the upper bearing hole 216 of the upper housing 212. The drive piston 223 includes a first supporter 223a in a cylindrical shape formed in an upper part, a flange 223b formed in an intermediate part, and a second supporter 223c in a cylindrical shape formed in a lower part to advance from the upper through hole 220c to the lower through hole 220d of the hyperbaric valve 220. Also in the drive piston 223, a lower end of the second supporter 223c expands in diameter to be locked by steps of the upper through hole 220c and lower through hole 220d of the hyperbaric valve 220, a communicating hole 224 communicatively connecting the central bearing hole 218 and the lower through hole 220d is formed and a valve seat 224a is formed on a lower end surface thereof. Then, in the lower through hole 220d of the hyperbaric valve 220 in the pressure control valve 219, a return spring (energizing unit) 225 is set between a lower end of the drive piston 223 and that of the decompression valve 221.

Therefore, the drive piston 223 is freely movably supported along the vertical direction inside the upper bearing hole 216 of the housing 211 and also supported by being energized upward by energizing force of the return spring 225 and the valve seat 224a is separated from the valve portion 221a of the decompression valve 221.

Also in the drive piston 223, an external piston 226 in an annular shape is vertically freely movably fitted to an outer circumference of the first supporter 223a and the outer circumference of the external piston 226 is freely movably fitted into the upper bearing hole 216 of the upper housing 212. Then, a pressing piston 227 is freely movably supported along the vertical direction inside the case 215 and a coil 228 is wound outside the case 215 facing the pressing piston 227. The pressing piston 227 and the drive piston 223 are supported in a serial state and a lower end of the pressing piston 227 is in contact with the drive piston 223.

Therefore, the drive piston 223 is energized upward by energizing force of the return spring 225 and positioned by an upper end thereof being in contact with the support block 214. Then, an electromagnetic force is generated by passing a current to the coil 228, the drive piston 223 is pressed by the pressing piston 227 being moved downward by attraction and thus the drive piston 223 can move downward against energizing force of the return spring 225.

In this case, energizing force of the return spring 222 is set to be larger than that of the return spring 225. That is, by setting a set load of the hyperbaric valve 220 by the return spring 222 to be larger than that of the drive piston 223 by the return spring 225, the order of a seating operation by the valve portion 220a of the hyperbaric valve 220 into the valve seat 217a of the upper housing 212 and a separation operation of the valve seat 224a of the drive piston 223 from the valve portion 221a of the decompression valve 221 is defined.

In the present embodiment, a drive valve of the present invention includes the drive piston 223 and the pressing piston 227 and a solenoid of the present invention includes the support block 214 and the coil 228.

Since, in a pressure controller in the present embodiment, the drive piston 223 and the pressure control valve 219 are freely movably supported inside the housing 211, as described above, the hyperbaric chamber $R_1$ demarcated by the upper housing 212, lower housing 213, and pressure control valve 219, the decompression chamber $R_2$ demarcated by the lower housing 213 and through hole 221b of the pressure control valve 219, and the pressure chamber $R_3$ demarcated by the upper housing 212, drive piston 223, external piston 226, and pressure control valve 219 are provided.

Then, the hyperbaric port $P_1$ communicatively connected to the hyperbaric chamber $R_1$ is formed by cutting through the upper housing 212, and also the decompression port $P_2$ communicatively connected to the decompression chamber $R_2$ is formed by cutting through the lower housing 213. Also, the control pressure port $P_3$ communicatively connected to the pressure chamber $R_3$ is formed by cutting through the upper housing 212. In the present embodiment, the hyperbaric port $P_1$ and the decompression port $P_2$ function as the first port of the present invention and the control pressure port $P_3$ functions as the second port of the present invention. The hyperbaric port $P_1$ is connected to a hyperbaric source 229 via the hyperbaric line $L_1$, the decompression port $P_2$ is connected to a reservoir tank 230 via the decompression line $L_2$, and the control pressure port $P_3$ is connected to a pressure supply unit 231 via the control line $L_3$. The control pressure port $P_3$ is communicatively connected, after being branched, to the front pressure chamber $R_{31}$ demarcated by the lower housing 213 and decompression valve 221.

In this case, the outside diameters of the supporters 223a and 223c of the drive piston 223 are set so that the pressure receiving area $A_1$ on the forward side in the first supporter 223a of the drive piston 223 and the pressure receiving area $A_2$ on the backward side in the second supporter 223c of the drive piston 223 satisfy the relation $A_1 > A_2$. Thus, when the drive piston 223 moves, it is sufficient that an electromagnetic force provided to the pressing piston 227 to move the drive piston 223, that is, the current value passed to the coil 228 is such that a resultant force of a driving force corresponding to a difference of pressure receiving areas $A_1$–$A_2$, in the front and the rear of the drive piston 223, an energizing force of the return spring 225, and a driving force corresponding to various kinds of sliding resistance is assured and power consumption can be reduced by setting the difference of pressure receiving areas $A_1$–$A_2$ to a small value.

Also, the pressure control valve 219 has a first seal part where the valve portion 220a of the hyperbaric valve 220 is seated in the valve seat 217a of the upper housing 212 and a second seal part fitted into the through hole 213a of the lower housing 213, and the pressure receiving area $A_3$ of the first seal part for sealing the pressure chamber $R_3$ and hyperbaric chamber $R_1$ and a pressure receiving area $A_4$ of the second seal part for sealing the hyperbaric chamber $R_1$ and decompression chamber $R_2$ are set to have the same area. Thus, the drive piston 223 excludes an influence of pressure from the hyperbaric source 229 and a driving force that overcomes a resultant force of energizing force of the return springs 222 and 225 and a driving force corresponding to various kinds of sliding resistance is sufficient so that the initial operation driving force of the pressure control valve 219 by the drive piston 223 can be reduced.

Further, in the pressure control valve 219, an area difference between the pressure receiving area $A_3$ and the pressure receiving area $A_2$ of the second supporter 223c in the drive piston 223 and that between pressure receiving areas $A_4$ and $A_6$ that are fitted to the through holes 213a and 213b of the lower housing 213 are set to be equal. Thus, the pressure control valve 219 excludes an influence of pressure from the pressure supply unit 231 so that the initial operation driving force by the drive piston 223 can be reduced.

An external pressure chamber $R_5$ is demarcated by the upper housing 212, support block 214, drive piston 223, and external piston 226 to form the external pressure port $P_5$ communicatively connected to the external pressure chamber $R_5$ by cutting through the upper housing 212, and the external pressure port $P_5$ is connected to a pressure conversion unit 232 and an input unit (pressure control unit) 233 via the external pressure line $L_5$. Further, the pressure regulated chamber $R_4$ is demarcated by the support block 214, case 215, and pressing piston 227, the pressure regulating port $P_4$ communicatively connected to the pressure regulated chamber $R_4$ is formed, and the pressure regulating port $P_4$ is connected to the reservoir tank 230 via the pressure regulating line $L_4$. The pressure regulating port $P_4$ is communicatively connected, after being branched, to an outer circumference of the external piston 226.

In this case, a control pressure supplied from the control pressure port $P_3$ to the pressure conversion unit 232 via the control line $L_3$ acts as an upward force on the external piston 226 from the pressure chamber $R_3$. On the other hand, an external pressure is introduced into the external pressure chamber $R_5$ from the input unit 233 by the pressure conversion unit 232 via the external pressure line $L_5$ and external pressure port $P_5$ and the external pressure acts on the external piston 226 as a downward force. In the present embodiment, the external pressure is set to the aforementioned control pressure.

Then, the external piston 226 freely movably fitted into the first bearing hole 216 of the upper housing 212 has the same pressure receiving area from the pressure chamber $R_3$ as that from the external pressure chamber $R_5$, that is, the relation: control pressure×pressure receiving area of the external piston 226=external pressure×pressure receiving area of the external piston 226 holds and the external piston 226 is in a floating state, preventing the external piston 226 from being stuck to the upper housing 212 or drive piston 223.

Therefore, when the coil 228 is not energized, the drive piston 223 is positioned by energizing force of the return spring 225 by being in contact with the support block 214, and the pressure control valve 219 is positioned by energizing force of the return spring 222 in such a way that the valve portion 220a of the hyperbaric valve 220 is seated in the valve seat 217a of the upper housing 212 with the valve seat 224a of the drive piston 223 being separated from the valve portion 221a of the decompression valve 221 in the pressure control valve 219 to open the passage.

Then, when the coil 228 is energized, the pressing piston 227 moves downward to press against the drive piston 223 and the drive piston 223 moves downward against energizing force of the return spring 225. Then, the valve seat 224a of the drive piston 223 is seated in the valve portion 221a of the decompression valve 221 to block the passage and also the hyperbaric valve 220 is moved together with the decompression valve 221 against energizing force of the return spring 222 and the valve portion 220a of the hyperbaric valve 220 in the pressure control valve 219 is separated from the valve seat 217a of the upper housing 212 so that the passage can be opened.

With a seal member 234 set between the upper housing 212 and lower housing 213, a seal member 235 set between the lower housing 213 and decompression valve 221, a seal member 236 set between the upper housing 212 and support block 214, a seal member 237 set between the support block 214 and drive piston 223, seal members 238 and 239 set between the external piston 226 and the upper housing 212 and drive piston 223, and a seal member 240 set between the second supporter 223c of the drive piston 223 and upper through hole 220c of the hyperbaric valve 220, the sealing nature is ensured. The seal members 238 and 239 are arranged above and below a through hole 226a formed in the external piston 226. Moreover, the housing 211 is supported by a casing (not shown) and a seal member 241 is set between the upper housing 212 and the casing to ensure the sealing nature.

Here, pressure control by the aforementioned pressure controller in the present embodiment will be described in detail.

In a pressure controller in the present embodiment, when the coil 228 is demagnetized, the drive piston 223 is positioned by being in contact with the support block 214 due to the return spring 225 and the hyperbaric valve 220 of the pressure control valve 219, on the other hand, is positioned by the return spring 222 in such a way that the valve portion 220a is seated in the valve seat 217a of the upper housing 212 with the valve seat 224a of the drive piston 223 being separated from the valve portion 221a of the decompression valve 221. Therefore, the hyperbaric chamber $R_1$ and the pressure chamber $R_3$ are blocked and the pressure chamber $R_3$ and the decompression chamber $R_2$ are communicatively connected.

If the coil 228 is energized in this state, the pressing piston 227 moves downward due to a generated electromagnetic force to press against the drive piston 223 and the drive piston 223 moves downward against energizing force of the return spring 225. Since, at this time, a control pressure acting on the external piston 226 from the pressure chamber $R_3$ is equal to an external pressure acting from the external pressure chamber $R_5$, the drive piston 223 can properly be moved downward without a driving force for moving the drive piston 223 downward being adversely affected by the control pressure or external pressure.

Then, when the drive piston 223 moves downward, first the valve seat 224a is seated in the valve portion 221a of the decompression valve 221 to block the communicating hole 224 and when the drive piston 223 further moves downward, next the decompression valve 221 and hyperbaric valve 220 are moved downward against energizing force of the return spring 222. Then, the valve portion 220a in the hyperbaric valve 220 is separated from the valve seat 217a of the upper housing 212 to open the passage.

Therefore, while the decompression chamber $R_2$ and the pressure chamber $R_3$ are blocked by the valve seat 224a of the drive piston 223 being seated in the valve seat 221a of the decompression valve 221, the hyperbaric chamber $R_1$ and the pressure chamber $R_3$ are communicatively connected by the valve portion 220a of the hyperbaric valve 220 being separated from the valve seat 217a of the upper housing 212. Thus, a pressure acting on the hyperbaric chamber $R_1$ from the hyperbaric source 229 through the hyperbaric port $P_1$, that is, a high-pressure hydraulic oil flows into the pressure chamber $R_3$ by passing through a gap between the valve portion 220a of the hyperbaric valve 220 and the valve seat 217a of the upper housing 212 before being supplied to the pressure supply unit 231 as a control pressure from the control pressure port $P_3$ through the control line $L_3$.

Then, if the current value passed to the coil 228 is reduced in this state, the pressing piston 227 moves upward as a result of a reduced generated electromagnetic force and the drive piston 223 moves upward due to energizing force of the return spring 225. Then, the hyperbaric valve 220 and decompression valve 221 move upward due to energizing force of the return spring 222 while the communicating hole 224 remains blocked with the valve seat 224a seated in the valve portion 221a of the decompression valve 221, and the valve portion 220a is seated in the valve seat 217a of the upper housing 212 to block the passage. When the drive piston 223 further moves upward, the valve seat 224a is separated from the valve portion 221a of the decompression valve 221 to open the communicating hole 224.

Therefore, while the hyperbaric chamber $R_1$ and the pressure chamber $R_3$ are blocked by the valve portion 220a of the hyperbaric valve 220 being seated in the valve seat 217a of the upper housing 212, the decompression chamber $R_2$ and the pressure chamber $R_3$ are communicatively connected by the valve seat 224a of the drive piston 223 being separated from the valve portion 221a of the decompression valve 221. Thus, a control pressure acting on the pressure supply unit 231 from the pressure chamber $R_3$ through the pressure control port $P_3$ and control line $L_3$, that is, a hydraulic oil flows from the communicating hole 224 of the drive piston 223 into the decompression chamber $R_2$ by passing through a gap between the valve seat 224a and valve portion 220a of the hyperbaric valve 220 and through the lower through hole 220d and through hole 221b before being discharged to the reservoir tank 230 from the decompression port $P_2$ through the decompression line $L_2$.

When pressure is reduced, a hydraulic oil supplied to the pressure supply unit 231 returns to the pressure control port $P_3$ from the control line $L_3$, flows from the pressure control port $P_3$ to the communicating hole 224 of the drive piston 223, passes through a gap between the valve seat 224a and valve portion 220a of the hyperbaric valve 220 to flow into the lower through hole 220d of the hyperbaric valve 220, and flows from the through hole 221b of the decompression valve 221 to the decompression chamber $R_2$ before being discharged into the reservoir tank 230 from the decompression port $P_2$ through the decompression line $L_2$. In this case, the drive piston 223 receives an upward force from fluid force of a hydraulic oil flowing from the communicating hole 224 into the lower through hole 220d of the hyperbaric valve 220 by passing through a gap between the valve seat 224a and valve portion 220a. That is, the drive piston 223 receives a force in a direction in which the valve seat 224a of the drive piston 223 and valve portion 220a of the hyperbaric valve 220 are separated, a so-called self-opening direction in which energizing force of the return spring 225 acts from a hydraulic oil passing inside the drive piston 223. Therefore, when pressure is reduced, the drive piston 223 is not susceptible to fluctuations of a hydraulic oil passing inside the drive piston 223 and thus is correctly positioned for opening the reduced-pressure passage so that pressure control will not vary.

It is also desirable to make an area difference $(A_1-A_2)-A_5$ calculated by subtracting a passage area $A_5$ of the communicating hole 224 from an area difference $(A_1-A_2)$ calculated by subtracting the pressure receiving area $A_2$ on the backward side in the second supporter 223c of the drive piston 223 from the pressure receiving area $A_1$ on the forward side in the first supporter 223a of the drive piston 223 as close as possible to zero. That is, when pressure is reduced, it is desirable to make the pressure receiving area $A_1$ in the drive piston 223 and a seal area $A_2+A_5$ on the decompression port $P_2$ in the drive piston 223 equivalent. If the area difference $(A_1-A_2)-A_5$ is positive, hysteresis occurs in pressure characteristics. If the area difference $(A_1-A_2)-A_5$ is negative, a flow rate to the decompression port $P_2$ increases when pressure is increased.

If a power supply system or control system connected to the coil 228 is defective, no electromagnetic force is generated even if the coil 228 is energized, the drive piston 223 and pressure control valve 219 cannot be moved by the pressing piston 227, and no control pressure can be supplied to the pressure supply unit 231 by communicatively connecting the hyperbaric chamber $R_1$ and the pressure chamber $R_3$.

However, in the present embodiment, the external piston 226 is freely movably provided above the flange 223b in the drive piston 223 and the external pressure chamber $R_5$ is demarcated above the external piston 226. The external piston 226 is pressed downward and the drive piston 223 is pressed downward by the external piston 226 via the flange 223b by a high-pressure hydraulic oil being converted to a predetermined pressure by the pressure conversion unit 232 by raising an external pressure from the input unit 233 before being output to the external pressure line $L_5$ and supplied to the external pressure chamber $R_5$ through the external pressure port $P_5$. Then, the drive piston 223 moves downward against energizing force of the return spring 225, the valve seat 224a is seated in the valve portion 221a of the decompression valve 221 to block the communicating hole 224, the hyperbaric valve 220 moves downward against energizing force of the return spring 222 together with the decompression valve 221, and the valve portion 220a of the hyperbaric valve 220 is separated from the valve seat 217a of the upper housing 212 to open the passage.

Therefore, like the foregoing, while the decompression chamber $R_2$ and the pressure chamber $R_3$ are blocked, the hyperbaric chamber $R_1$ and the pressure chamber $R_3$ are communicatively connected and a high-pressure hydraulic oil is supplied from the hyperbaric source 229 to the hyperbaric chamber $R_1$ through the hyperbaric port $P_1$, which then flows into the pressure chamber $R_3$ by passing through a gap between the valve portion 220a of the hyperbaric valve 220 and the valve seat 217a of the upper housing 212 before being supplied to the pressure supply unit 231 as a control pressure from the control pressure port $P_3$ through the control line $L_3$. Thus, even if a power supply system or control system is defective, pressure control can properly be performed.

In a pressure controller in the third embodiment as described above, the pressing piston 227, drive piston 223, and pressure control valve 219 are serially arranged and freely movably supported in the housing 211, the pressure chamber $R_3$ and the decompression chamber $R_2$ are supported by being energized so as to make them communicatively connectible, and the drive piston 223 and pressure control valve 219 are moved by an electromagnetic force of a solenoid via the pressing piston 227 to make the hyperbaric chamber $R_1$ and the pressure chamber $R_3$ communicatively connectible. In addition, by freely movably supporting the external piston 226 on an outer circumference of the drive piston 223 to demarcate the external pressure chamber $R_5$ above, an external pressure from the input unit 233 is made suppliable to the external pressure chamber $R_5$ from the external pressure line $L_5$ through the external pressure port $P_5$.

Therefore, even when a power supply system or control system is defective, by supplying an external pressure from the input unit 233 to the external pressure chamber $R_5$, a driving force can be transmitted to the drive piston 233 to move the input unit 233 downward to block the communicating hole 224 by the valve seat 224a being seated in the valve portion 220a and also the passage can be opened by moving the pressure control valve 219 downward to separate the valve portion 220a from the valve seat 217a so that a hydraulic oil in the hyperbaric chamber $R_1$ can reliably be supplied to the pressure chamber $R_3$ before being supplied to the pressure supply unit 231 as a control pressure. As a result, pressure control can properly be performed without using a switching mechanism or the like separately and when the power supply system and control system work normally, an external pressure does not affect the drive piston 233 so that reliability can be improved.

In addition, when pressure is reduced, a hydraulic oil in the pressure control port $P_3$ flows from the communicating hole 224 of the drive piston 223 to the lower through hole 220d by passing through a gap between the valve seat 224a and valve portion 220a of the hyperbaric valve 220 before being discharged from the through hole 221b of the decompression valve 221 into the decompression chamber $R_2$. In this case, the drive piston 223 receives a force in a self-opening direction in which energizing force of the return spring 225 acts from a hydraulic oil passing inside the drive piston 223 and thus, is not susceptible to fluctuations of a hydraulic oil passing inside without pressure control being varied so that high-precision pressure control can be performed.

Fourth Embodiment

Figure 5:
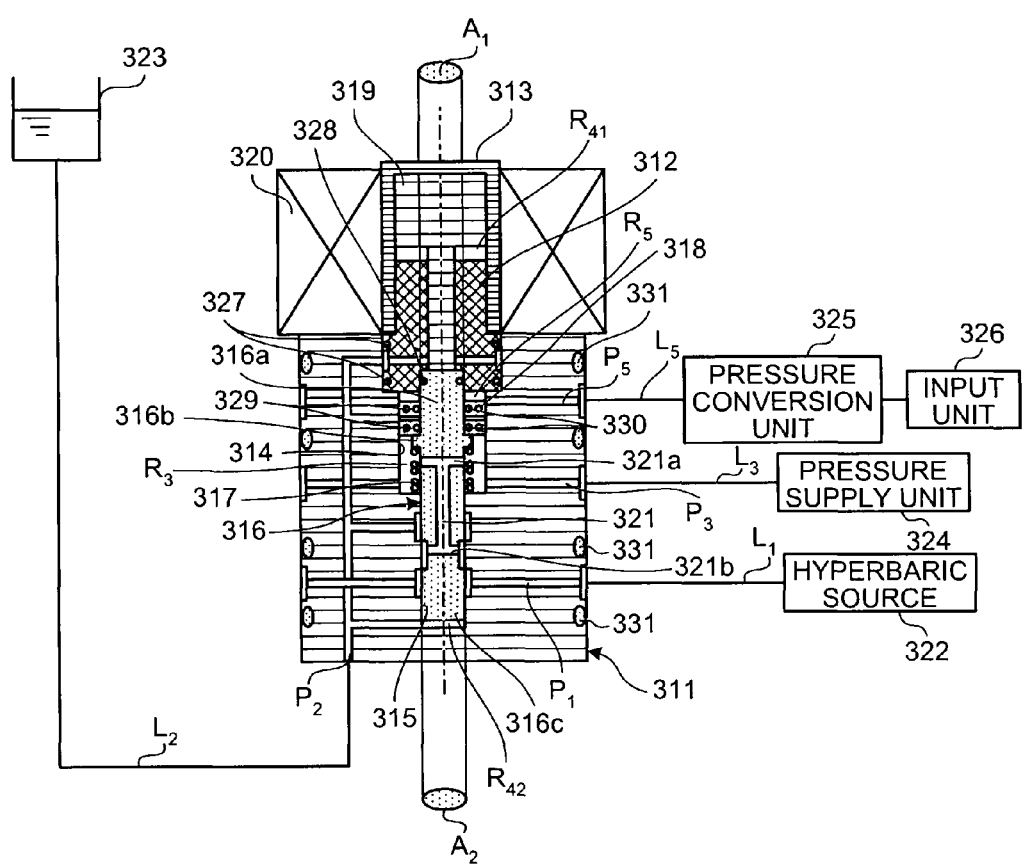
FIG. 5 is a schematic block diagram showing a pressure controller according to a fourth embodiment of the present invention.

FIG. 5 is a schematic block diagram showing a pressure controller according to a fourth embodiment of the present invention.

In a spool type three-way valve as a pressure controller in the fourth embodiment, as shown in FIG. 5, a housing 311 has a support block 312 being fitted into an upper part thereof and the inside of the housing 311 is in a sealed state by a case 313 being fitted into the support block 312. Inside the housing 311, an upper bearing hole 314 and a lower bearing hole 315 are formed along the vertical direction. In addition, a drive piston 316 is disposed in the central part of the lower bearing hole 315 of the housing 311.

The drive piston 316 includes a first supporter 316a formed in a cylindrical shape in an upper part, a flange 316b formed in an intermediate part, and a second supporter 316c formed in a lower part, and the second supporter 316c is freely movably supported along the vertical direction by fitting into the lower bearing hole 315. Then, a return spring (energizing unit) 317 is set between the housing 311 and flange 316b of the drive piston 316.

Therefore, the drive piston 316 is freely movably supported along the vertical direction by the lower bearing hole 315 of the housing 311 and also supported by being energized upward by energizing force of the return spring 317 and positioned by an upper end thereof being in contact with an undersurface of the support block 312.

Also in the drive piston 316, an external piston 318 in an annular shape is vertically freely movably fitted to an outer circumference of the first supporter 316a and the outer circumference of the external piston 318 is freely movably fitted into the upper bearing hole 314 of the housing 311. Then, a pressing piston 319 is freely movably supported along the vertical direction inside the case 313 and a coil 320 is wound outside the case 313 facing the pressing piston 319. The pressing piston 319 and the drive piston 316 are supported in a serial state and a lower end of the pressing piston 319 is in contact with the drive piston 316.

Therefore, the drive piston 316 is energized upward by energizing force of the return spring 317 and positioned by an upper end thereof being in contact with the support block 312. Then, an electromagnetic force is generated by passing a current to the coil 320, the drive piston 316 is pressed by the pressing piston 319 being moved downward by attraction and thus, the drive piston 316 can move downward against energizing force of the return spring 317.

In the present embodiment, a drive valve of the present invention includes the drive piston 316 and the pressing piston 319 and a solenoid of the present invention includes the support block 312 and the coil 320.

Since, in a pressure controller in the present embodiment, the drive piston 316 and the external piston 318 are freely movably supported inside the housing 311, as described above, a pressure chamber $R_3$ demarcated by the housing 311, drive piston 316, and external piston 318 is provided. Also, the drive piston 316 has a communicating hole 321 formed in the central part thereof and also has a first connection port 321a communicatively connected to an upper part of the communicating hole 321 to open to the pressure chamber $R_3$ and a second connection port 321b communicatively connected to a lower part of the communicating hole 321 to open to the outside.

Moreover, the hyperbaric port $P_1$ communicatively connectible to the second connection port 321b is formed by cutting through the housing 311, and the decompression port $P_2$ communicatively connectible to the second connection port 321b is formed by cutting through the housing 311. Also, the control pressure port $P_3$ communicatively connected to the pressure chamber $R_3$ is formed by cutting through the housing 311. In this case, the hyperbaric port $P_1$ and the decompression port $P_2$ function as the first port of the present invention and the control pressure port $P_3$ functions as the second port of the present invention. The hyperbaric port $P_1$ is connected to a hyperbaric source 322 via the hyperbaric line $L_1$, the decompression port $P_2$ is connected to a reservoir tank 323 via the decompression line $L_2$, and the control pressure port $P_3$ is connected to a pressure supply unit 324 via a control line $L_3$.

Moreover, a pressure regulated chamber $R_{41}$ is demarcated by the support block 312, case 313, and pressing piston 319, a pressure regulated chamber $R_{42}$ is demarcated by the housing 311 and an end of the second supporter 316c in the drive piston 316, and the decompression port $P_2$ is connected to each of the pressure regulated chambers $R_{41}$ and $R_{42}$ after being branched. The decompression port $P_2$ is communicatively connected, after being branched, to an outer circumference of the external piston 318.

In this case, the outside diameters of the supporters 316a and 316c of the drive piston 316 are set so that the pressure receiving area $A_1$ in the first supporter 316a of the drive piston 316 and the pressure receiving area $A_2$ in the second supporter 316c of the drive piston 316 satisfy the relation $A_1 > A_2$. Thus, when the drive piston 316 moves downward, it is sufficient that an electromagnetic force provided to the pressing piston 319, that is, the current value passed to the coil 320 is such that a resultant force of a driving force corresponding to a difference of pressure receiving areas $A_1 - A_2$ in the front and the rear of the drive piston 316, an energizing force of the return spring 317, and a driving force corresponding to various kinds of sliding resistance and power consumption can be reduced by setting the difference of pressure receiving areas $A_1 - A_2$ to a small value.

Also, an external pressure chamber $R_5$ is demarcated by the housing 311, support block 312, drive piston 316, and external piston 318 to form the external pressure port $P_5$ communicatively connected to the external pressure chamber $R_5$ by cutting through the housing 311, and the external pressure port $P_5$ is connected to a pressure conversion unit 325 and an input unit (pressure control unit) 326 via the external pressure line $L_5$.

In this case, a control pressure supplied from the control pressure port $P_3$ to the pressure supply unit 324 via the control line $L_3$ acts as an upward force on the external piston 318 from the pressure chamber $R_3$. On the other hand, an external pressure is introduced into the external pressure chamber $R_5$ from the input unit 326 by the pressure conversion unit 325 via the external pressure line $L_5$ and external pressure port $P_5$ and the external pressure acts on the external piston 318 as a downward force. In the present embodiment, the external pressure is set to the aforementioned control pressure.

Then, the external piston 318 freely movably fitted into the upper bearing hole 314 of the housing 311 has the same pressure receiving area from the pressure chamber $R_3$ as that from the external pressure chamber $R_5$, that is, the relation: control pressure×pressure receiving area of the external piston 318=external pressure×pressure receiving area of the external piston 318 holds and the external piston 318 is in a floating state, preventing the external piston 318 from being stuck to the housing 311 or drive piston 316.

Therefore, when the coil 320 is not energized, the drive piston 316 is positioned by energizing force of the return spring 317 by being in contact with the support block 312, and the decompression port $P_2$ and the control pressure port $P_3$ are communicatively connected through the communicating hole 321 by the first connection port 321a of the drive piston 316 being communicatively connected to the pressure chamber $R_3$ and the second connection port 321b being communicatively connected to the decompression port $P_2$.

Then, when the coil 320 is energized, the pressing piston 319 moves downward to press against the drive piston 316 and the drive piston 316 moves downward against energizing force of the return spring 317. Then, the hyperbaric port $P_1$ and the control pressure port $P_3$ can communicatively connected through the communicating hole 321 by the second connection port 321b being communicatively connected to the hyperbaric port $P_1$ while the first connection port 321a of the drive piston 316 being communicatively connected to the pressure chamber $R_3$.

With a seal member 327 set between the housing 311 and support block 312, a seal member 328 set between the support block 312 and drive piston 316, and seal members 329 and 330 set between the external piston 318 and the housing 311 and drive piston 316, the sealing nature is ensured. Moreover, the housing 311 is supported by a casing (not shown) and a seal member 331 is set between the housing 311 and the casing to ensure the sealing nature.

Here, pressure control by the aforementioned pressure controller in the present embodiment will be described in detail.

In a pressure controller in the present embodiment, when the coil 320 is demagnetized, the drive piston 316 is positioned by being in contact with the support block 312 due to the return spring 317 and, while the first connection port 321a of the drive piston 316 is communicatively connected to the pressure chamber $R_3$, the second connection port 321b is communicatively connected to the decompression port $P_2$. Therefore, while the decompression port $P_2$ and the control pressure port $P_3$ are communicatively connected by the pressure chamber $R_3$ and the communicating hole 321, the hyperbaric port P1 and the control pressure port P3 are blocked.

If the coil 320 is energized in this state, the pressing piston 319 moves downward due to a generated electromagnetic force to press against the drive piston 316 and the drive piston 316 moves downward against energizing force of the return spring 317. Since, at this time, a control pressure acting on the external piston 318 from the pressure chamber $R_3$ is equal to an external pressure acting from the external pressure chamber $R_5$, the drive piston 316 can properly be moved downward without a driving force for moving the drive piston 316 downward being adversely affected by the control pressure or external pressure.

Then, when the drive piston 316 moves downward, the second connection port 321b is switched from the decompression port $P_2$ to the hyperbaric port $P_1$ for communicative connection while the first connection port 321a of the drive piston 316 remains communicatively connected to the pressure chamber $R_3$. Thus, while the hyperbaric port $P_1$ and the control pressure port $P_3$ are communicatively connected by the pressure chamber $R_3$ and the communicating hole 321, the decompression port $P_2$ and the control pressure port $P_3$ are blocked.

Therefore, a pressure acting from the hyperbaric source 322 through the hyperbaric port $P_1$, that is, a high-pressure hydraulic oil flows from the second connection port 321b into the communicating hole 321, then flows to the pressure chamber $R_3$ via the first connection port 321a before being supplied to the pressure supply unit 324 as a control pressure from the control pressure port $P_3$ through the control line $L_3$.

Then, if the current value passed to the coil 320 is reduced in this state, the pressing piston 319 moves upward as a result of a reduced generated electromagnetic force and the drive piston 316 moves upward due to energizing force of the return spring 317. Then, the second connection port 321b is switched from the hyperbaric port $P_1$ to the decompression port $P_2$ for communicative connection while the first connection port 321a of the drive piston 316 remains communicatively connected to the pressure chamber $R_3$. Thus, while the decompression port $P_2$ and the control pressure port $P_3$ are communicatively connected by the pressure chamber $R_3$ and the communicating hole 321, the hyperbaric port $P_1$ and the control pressure port $P_3$ are blocked.

Therefore, a control pressure acting on the pressure supply unit 324 from the pressure chamber $R_3$ through the control pressure port $P_3$ and the control line $L_3$, that is, a hydraulic oil flows from the pressure chamber $R_3$ to the communicating hole 321 via the first connection port 321a and then flows to the decompression port $P_2$ via the second connection port 321b before being discharged to the reservoir tank 323 from the decompression port $P_2$ through the decompression line $L_2$.

If a power supply system or control system connected to the coil 320 is defective, no electromagnetic force is generated even if the coil 320 is energized, the drive piston 316 cannot be moved by the pressing piston 319, and no control pressure can be supplied to the pressure supply unit 324 by communicatively connecting the hyperbaric port $P_1$ and the control pressure port $P_3$.

However, in the present embodiment, the external piston 318 is freely movably provided above the flange 316b in the drive piston 316 and the external pressure chamber $R_5$ is demarcated above the external piston 318. An external pressure from the input unit 326 is raised, and a high-pressure hydraulic oil is converted to a predetermined pressure by the pressure conversion unit 325 and output to the external pressure line L5 to be supplied to the external pressure chamber R5 through the external pressure port PS, whereby the external piston 318 is pressed downward to press the drive piston 316 downward via the flange 316b. Then, the drive piston 316 moves downward against energizing force of the return spring 317 and the second connection port 321b is communicatively connected to the hyperbaric port $P_1$ while the first connection port 321a of the drive piston 316 remains communicatively connected to the pressure chamber $R_3$.

Therefore, while the hyperbaric port $P_1$ and the control pressure port $P_3$ are communicatively connected by the pressure chamber $R_3$ and the communicating hole 321, the decompression port $P_2$ and the control pressure port $P_3$ are blocked, and like the foregoing, a high-pressure hydraulic oil is supplied from the hyperbaric source 322 to the hyperbaric port $P_1$, which then flows from the second connection port 321b into the communicating hole 321, then flows to the pressure chamber $R_3$ from the first connection port 321a before being supplied to the pressure supply unit 324 as a control pressure from the control pressure port $P_3$ through the control line $L_3$. Thus, even if a power supply system or control system is defective, pressure control can properly be performed.

In a pressure controller in the fourth embodiment as described above, the pressing piston 319 and drive piston 316 are serially arranged and freely movably supported in the housing 311, the control pressure port $P_3$ is supported by being energized so as to make it communicatively connectible to the decompression port $P_2$ through the communicating hole 321, and the drive piston 316 is moved by an electromagnetic force of a solenoid via the pressing piston 319 to make the hyperbaric port $P_1$ and the control pressure port $P_3$ communicatively connectible through the communicating hole 321. In addition, by freely movably supporting the external piston 318 on an outer circumference of the drive piston 316 to demarcate the external pressure chamber $R_5$ above, an external pressure from the input unit 326 is made suppliable to the external pressure chamber $R_5$ from the external pressure line $L_5$ through the external pressure port $P_5$.

Therefore, even when a power supply system or control system is defective, by supplying an external pressure from the input unit 326 to the external pressure chamber $R_5$, a driving force can be transmitted to the drive piston 316 to move the drive piston 316 downward to communicatively connect the hyperbaric port $P_1$ and the control pressure port $P_3$ through the communicating hole 321 so that a hydraulic oil of the hyperbaric port $P_1$ can reliably be supplied to the control pressure port $P_3$ before being supplied to the pressure supply unit 324 as a control pressure. As a result, pressure control can properly be performed without using a switching mechanism or the like separately and when the power supply system and control system work normally, an external pressure does not affect the drive piston 316 so that reliability can be improved.

Also in the present embodiment, a pressure controller of the present invention is configured as a spool type three-way valve. Therefore, the second connection port 321b is switched between the hyperbaric port $P_1$ and decompression port $P_2$ by moving the drive piston 316 upward or downward by means of an electromagnetic force, and a control pressure can be output from the control pressure port $P_3$ to the pressure supply unit 324 or a control pressure in the pressure supply unit 324 can be discharged from the decompression port $P_2$ by communicatively connecting the hyperbaric port $P_1$ or decompression port $P_2$ to the control pressure port $P_3$ through the communicating hole 321. As a result, the communicating state and blocked state of the hyperbaric port $P_1$ and the decompression port $P_2$ with the control pressure port $P_3$ (pressure chamber $R_3$) can easily be switched by moving the drive piston 316 and thus, the control pressure can easily be regulated.

Fifth Embodiment

Figure 6:
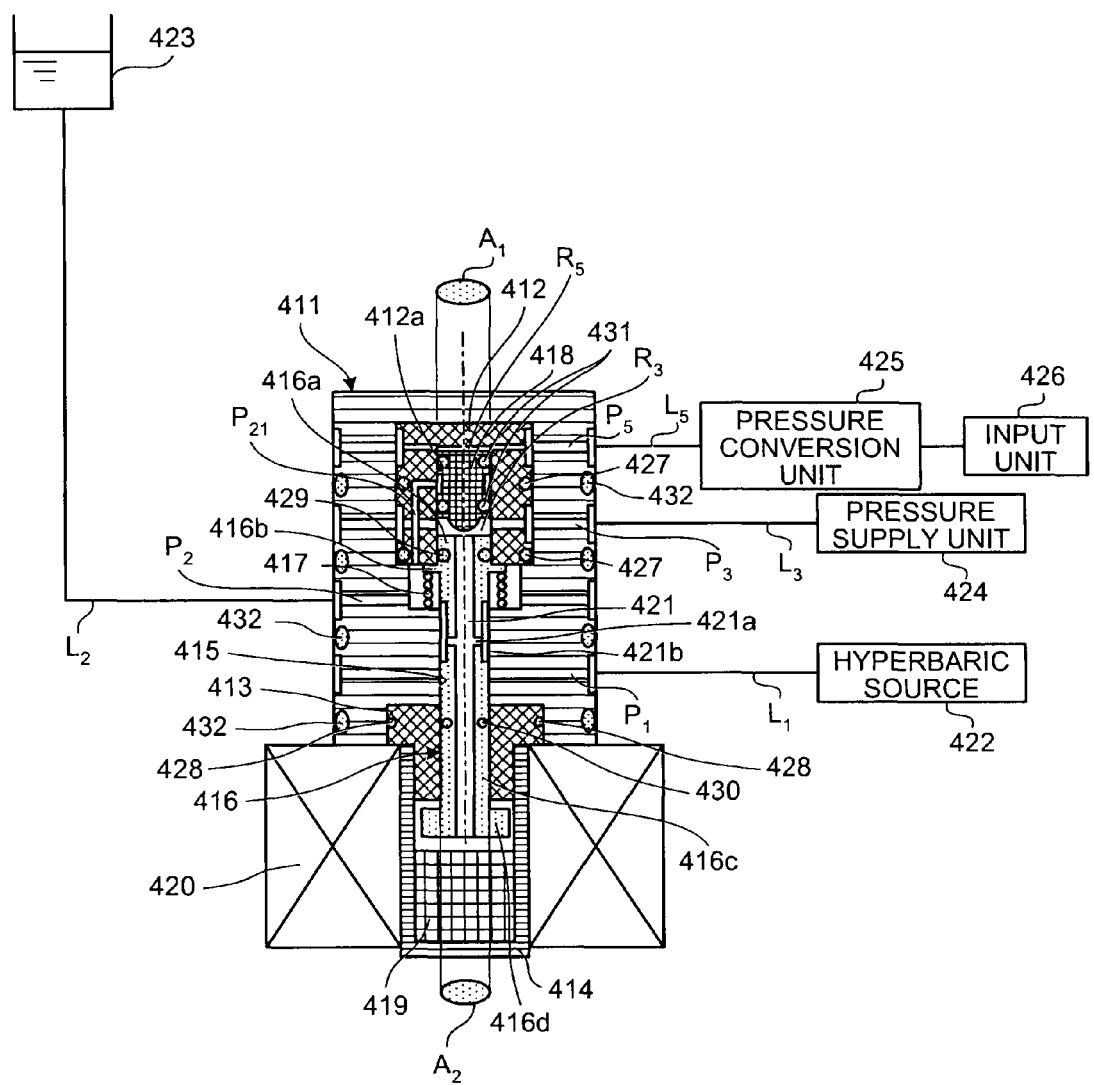
FIG. 6 is a schematic block diagram showing a pressure controller according to a fifth embodiment of the present invention.

FIG. 6 is a schematic block diagram showing a pressure controller according to a fifth embodiment of the present invention.

In a spool type three-way valve as a pressure controller in the fifth embodiment, as shown in FIG. 6, a housing 411 has an upper support block 412 internally fitted and also a lower support block 413 internally fitted and the inside of the housing 411 is in a sealed state by a case 414 being fitted into the lower support block 413. Inside the housing 411, a bearing hole 415 is formed along the vertical direction and a drive piston 416 freely movably supported in the central part of the bearing hole 415.

The drive piston 416 includes a first supporter 416a formed in a cylindrical shape at an upper end, a first flange 416b formed in an upper part, a second supporter 416c formed in a lower part, and a second flange 416d formed at a lower end, and the second supporter 416c is freely movably supported along the vertical direction by fitting into the bearing hole 415. Then, a return spring (energizing unit) 417 is set between the housing 411 and first flange 416b of the drive piston 416.

Therefore, the drive piston 416 is freely movably supported along the vertical direction by the bearing hole 415 of the housing 411 and also supported by being energized upward by energizing force of the return spring 417 and the first flange 416b is positioned by being in contact with the undersurface of the upper support block 412.

In addition, the upper support block 412 has a bearing hole 412a formed to open downward and an external piston 418 in a cylindrical shape is vertically freely movably fitted into the bearing hole 412a. The external piston 418 is arranged serially with the drive piston 416.

Inside the case 414, on the other hand, an attraction member 419 made of iron is fixed and a coil 420 is wound outside the case 414 facing the attraction member 419. The attraction member 419 faces the second flange 416d of the drive piston 416 with a predetermined spacing therebetween.

Therefore, the drive piston 416 is energized upward by energizing force of the return spring 417 and positioned by the first flange 416b being in contact with the upper support block 412. Then, an electromagnetic force is generated by passing a current to the coil 420, the second flange 416d is attracted by attraction of the attraction member 419 and thus, the drive piston 416 can move downward against energizing force of the return spring 417.

In the present embodiment, a drive valve of the present invention includes the drive piston 416 and a solenoid of the present invention includes the attraction member 419 and the coil 420.

Since, in a pressure controller in the present embodiment, the drive piston 416 and the external piston 418 are freely movably supported inside the housing 411, as described above, the pressure chamber $R_3$ demarcated by the housing 411, upper support block 412, drive piston 416, and external piston 418 is provided. Also, the drive piston 416 has a communicating hole 421 formed by cutting through the central part thereof in the vertical direction to communicatively connect to the pressure chamber $R_3$, a connection port 421a opening toward the outside is formed by communicatively connecting to the communicating hole 421 and also a connection groove 421b is formed on an outer circumference of the drive piston 416 by communicatively connecting to the connection port 421a.

Moreover, the hyperbaric port $P_1$ communicatively connectible to the connection groove 421b is formed by cutting through the housing 411, and the decompression port $P_2$ communicatively connectible to the connection groove 321b is formed by cutting through the housing 411. Also, the control pressure port $P_3$ communicatively connected to the pressure chamber $R_3$ is formed by cutting through the housing 411. In this case, the hyperbaric port $P_1$ and the decompression port $P_2$ function as the first port of the present invention and the control pressure port $P_3$ functions as the second port of the present invention. The hyperbaric port $P_1$ is connected to a hyperbaric source 422 via the hyperbaric line $L_1$, the decompression port $P_2$ is connected to a reservoir tank 423 via the decompression line $L_2$, and the control pressure port $P_3$ is connected to a pressure supply unit 424 via the control line $L_3$. The decompression port $P_2$ is communicatively connected to an outer circumference of the external piston 418 via a chamber in which the return spring 417 is accommodated and a connection port $P_{21}$.

In this case, the outside diameters of the supporters 416a and 416c of the drive piston 416 are set so that the pressure receiving area $A_1$ in the first supporter 416a of the drive piston 416 and the pressure receiving area $A_2$ in the second supporter 416c of the drive piston 416 satisfy the relation $A_1 < A_2$. Thus, it is sufficient that an electromagnetic force provided when the drive piston 416 moves downward, that is, the current value passed to the coil 420 is such that a resultant force of a driving force corresponding to a difference of pressure receiving areas $A_2 - A_1$ in the front and the rear of the drive piston 416, an energizing force of the return spring 417, and a driving force corresponding to various kinds of sliding resistance and power consumption can be reduced by setting the difference of pressure receiving areas $A_2 - A_1$ to a small value.

Also, the external pressure chamber $R_5$ is demarcated by the housing 411, upper support block 412, and external piston 418, to form the external pressure port $P_5$ communicatively connected to the external pressure chamber $R_5$ by cutting through the housing 411, and the external pressure port $P_5$ is connected to a pressure conversion unit 425 and an input unit (pressure control unit) 426 via the external pressure line $L_5$.

In this case, a control pressure supplied from the control pressure port $P_3$ to the pressure supply unit 424 via the control line $L_3$ acts as an upward force on the external piston 418 from the pressure chamber $R_3$. On the other hand, an external pressure is introduced into the external pressure chamber $R_5$ from the input unit 426 by the pressure conversion unit 425 via the external pressure line $L_5$ and external pressure port $P_5$ and the external pressure acts on the external piston 418 as a downward force. In the present embodiment, the external pressure is set to the aforementioned control pressure.

Then, the external piston 418 freely movably fitted into the bearing hole 412*a* of the upper support block 412 has the same pressure receiving area from the pressure chamber $R_3$ as that from the external pressure chamber $R_5$, that is, the relation: control pressure×pressure receiving area of the external piston 418=external pressure×pressure receiving area of the external piston 418 holds and the external piston 418 is in a floating state, preventing the external piston 418 from being stuck to the upper support block 412.

Therefore, when the coil 420 is not energized, the drive piston 416 is positioned by energizing force of the return spring 417 by being in contact with the upper support block 412, and the decompression port $P_2$ and the control pressure port $P_3$ are communicatively connected through the communicating hole 421 by the communicating hole 421 of the drive piston 416 being communicatively connected to the pressure chamber $R_3$ and the connection port 421*a* and connection groove 421*b* being communicatively connected to the decompression port $P_2$.

Then, when the coil 420 is energized, the drive piston 416 moves downward against energizing force of the return spring 417. Then, the hyperbaric port $P_1$ and the control pressure port $P_3$ can communicatively connected through the communicating hole 421 by the connection port 421*a* and connection groove 421*b* being communicatively connected to the hyperbaric port $P_1$ while the communicating hole 421 of the drive piston 416 being communicatively connected to the pressure chamber $R_3$.

With a seal member 427 set between the housing 411 and upper support block 412, a seal member 428 set between the housing 411 and lower support block 413, seal members 429 and 430 set between the support blocks 412 and 413 and the drive piston 416, and a seal member 431 set between the upper support block 412 and external piston 418, the sealing nature is ensured. Moreover, the housing 411 is supported by a casing (not shown) and a seal member 432 is set between the housing 411 and the casing to ensure the sealing nature.

Here, pressure control by the aforementioned pressure controller in the present embodiment will be described in detail.

In a pressure controller in the present embodiment, when the coil 420 is demagnetized, the drive piston 416 is positioned by being in contact with the upper support block 412 due to the return spring 417 and, while the communicating hole 421 of the drive piston 416 is communicatively connected to the pressure chamber $R_3$, the connection port 421*a* and connection groove 421*b* are communicatively connected to the decompression port $P_2$. Therefore, while the decompression port $P_2$ and the control pressure port $P_3$ are communicatively connected by the pressure chamber $R_3$ and the communicating hole 421, the hyperbaric port $P_1$ and the control pressure port $P_3$ are blocked.

If the coil 420 is energized in this state, the drive piston 416 moves downward due to a generated electromagnetic force against energizing force of the return spring 417. Since, at this time, a control pressure acting on the external piston 418 from the pressure chamber $R_3$ is equal to an external pressure acting from the external pressure chamber $R_5$, the drive piston 416 can properly be moved downward without a driving force for moving the drive piston 416 downward being adversely affected by the control pressure or external pressure.

Then, when the drive piston 416 moves downward, the connection port 421*a* and connection groove 421*b* are switched from the decompression port $P_2$ to the hyperbaric port $P_1$ for communicative connection while the communicating hole 421 of the drive piston 416 remains communicatively connected to the pressure chamber $R_3$. Thus, while the hyperbaric port $P_1$ and the control pressure port $P_3$ are communicatively connected by the pressure chamber $R_3$ and the communicating hole 421, the decompression port $P_2$ and the control pressure port $P_3$ are blocked.

Therefore, a pressure acting from the hyperbaric source 422 through the hyperbaric port $P_1$, that is, a high-pressure hydraulic oil flows from the connection groove 421*b* through the connection port 421*a* into the communicating hole 421, then flows from the communicating hole 421 to the pressure chamber $R_3$ before being supplied to the pressure supply unit 424 as a control pressure from the control pressure port $P_3$ through the control line $L_3$.

Then, if the current value passed to the coil 420 is reduced in this state, as a result of a reduced generated electromagnetic force, the drive piston 416 moves upward due to energizing force of the return spring 417. Then, the connection port 421*a* and connection groove 421*b* are switched from the hyperbaric port $P_1$ to the decompression port $P_2$ for communicative connection while the communicating hole 421 of the drive piston 416 remains communicatively connected to the pressure chamber $R_3$. Thus, while the decompression port $P_2$ and the control pressure port $P_3$ are communicatively connected by the pressure chamber $R_3$ and the communicating hole 421, the hyperbaric port $P_1$ and the control pressure port $P_3$ are blocked.

Therefore, a control pressure acting on the pressure supply unit 424 from the pressure chamber $R_3$ through the control pressure port $P_3$ and the control line $L_3$, that is, a hydraulic oil flows from the pressure chamber $R_3$ to the communicating hole 421 and then flows to the decompression port $P_2$ via the connection port 421*a* and connection groove 421*b* before being discharged to the reservoir tank 423 from the decompression port $P_2$ through the decompression line $L_2$.

If a power supply system or control system connected to the coil 420 is defective, no electromagnetic force is generated even if the coil 420 is energized, the drive piston 416 cannot be moved, and no control pressure can be supplied to the pressure supply unit 424 by communicatively connecting the hyperbaric port $P_1$ and the control pressure port $P_3$.

However, in the present embodiment, the external piston 418 is freely movably provided above the drive piston 416 and the external pressure chamber $R_5$ is demarcated above the external piston 418. An external pressure from the input unit 426 is raised, and a high-pressure hydraulic oil is converted to a predetermined pressure by the pressure conversion unit 425 and output to the external pressure line L5 to be supplied to the external pressure chamber R5 through the external pressure port PS, whereby the external piston 418 is pressed downward to press the drive piston 416 downward. Then, the drive piston 416 moves downward against energizing force of the return spring 417 and the connection port 421*a* and connection groove 421*b* are communicatively connected to the hyperbaric port $P_1$ while the communicating hole 421 of the drive piston 416 remains communicatively connected to the pressure chamber $R_3$.

Therefore, while the hyperbaric port $P_1$ and the control pressure port $P_3$ are communicatively connected by the pressure chamber $R_3$ and the communicating hole 421, the decompression port $P_2$ and the control pressure port $P_3$ are blocked, and like the foregoing, a high-pressure hydraulic oil is supplied from the hyperbaric source 422 to the hyperbaric port $P_1$, which then flows from the connection groove 421*b* through the connection port 421*a* into the communicating hole 421, then flows to the pressure chamber $R_3$ from the communicating hole 421 before being supplied to the pressure supply unit 424 as a control pressure from the control pressure port $P_3$ through the control line $L_3$. Thus, even if a power supply system or control system is defective, pressure control can properly be performed.

In a pressure controller in the fifth embodiment as described above, the drive piston 416 is freely movably supported in the housing 411, the control pressure port $P_3$ is supported by being energized so as to make it communicatively connectible to the decompression port $P_2$ through the communicating hole 421, and the drive piston 416 is moved by an electromagnetic force of a solenoid to make the hyperbaric port $P_1$ and the control pressure port $P_3$ communicatively connectible through the communicating hole 421. In addition, by freely movably supporting the external piston 418 above the drive piston 416 to demarcate the external pressure chamber $R_5$ above, an external pressure from the input unit 426 is made suppliable to the external pressure chamber $R_5$ from the external pressure line $L_5$ through the external pressure port $P_5$.

Therefore, even when a power supply system or control system is defective, by supplying an external pressure from the input unit 426 to the external pressure chamber $R_5$, a driving force can be transmitted to the drive piston 416 to move the drive piston 416 downward to communicatively connect the hyperbaric port $P_1$ and the control pressure port $P_3$ through the communicating hole 421 so that a hydraulic oil of the hyperbaric port $P_1$ can reliably be supplied to the control pressure port $P_3$ before being supplied to the pressure supply unit 424 as a control pressure. As a result, pressure control can properly be performed without using a switching mechanism or the like separately and when the power supply system and control system work normally, an external pressure does not affect the drive piston 416, whereby reliability can be improved.

Also in the present embodiment, the external piston 418 is serially arranged above the drive piston 416 and the coil 420 is arranged below the housing 411 so that the drive piston 416 can be attracted by an electromagnetic force. Therefore, by readily accommodating the external piston 418 inside the housing 411, assembliability can be improved and also the controller can be made more compact.

Sixth Embodiment

Figure 7:
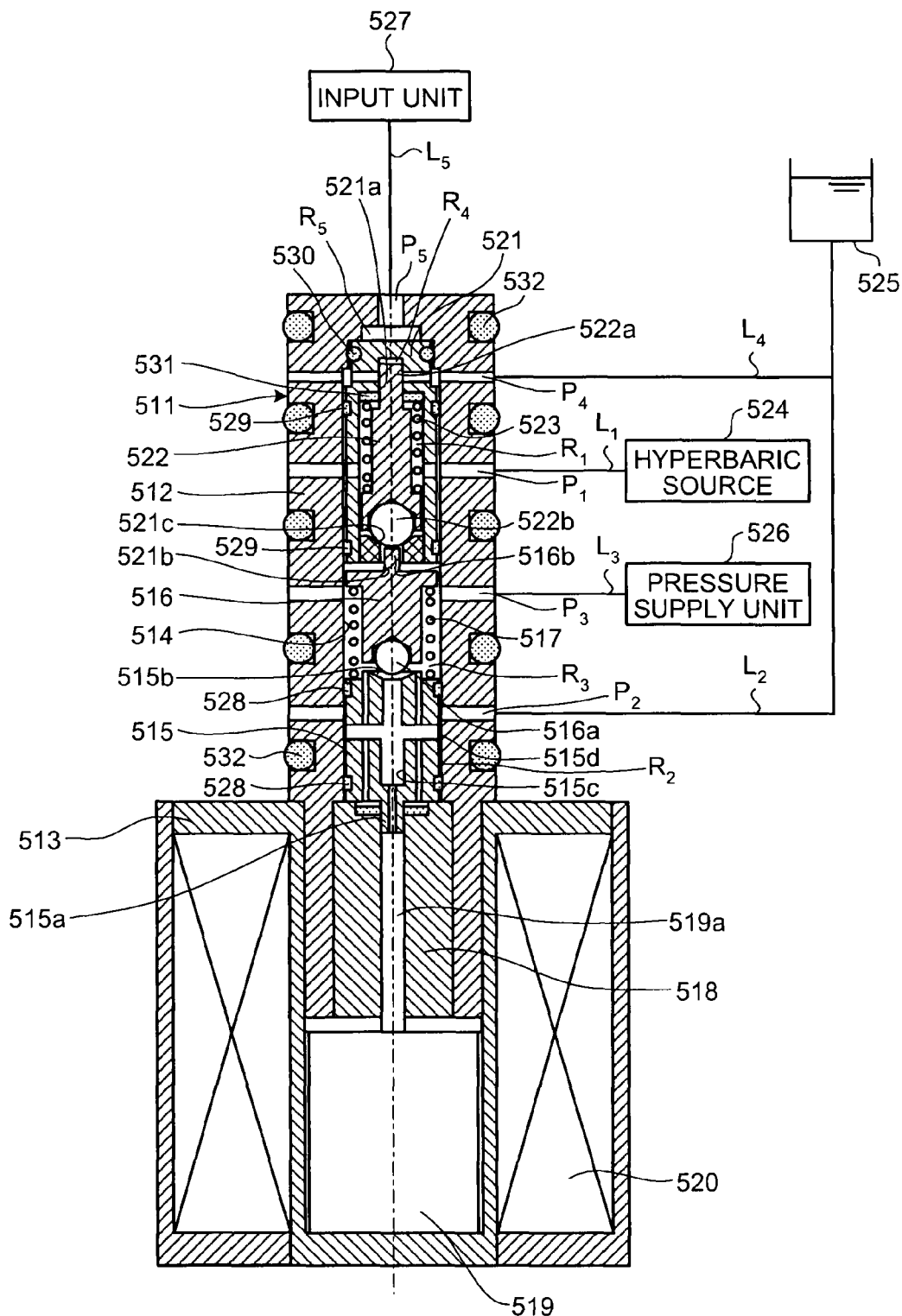
FIG. 7 is a schematic block diagram showing a pressure controller according to a sixth embodiment of the present invention.

FIG. 7 is a schematic block diagram showing a pressure controller according to a sixth embodiment of the present invention.

In a poppet type three-way valve as a pressure controller in the sixth embodiment, as shown in FIG. 7, a housing 511 having a hollow cylindrical shape includes an upper housing 512 and a lower housing 513 and the upper housing 512 and the lower housing 513 are integrally fixed by a portion of the upper housing 512 being fitted into the lower housing 513 and the inside thereof is in a sealed state.

The housing 511 has a bearing hole 514 formed by cutting through a central part thereof in the vertical direction. Then, a drive piston (second piston) 515 and an intermediate piston (second piston) 516 are freely movably fitted into the bearing hole 514. The drive piston 515 in a cylindrical shape has a connection part 515a formed at a base end thereof (lower end in FIG. 7) and a valve seat 515b formed at a tip part thereof (upper end in FIG. 7). The intermediate piston 516 in a cylindrical shape has a ball 516a to be seated in the valve seat 515b attached to one end thereof (lower end in FIG. 7) and a pressing part 516b formed at another end (upper end in FIG. 7). Then, a return spring (energizing unit) 517 is set between the drive piston 515 and intermediate piston 516 and the ball 516a is separated from the valve seat 515b by supporting the drive piston 515 and intermediate piston 516 by being energized in a direction to separate from each other by energizing force of the return spring 517.

Moreover, a guide 518 made of iron is fixed to a lower part of the upper housing 512 and, in the lower housing 513, a pressing piston 519 is freely movably supported along the vertical direction and a coil 520 is wound around the outside thereof facing the guide 518 and pressing piston 519. Then, a tip part of a rod 519a of the pressing piston 519 is in contact with the connection part 515a of the drive piston 515 by cutting through the guide 518.

Therefore, the drive piston 515 is energized downward by energizing force of the return spring 517 and positioned by the connection part 515a being in contact with the rod 519a of the pressing piston 519. Then, an electromagnetic force is provided to the guide 518 by passing a current to the coil 520 and when the pressing piston 519 is moved upward by attraction of the guide 518, the drive piston 515 is pressed by the pressing piston 519 so that the valve seat 515b can be caused to be seated in the ball 516a by moving the drive piston 515 against energizing force of the return spring 517.

In the present embodiment, a drive valve of the present invention includes the drive piston 515, intermediate piston 516, and pressing piston 519 and a solenoid of the present invention includes the guide 518 and the coil 520.

An external piston 521 in a cylindrical shape positioned above the intermediate piston 516 is freely movably fitted into the bearing hole 514 of the housing 511 and a pressure control valve 522 is disposed in the central part of the external piston 521. The external piston 521 has a blocked upper part, a guide part 521a formed therein, a through hole 521b formed in a lower part thereof and a valve seat 521c. The pressure control valve 522 is accommodated in the external piston 521 and has a rod part 522a freely movably fitted into the guide part 521a formed in an upper part and a ball 522b seated in the valve seat 521c formed in a lower part. Then, a return spring (energizing unit) 523 is set between the external piston 521 and pressure control valve 522 and the ball 522b is caused to be seated in the valve seat 521c by supporting the pressure control valve 522 by being energized by energizing force of the return spring 523 toward the intermediate piston 516 with respect to the external piston 521. The intermediate piston 516 is supported by being energized by energizing force of the return spring 517 toward the external piston 521 and pressure control valve 522 and the pressing part 516b is in contact with the ball 522b via the through hole 521b. In this case, energizing force of the return spring 523 is set to be larger than that of the return spring 517.

Since, in a pressure controller in the present embodiment, the drive piston 515, intermediate piston 516, external piston 521 and pressure control valve 522 are freely movably supported inside the housing 511, as described above, the hyperbaric chamber $R_1$ demarcated by the external piston 521 and pressure control valve 522, the decompression chamber $R_2$ demarcated by the upper housing 512 and drive piston 515, and the pressure chamber $R_3$ demarcated by the upper housing 512 and intermediate piston 516 are provided.

Then, the hyperbaric port $P_1$ communicatively connected to the hyperbaric chamber $R_1$ is formed by cutting through the upper housing 512 and external piston 521, and also the decompression port $P_2$ communicatively connected to the decompression chamber $R_2$ is formed by cutting through the upper housing 512. Also, the control pressure port $P_3$ communicatively connected to the pressure chamber $R_3$ is formed by cutting through the upper housing 512. In this case, the hyperbaric port $P_1$ and the decompression port $P_2$ function as the first port of the present invention and the control pressure port $P_3$ functions as the second port of the present invention. The hyperbaric port $P_1$ is connected to a hyperbaric source 524 via the hyperbaric line $L_1$, the decompression port $P_2$ is connected to a reservoir tank 525 via the decompression line $L_2$, and the control pressure port $P_3$ is connected to a pressure supply unit 526 via the control line $L_3$.

Since, in this case, the outside diameter of the pressing part 516b of the intermediate piston 516 is larger than the inside diameter of the through hole 521b of the external piston 521, the hyperbaric chamber $R_1$ and the pressure chamber $R_3$ can be communicatively connected through the through hole 521b, and the hyperbaric chamber $R_1$ and pressure chamber $R_3$ can be blocked by the ball 522b of the pressure control valve 522 being seated in the valve seat 521c of the external piston 521 after relative movement of the pressure control valve 522 and external piston 521. The drive piston 515 also has a through hole 515c formed along an axial direction and a through hole 515d formed along a diameter direction to intersect the through hole 515c for communicative connection. The decompression chamber $R_2$ and the pressure chamber $R_3$ can be communicatively connected by the through holes 515c and 515d and the decompression chamber $R_2$ and the pressure chamber $R_3$ can be blocked by the ball 516a of the intermediate piston 516 being seated in the valve seat 515b of the drive piston 515 after relative movement of the drive piston 515 and intermediate piston 516.

Also, the external pressure chamber $R_5$ is demarcated by the upper housing 512 and external piston 521 to form the external pressure port $P_5$ communicatively connected to the external pressure chamber $R_5$ by cutting through the upper housing 512, and the external pressure port $P_5$ is connected to an input unit (pressure control unit) 527 via the external pressure line $L_5$. Further, the pressure regulated chamber $R_4$ is demarcated by the external piston 521 and pressure control valve 522 to form the pressure regulating port $P_4$ communicatively connected to the pressure regulated chamber $R_4$, and the pressure regulating port $P_4$ is connected to the reservoir tank 525 via the pressure regulating line $L_4$.

In this case, in the present embodiment, the drive piston 515, intermediate piston 516, external piston 521, and pressure control valve 522 are relatively freely movably supported coaxially inside the housing 511, the coil 520 constituting a solenoid is provided on the drive piston 515 side of the housing 511, and the external pressure port $P_5$ of the input unit 527 is provided on the external piston 521 side of the housing 511. Then, while a control pressure acts on the drive piston 515 from the pressure chamber $R_3$ on the pressure supply unit 526 side, an external pressure acts on the external piston 521 from the external pressure chamber $R_5$ on the input unit 527 side and the control pressure and the external pressure are equal. That is, the control pressure on the drive piston 515 from the pressure chamber $R_3$ corresponds to a pressure receiving area of the drive piston 515 and the external pressure on the external piston 521 from the external pressure chamber $R_5$ corresponds to a pressure receiving area of the external piston 521. Thus, the outside diameters of the drive piston 515 and external piston 521 are determined so that the pressure receiving area of the drive piston 515 becomes larger than that of the external piston 521.

Therefore, when the coil 520 is not energized, the drive piston 515 is positioned by energizing force of the return spring 517 by being in contact with the guide 518, and the ball 516a of the intermediate piston 516 is separated from the valve seat 515b of the drive piston 515 to open the passage. At this time, the ball 522a of the pressure control valve 522 is seated in the valve seat 521c of the external piston 521 due to energizing force of the return spring 523 to block the passage.

Then, when the coil 520 is energized, the pressing piston 519 moves upward due to attraction of the guide 518 to press against the drive piston 515 and the drive piston 515 moves upward against energizing force of the return spring 517. Then, the passage can be blocked by the ball 516a of the intermediate piston 516 being seated in the valve seat 515b of the drive piston 515. When the drive piston 515 further moves, the drive piston 515 moves upward together with the intermediate piston 516 so that the pressing part 516b of the intermediate piston 516 presses against the pressure control valve 522 via the ball 522b. Then, the pressure control valve 522 moves upward against energizing force of the return spring 523 to separate the ball 522b from the valve seat 521c so that the passage can be opened.

With seal members 528, 529, and 530 set between the housing 511 and drive piston 515 and a seal member 531 set between the external piston 521 and pressure control valve 522, the sealing nature is ensured. Moreover, the housing 511 is supported by a casing (not shown) and a seal member 532 is set between the housing 511 and the casing to ensure the sealing nature.

Here, pressure control by the aforementioned pressure controller in the present embodiment will be described in detail.

In a pressure controller in the present embodiment, when the coil 520 is demagnetized, the valve seat 515b of the drive piston 515 is positioned by the return spring 517 separated from the ball 516a and the ball 522b of the pressure control valve 522, on the other hand, is seated in the valve seat 521c due to energizing force of the return spring 523, which is larger that that of the return spring 517. Therefore, the hyperbaric chamber $R_1$ and the control pressure chamber $R_3$ are blocked and the control pressure port $P_3$ and the decompression port $P_2$ are communicatively connected.

If the coil 520 is energized in this state, the pressing piston 519 moves upward due to a generated electromagnetic force to press against the drive piston 515 and moves upward against energizing force of the return spring 517. Then, if the drive piston 515 moves upward, first the valve seat 515b is seated in the ball 516a of the intermediate piston 516 to block the through holes 515c and 515d and when the drive piston 515 further moves upward, next the pressing part 516b of the intermediate piston 516 moves the pressure control valve 522 upward against energizing force of the return spring 523. Then, the ball 522b of the pressure control valve 522 separates from the valve seat 521c of the external piston 521 to open the through hole 521b.

Therefore, the decompression chamber $R_2$ and the control pressure chamber $R_3$ are blocked by the valve seat 515b of the drive piston 515 being seated in the ball 516a of the intermediate piston 516, and the hyperbaric chamber $R_1$ and pressure chamber $R_3$ are communicatively connected by the ball 522b of the pressure control valve 522 being separated from the valve seat 521c of the external piston 521. Thus, a pressure acting on the hyperbaric chamber $R_1$ from the hyperbaric source 524 through the hyperbaric port $P_1$, that is, a high-pressure hydraulic oil flows to the pressure chamber $R_3$ by passing through a gap between the ball 522b of the pressure control valve 522 and valve seat 521c of the external piston 521 before being supplied to the pressure supply unit 526 as a control pressure from the control pressure port $P_3$ through the control line $L_3$.

Then, if the current value passed to the coil 520 is reduced in this state, as a result of a reduced generated electromagnetic force, the pressing piston 519 moves downward to reduce a pressing pressure on the drive piston 515 and the drive piston 515 moves downward due to energizing force of the return spring 517. Then, while the through holes 515c and 515d remain blocked with the ball 516a of the intermediate piston 516 seated in the valve seat 515b of the drive piston 515, the pressure control valve 522 moves downward due to energizing force of the return spring 523 to block the through hole 521b by the ball 522b being seated in the valve seat 521c of the external piston 521. When the drive piston 515 further moves downward, the valve seat 515b is separated from the ball 516a of the intermediate piston 516 due to energizing force of the return spring 517 to open the through holes 515c and 515d.

Therefore, the hyperbaric chamber $R_1$ and the control pressure chamber $R_3$ are blocked by the ball 522b of the pressure control valve 522 being seated in the valve seat 521c of the external piston 521, and the decompression chamber $R_2$ and pressure chamber $R_3$ are communicatively connected by the valve seat 515b of the drive piston 515 being separated from the ball 516a of the intermediate piston 516. Thus, a control pressure acting on the pressure supply unit 526 from the pressure chamber $R_3$ through the control pressure port $P_3$ and the control line $L_3$, that is, a hydraulic oil flows from the through holes 515c and 515d to the decompression chamber $R_2$ by passing through a gap between the valve seat 515b of the drive piston 515 and ball 516a of the intermediate piston 516 before being discharged to the reservoir tank 525 from the decompression port $P_2$ through the decompression line $L_2$.

If a power supply system or control system connected to the coil 520 is defective, no electromagnetic force is generated even if the coil 520 is energized, the drive piston 515 and pressure control valve 522 cannot be moved by the pressing piston 519, and no control pressure can be supplied to the pressure supply unit 526 by communicatively connecting the hyperbaric port $P_1$ and the pressure chamber $R_3$.

However, in the present embodiment, the external piston 521 is provided above the intermediate piston 516 and the external piston 521 is pressed downward by outputting a high-pressure hydraulic oil from the input unit 527 to the external pressure line $L_5$ before being supplied to the external pressure chamber $R_5$ from the external pressure port $P_5$. Then, the external piston 521 and pressure control valve 522 move downward against energizing force of the return spring 517 while pressing against the intermediate piston 516. The through holes 515c and 515d are blocked by the ball 516a of the intermediate piston 516 being seated in the valve seat 515b of the drive piston 515 and further, the ball 522b is pressed against energizing force of the return spring 523 by the pressing part 516b of the intermediate piston 516 before being separated from the valve seat 521c of the external piston 521 to open the through hole 521b.

Therefore, like the foregoing, while the decompression port $P_2$ and the control pressure port $P_3$ are blocked, the hyperbaric port $P_1$ and the control pressure port $P_3$ are communicatively connected, and a high-pressure hydraulic oil is supplied from the hyperbaric source 524 to the hyperbaric chamber $R_1$ through the hyperbaric port $P_1$, which then flows to the pressure chamber $R_3$ by passing a gap between the ball 522b of the pressure control valve 522 and valve seat 521c of the external piston 521 before being supplied to the pressure supply unit 526 as a control pressure from the control pressure port $P_3$ through the control line $L_3$. Thus, even if a power supply system or control system is defective, pressure control can properly be performed.

In a pressure controller in the sixth embodiment as described above, the drive piston 515, intermediate piston 516, external piston 521, and pressure control valve 522 are serially arranged in an axial center direction and freely movably supported inside the housing 511, the pressure chamber $R_3$ and decompression chamber $R_2$ are supported by being energized so as to make them communicatively connectible, and the drive piston 515, intermediate piston 516, and pressure control valve 522 are moved by means of an electromagnetic force of a solenoid to make the hyperbaric port $P_1$ and the control pressure port $P_3$ communicatively connectible. Also, the hyperbaric port $P_1$ and the control pressure port $P_3$ are made communicatively connectible by moving the external piston 521, pressure control valve 522, and intermediate piston 516 by means of an external pressure.

Therefore, even when a power supply system or control system is defective, by supplying an external pressure from the input unit 527 to the external pressure chamber $R_5$, the passage can be blocked by the ball 516a of the intermediate piston 516 being seated in the valve seat 515b of the drive piston 515 and the passage can be opened by separating the ball 522b of the pressure control valve 522 being seated in the valve seat 521c of the external piston 521 by moving the external piston 521, pressure control valve 522, and intermediate piston 516 and thus, a hydraulic oil in the hyperbaric chamber $R_1$ can reliably be supplied to the pressure chamber $R_3$ before being supplied to the pressure supply unit 526 as a control pressure. As a result, pressure can properly be controlled without using a switching mechanism or the like separately.

Also, in a pressure controller in the present embodiment, the drive piston 515, intermediate piston 516, external piston 521, and pressure control valve 522 are relatively freely movably supported coaxially inside the housing 511, the coil 520 constituting a solenoid is provided on the drive piston 515 side of the housing 511, and the external pressure port $P_5$ of the input unit 527 is provided on the external piston 521 side of the housing 511. Therefore, the passage can be blocked/opened and a hydraulic oil in the hyperbaric chamber $R_1$ can be supplied to the pressure chamber $R_3$ before being supplied to the pressure supply unit 526 by pressing the drive piston 515 or external piston 521. Thus, it becomes possible not only to improve operability of the drive piston 515 and external piston 521, but also to simplify the controller by improving mountability.

Further, in a pressure controller in the present embodiment, the external piston 521 has a cylindrical shape and the pressure control valve 522 is accommodated and relatively freely movably supported inside the external piston 521. Therefore, the intermediate piston 516 can be pressed and moved by the external piston 521 and also the pressure control valve 522 can be moved by the intermediate piston 516 and therefore, it becomes possible not only to improve operability, but also to simplify the controller.

Seventh Embodiment

Figure 8:
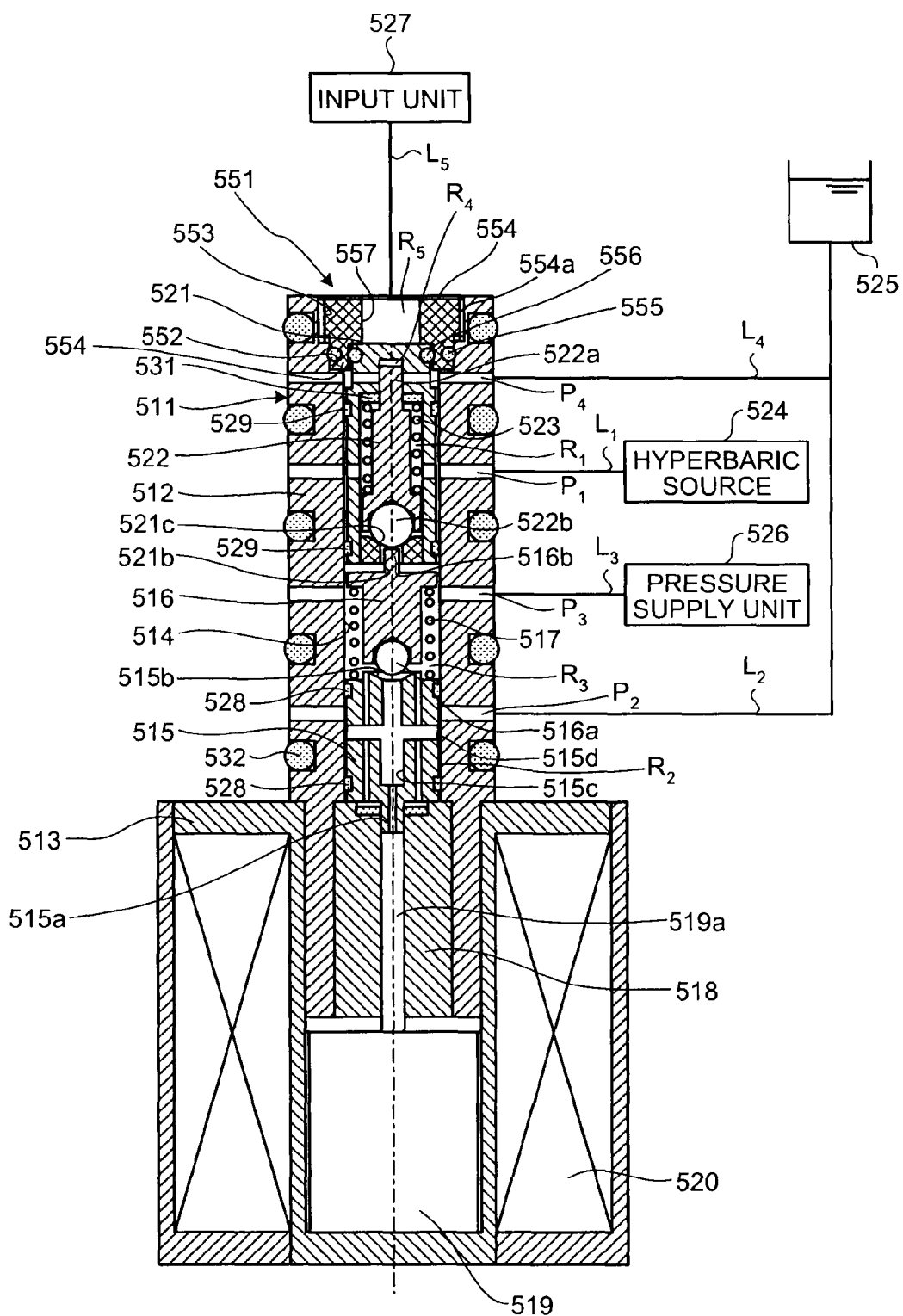
FIG. 8 is a schematic block diagram showing a pressure controller according to a seventh embodiment of the present invention.

FIG. 8 is a schematic block diagram showing a pressure controller according to a seventh embodiment of the present invention. The same numerals are attached to members having functions similar to those in the aforementioned embodiments to omit a duplicate description.

The basic structure of the pressure controller in the seventh embodiment is almost the same as that of the pressure controller of the aforementioned sixth embodiment and the only difference lies in that a positioning mechanism for adjusting the initial relative position between the drive valve and external piston is provided.

In a poppet type three-way valve as a pressure controller in the seventh embodiment, as shown in FIG. 8, a positioning mechanism 551 for adjusting an initial relative position between the drive valves (the drive piston 515 and intermediate piston 516) and the external piston 521 is provided in an upper part of the housing 511. That is, in the positioning mechanism 551, a mounting hole 552 communicatively connected to the bearing hole 514 and larger than the bearing hole 514 in diameter is formed in the upper part of the housing 511 (the upper housing 512) and also a screw hole 553 larger than the mounting hole 552 in diameter is formed. A positioning disc 554 has a thread part 554a formed in an outer circumference and also an annular part 554b projecting downward is integrally formed. Then, when the outer circumferential surface of the annular part 554b of the positioning disc 554 is fitted into the mounting hole 552 of the housing 551 via a seal member 555 and also the inner circumferential surface thereof is fitted into an outer circumference of the external piston 521 via a seal member 556 and the thread part 554a is screwed into the screw hole 553.

Therefore, the external piston 521 is supported by being energized upward by the return spring 523 and the external piston 521 is positioned by the top surface of the external piston 521 being in contact with the undersurface of the positioning disc 554. Thus, the positioning disc 554 can be moved vertically relative to the housing 511 by rotating the positioning disc 554 using a predetermined tool and with vertical movement of the positioning disc 554, the external piston 521 is vertically moved by energizing force of the return spring 523 so that the initial position thereof can be adjusted.

Moreover, a through hole 557 is formed in the central part of the positioning disc 554 and the through hole 557 is applied as the external pressure chamber $R_5$.

In a pressure controller in the seventh embodiment as described above, the positioning mechanism 551 for adjusting the initial relative position of the external piston 521 relative to the drive piston 515 and intermediate piston 516 is provided. Therefore, the initial relative position of the external piston 521 can be adjusted by the positioning mechanism 551 after assembling the drive piston 515, intermediate piston 516, external piston 521, pressure control valve 522 and the like in the housing 511 and consequently, it becomes possible not only to improve responsiveness with adjustable valve clearance, but also to save power requirements by means of a solenoid.

Eighth Embodiment

Figure 9:
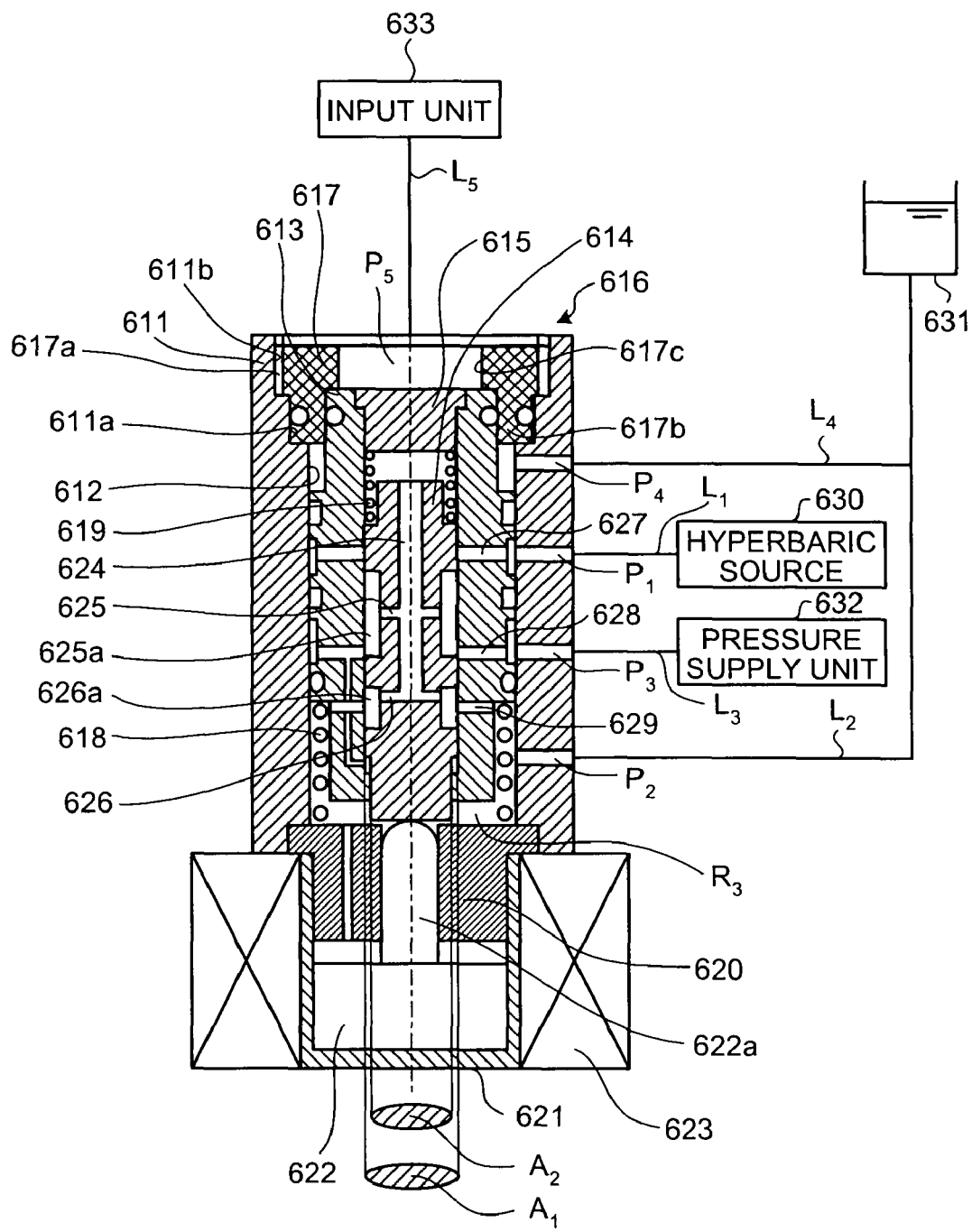
FIG. 9 is a schematic block diagram showing a pressure controller according to an eighth embodiment of the present invention.

FIG. 9 is a schematic block diagram showing a pressure controller according to an eighth embodiment of the present invention.

In a spool type three-way valve as a pressure controller in the eighth embodiment, as shown in FIG. 9, a housing 611 has a bearing hole 612 formed inside the housing 611 along the vertical direction, an external piston 613 in a cylindrical shape is freely movably supported along the axial direction in the bearing hole 612, and a drive piston 614 in a cylindrical shape is freely movably supported along the axial direction in the external piston 613.

While the lower end of the external piston 613 is open, a lid member 615 is fixed to the upper end thereof and a positioning mechanism 616 for adjusting the initial relative position of the external piston 613 is provided in the upper part of the housing 611. That is, a mounting hole 611a and a screw hole 611b communicatively connected to the bearing hole 612 and larger than the bearing hole 612 in diameter are formed in the upper part of the housing 611. A positioning disc 617, on the other hand, has a thread part 617a formed in the outer circumference thereof and also an annular part 617b projecting downward. Moreover, the annular part 617b of the positioning disc 617 is fitted into the mounting hole 611a of the housing 611 and the thread part 617a is screwed into the screw hole 611b.

Then, the external piston 613 is supported by being energized upward by a return spring (energizing unit) 618 set between the external piston 613 and a guide 620 described later, and the initial position of the external piston 613 is determined by the upper end of the external piston 613 being in contact with the positioning disc 617. Therefore, by moving the positioning disc 617 vertically with rotation thereof using a predetermined tool, the external piston 613 is moved vertically by energizing force of the return spring 618 to adjust the initial position thereof.

A return spring (energizing unit) 619 is set between the drive piston 614 and lid member 615 of the external piston 613 and the drive piston 614 is supported by being energized downward by energizing force of the return spring 619. In this case, the outside diameters of the return spring 619 are determined so that the pressure receiving area $A_1$ in the upper part of the drive piston 614 and the pressure receiving area $A_2$ in the lower part satisfy the relation $A_1 > A_2$.

In the lower part of the housing 611, on the other hand, the guide 620 made of iron is fixed and also a case 621 is fixed. Inside the case 621, a pressing piston 622 is freely movably supported along the vertical direction and a coil 623 is wound outside the case 621 facing the guide 620 and pressing piston 622. Moreover, a tip part of a rod 622a of the pressing piston 622 cuts through the guide 620 to be in contact with the undersurface of the drive piston 614.

Therefore, the drive piston 614 is energized downward by energizing force of the return spring 619 and positioned by the lower end surface thereof being in contact with the tip part of the rod 622a of the pressing piston 622. Then, an electromagnetic force is generated with a current passed to the coil 623, the pressing piston 622 is attracted by attraction of the guide 620, and the drive piston 614 is pressed by the pressing piston 622 moving upward so that the drive piston 614 can move upward against energizing force of the return spring 619.

In the present embodiment, a drive valve of the present invention includes the drive piston 614 and a solenoid of the present invention includes the guide 620 and the coil 623.

Since, in a pressure controller in the present embodiment, the external piston 613 and the drive piston 614 are freely movably supported inside the housing 611, as described above, the pressure chamber $R_3$ demarcated by the housing 611, external piston 613 and drive piston 614 is provided. Also, the drive piston 614 has a communicating hole 624 formed in the central part thereof along the axial direction and also two communicating holes 625 and 626 communicatively connected to the communicating hole 624 along the diameter direction. In addition, the drive piston 614 has connection ports 625a and 626a communicatively connected to the communicating holes 625 and 626 respectively in the outer circumference thereof along a circumferential direction.

Moreover, the hyperbaric port $P_1$ cutting through the housing 611 from the outside to the bearing hole 612, the decompression port $P_2$, and the control pressure port $P_3$ are formed. In this case, the hyperbaric port $P_1$ and the decompression port $P_2$ function as the first port of the present invention and the control pressure port $P_3$ functions as the second port of the present invention. Further, the external piston 613 has three connection holes 627, 628, and 629 cutting through inside and outside. The hyperbaric port $P_1$ is communicatively connectible to the connection port 625a via the connection hole 627, the decompression port $P_2$ is communicatively connectible to the connection port 625a via the connection hole 628, the control pressure port $P_3$ is communicatively connected to the pressure chamber $R_3$, and the pressure chamber $R_3$ is communicatively connected to the connection port 626a via the connection hole 629.

Then, the hyperbaric port $P_1$ is connected to a hyperbaric source 630 via the hyperbaric line $L_1$, the decompression port $P_2$ is connected to a reservoir tank 631 via the decompression line $L_2$, and the control pressure port $P_3$ is connected to a pressure supply unit 632 via the control line $L_3$.

Moreover, the housing 611 has the positioning disc 617 mounted in the upper part, a through hole 617c is formed in the central part of the positioning disc 617, the external piston 613 is exposed from the through hole 617c, and the external pressure chamber $R_5$ is formed from the through hole 617c. Also, the external pressure chamber $R_5$ is connected to an input unit (pressure control unit) 633 via the external pressure line $L_5$.

Therefore, when the coil 623 is not energized, the drive piston 614 is positioned by energizing force of the return spring 619 by being in contact with the tip part of the pressing piston 622, and while the communicating hole 624 of the drive piston 614 is communicatively connected to the pressure chamber $R_3$ through the communicating hole 626, connection port 626a, and connection hole 629, the decompression port $P_2$ and control pressure port $P_3$ are communicatively connected through the communicating hole 624 by the communicating hole 624 being communicatively connected to the decompression port $P_2$ through the communicating hole 625, connection port 625a, and connection hole 628.

Then, when the coil 623 is energized, the drive piston 614 moves upward against energizing force of the return spring 619. Then, the communicating hole 624 of the drive piston 614 and the decompression port $P_2$ are blocked while the communicating hole 624 remains communicatively connected to the pressure chamber $R_3$ and the hyperbaric port $P_1$ and control pressure port $P_3$ can communicatively be connected through the communicating hole 624 by the communicating hole 624 being communicatively connected to the hyperbaric port $P_1$ through the communicating hole 625, connection port 625a, and connection hole 627.

Here, pressure control by the aforementioned pressure controller in the present embodiment will be described in detail.

In a pressure controller in the present embodiment, when the coil 623 is demagnetized, the drive piston 614 is positioned by being in contact with the pressing piston 622 due to the return spring 619, and the communicating hole 624 of the drive piston 614 is communicatively connected to the pressure chamber $R_3$ and also to the decompression port $P_2$. Therefore, while the decompression port $P_2$ and control pressure port $P_3$ are communicatively connected by the pressure chamber $R_3$ and communicating hole 624, the hyperbaric port $P_1$ and control pressure port $P_3$ are blocked.

If the coil 623 is energized in this state, the pressing piston 622 moves upward due to a generated electromagnetic force to press against the drive piston 614 and the drive piston 614 moves upward against energizing force of the return spring 619. Then, when the drive piston 614 moves upward, the communicating hole 624 is communicatively connected after being switched from the decompression port $P_2$ to the hyperbaric port $P_1$ by the connection port 625a being cut off from the connection hole 628 and communicatively connected to the connection hole 627 while the communicating hole 624 of the drive piston 614 remains communicatively connected to the pressure chamber $R_3$. Thus, while the hyperbaric port $P_1$ and control pressure port $P_3$ are communicatively connected by the pressure chamber $R_3$ and communicating hole 624, the decompression port $P_2$ and control pressure port $P_3$ are blocked.

Therefore, a pressure acting from the hyperbaric source 630 through the hyperbaric port $P_1$, that is, a high-pressure hydraulic oil flows from the connection hole 627 to the communicating hole 624 via the connection port 625a and communicating hole 625, then flows from the communicating hole 624 to the pressure chamber $R_3$ via the communicating hole 626, connection port 626a, and connection hole 629 before being supplied to the pressure supply unit 632 as a control pressure from the control pressure port $P_3$ through the control line $L_3$. In this case, the position of the drive piston 614 is maintained when a driving force upward of the pressing piston 622 caused by an electromagnetic force and a reaction force of the drive piston 614 from an external pressure are balanced.

Then, if the current value passed to the coil 623 is reduced in this state, as a result of a reduced generated electromagnetic force, the pressing piston 622 and drive piston 614 move downward due to energizing force of the return spring 619. Then, the communicating hole 624 is communicatively connected after being switched from the hyperbaric port $P_1$ to the decompression port $P_2$ by the connection port 625a being cut off from the connection hole 627 and communicatively connected to the connection hole 628 while the communicating hole 624 of the drive piston 614 remains communicatively connected to the pressure chamber $R_3$. Thus, while the hyperbaric port $P_1$ and control pressure port $P_3$ are communicatively connected by the pressure chamber $R_3$ and communicating hole 624, the decompression port $P_2$ and control pressure port $P_3$ are blocked.

Therefore, a control pressure acting on the pressure supply unit 632 from the pressure chamber $R_3$ through the control pressure port $P_3$ and the control line $L_3$, that is, a hydraulic oil flows from the pressure chamber $R_3$ to the communicating hole 624 via the connection hole 629, connection port 626a, and communicating hole 626 and then flows from the communicating hole 624 to the decompression port $P_2$ via the communicating hole 625, connection port 625a, and connection hole 628 before being discharged to the reservoir tank 631 from the decompression port $P_2$ through the decompression line $L_2$.

If a power supply system or control system connected to the coil 623 is defective, no electromagnetic force is generated even if the coil 623 is energized, the drive piston 614 cannot be moved, and no control pressure can be supplied to the pressure supply unit 632 by communicatively connecting the hyperbaric port $P_1$ and the control pressure port $P_3$.

However, in the present embodiment, the external piston 613 is freely movably provided outside the drive piston 614 and the external pressure port $P_5$ is formed above the external piston 613. The external piston 613 is pressed downward by a high-pressure hydraulic oil being output to the external pressure line $L_5$ by raising an external pressure and supplied to the external pressure port $P_5$. Then, the external piston 613 moves downward against energizing force of the return spring 618 and the connection hole 628 and connection port 625a are blocked while the communicating hole 624 of the drive piston 614 and the pressure chamber $R_3$ remain communicatively connected by the connection port 629 of the external piston 613 and, on the other hand, the connection hole 627 and connection port 625*a* are communicatively connected and the communicating hole 624 and hyperbaric port $P_1$ are communicatively connected.

Therefore, while the hyperbaric port $P_1$ and the control pressure port $P_3$ are communicatively connected by the pressure chamber $R_3$ and the communicating hole 624, the decompression port $P_2$ and control pressure port $P_3$ are blocked and, like the foregoing, a high-pressure hydraulic oil is supplied from the hyperbaric source 630 to the hyperbaric port $P_1$, which flows from the connection hole 627 to the communicating hole 624 via the connection port 625*a* and communicating hole 625, then flows from the communicating hole 624 to the pressure chamber $R_3$ via the communicating hole 626, connection port 626*a*, and connection hole 629 before being supplied to the pressure supply unit 632 as a control pressure from the control pressure port $P_3$ through the control line $L_3$. Thus, even if a power supply system or control system is defective, pressure control can properly be performed.

In a pressure controller in the eighth embodiment as described above, the external piston 613 is freely movably supported inside the housing 611 and the drive piston 614 is freely movably supported inside the external piston 613 to support the control pressure port $P_3$ by being energized so as to make it communicatively connectible to the decompression port $P_2$ through the communicating hole 624. On the other hand, the hyperbaric port $P_1$ is made communicatively connectible to the control pressure port $P_3$ through the communicating hole 624 by moving the drive piston 614 by means of an electromagnetic force of a solenoid, and the hyperbaric port $P_1$ is made communicatively connectible to the control pressure port $P_3$ through the communicating hole 624 by action of an external pressure from the input unit 633 on the drive piston 614 to move the external piston 613.

Therefore, even when a power supply system or control system is defective, by supplying an external pressure from the input unit 633 to the external pressure port $P_5$, the external piston 613 can be moved to communicatively connect the hyperbaric port $P_1$ and control pressure port $P_3$ through the communicating hole 624 of the drive piston 614 so that a hydraulic oil of the hyperbaric port $P_1$ can reliably be supplied to the control pressure port $P_3$ before being supplied to the pressure supply unit 632 as a control pressure. As a result, pressure control can properly be performed without using a switching mechanism or the like separately.

Also in the present embodiment, the controller can be made compact by adopting the external piston 613 in a cylindrical shape and freely movably supporting the external piston 613 between the housing 611 and drive piston 614.

Ninth Embodiment

Figure 10:
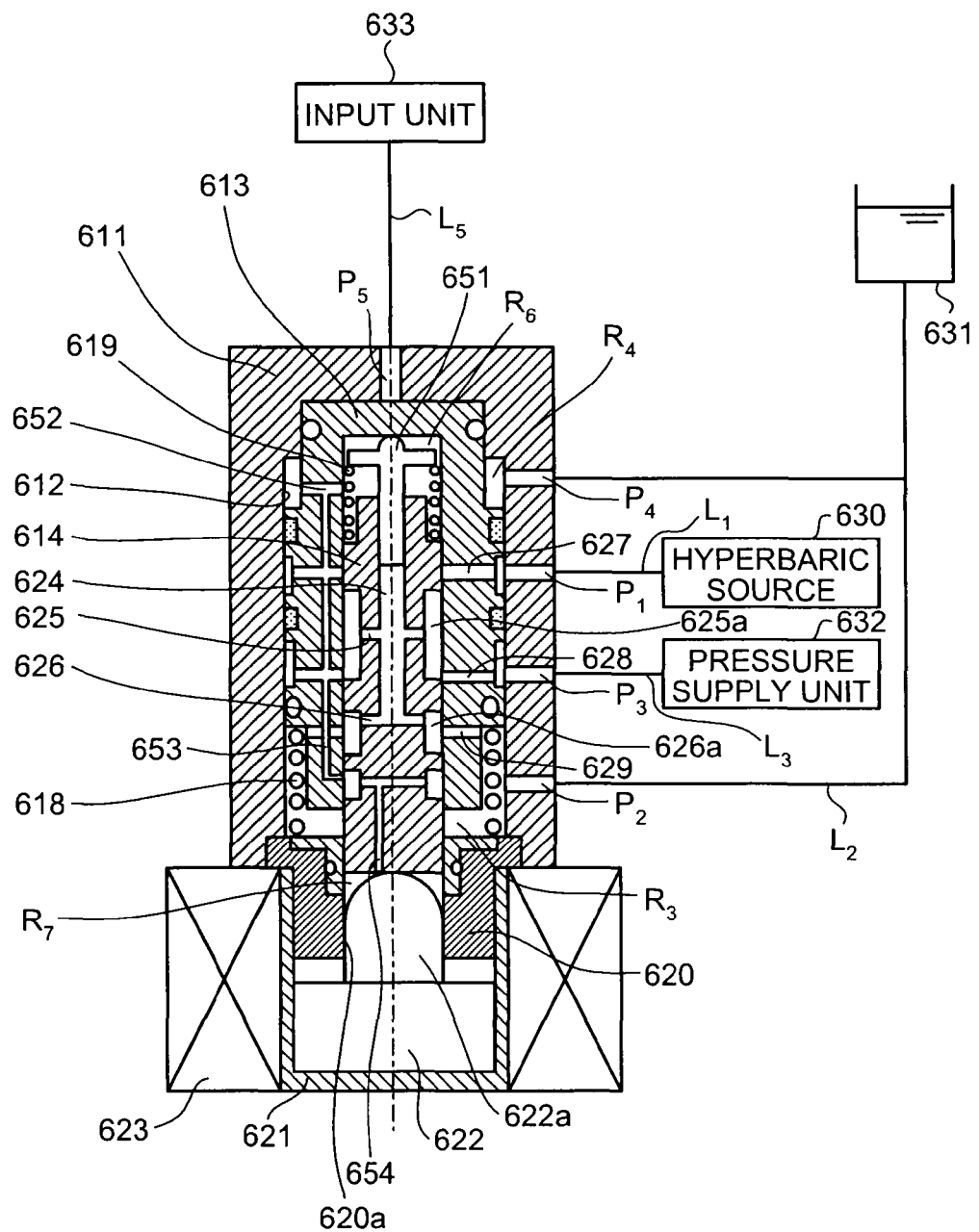
FIG. 10 is a schematic block diagram showing a pressure controller according to a ninth embodiment of the present invention.

FIG. 10 is a schematic block diagram showing a pressure controller according to a ninth embodiment of the present invention. The same numerals are attached to members having functions similar to those in the aforementioned embodiments to omit a duplicate description.

In a spool type three-way valve as a pressure controller in the ninth embodiment, as shown in FIG. 10, the external piston 613 is freely movably supported by the bearing hole 612 of the housing 611 and the drive piston 614 is freely movably supported by the external piston 613. The external piston 613 is supported by being energized upward by the return spring 618 set between the external piston 613 and guide 620. The drive piston 614 has the communicating hole 624 formed in the central part thereof along the axial direction, a support member 651 is freely movably fitted into the communicating hole 624 from above, and the return spring 619 is set between the drive piston 614 and support member 651 so that the drive piston 614 is supported by being energized downward by energizing force of the return spring 619.

In the lower part of the housing 611, on the other hand, the guide 620 made of iron is fixed and also the case 621 is fixed. Inside the case 621, the pressing piston 622 is freely movably supported along the vertical direction and the coil 623 is wound outside the case 621 facing the guide 620 and pressing piston 622. Then, the rod 622*a* of the pressing piston 622 is fitted into a guide hole 620*a* of the guide 620 and a tip part thereof is in contact with the undersurface of the drive piston 614 fitted into the guide hole 620*a*.

Therefore, drive piston 614 is energized downward by energizing force of the return spring 619 and positioned by the lower end surface thereof being in contact with the tip part of the rod 622*a* of the pressing piston 622. Then, an electromagnetic force is generated with a current passed to the coil 623, the pressing piston 622 is attracted by attraction of the guide 620, and the drive piston 614 is pressed by the pressing piston 622 moving upward so that the drive piston 614 can move upward against energizing force of the return spring 619.

In a pressure controller in the present embodiment, the pressure chamber $R_3$ demarcated by the housing 611, external piston 613 and drive piston 614 is provided. The drive piston 614 has the communicating hole 624 formed in the central part thereof and also has the two communicating holes 625 and 626 communicatively connected to the communicating hole 624 along the diameter direction. In addition, the drive piston 614 has the connection ports 625*a* and 626*a* communicatively connected to the communicating holes 625 and 626 respectively in the outer circumference thereof along the circumferential direction.

Moreover, the hyperbaric port $P_1$ cutting through the housing 611 from the outside to the bearing hole 612, the decompression port $P_2$, and the control pressure port $P_3$ are formed. Further, the external piston 613 has the three connection holes 627, 628, and 629 formed therein. The hyperbaric port $P_1$ is communicatively connectible to the connection port 625*a* via the connection hole 627, the decompression port $P_2$ is communicatively connectible to the connection port 625*a* via the connection hole 628, the control pressure port $P_3$ is communicatively connected to the pressure chamber $R_3$, and the pressure chamber $R_3$ is communicatively connected to the connection port 626*a* via the connection hole 629. Also, the external piston 613 has a communicating hole 652 communicatively connecting the pressure regulated chamber $R_4$ and a spring accommodating chamber $R_6$ formed therein, and the external piston 613 and drive piston 614 have through holes 653 and 654 communicatively connecting the communicating hole 652 to a pressing chamber $R_7$ demarcated between the pressing piston 622 and drive piston 614.

Then, the hyperbaric port $P_1$ is connected to the hyperbaric source 630 via the hyperbaric line $L_1$, the decompression port $P_2$ is connected to the reservoir tank 631 via the decompression line $L_2$, and the control pressure port $P_3$ is connected to the pressure supply unit 632 via the control line $L_3$. The housing 611 also has an external pressure port $P_5$ formed at the upper end thereof and the external pressure port $P_5$ is connected to the input unit 633 via the external pressure line $L_5$.

Therefore, when the coil 623 is not energized, the drive piston 614 is positioned by energizing force of the return spring 619 by being in contact with the tip part of the pressing piston 622, and while the communicating hole 624 of the drive piston 416 is communicatively connected to the pressure chamber $R_3$ through the communicating hole 626, connection port 626a, and connection hole 629, the decompression port $P_2$ and control pressure port $P_3$ are communicatively connected through the communicating hole 624 by the communicating hole 624 being communicatively connected to the decompression port $P_2$ through the communicating hole 625, connection port 625a, and connection hole 628.

Then, when the coil 623 is energized, the drive piston 614 moves upward against energizing force of the return spring 619. Then, the communicating hole 624 of the drive piston 614 and the decompression port $P_2$ are blocked while the communicating hole 624 remains communicatively connected to the pressure chamber $R_3$ and the hyperbaric port $P_1$ and control pressure port $P_3$ can communicatively be connected through the communicating hole 624 by the communicating hole 624 being communicatively connected to the hyperbaric port $P_1$ through the communicating hole 625, connection port 625a, and connection hole 627.

Pressure control by the pressure controller in the present embodiment is the same as that in the aforementioned eighth embodiment and thus a description thereof is omitted.

In a pressure controller in the ninth embodiment as described above, the external piston 613 is freely movably supported inside the housing 611 and the drive piston 614 is freely movably supported inside the external piston 613 to support the control pressure port $P_3$ by being energized so as to make it communicatively connectible to the decompression port $P_2$ through the communicating hole 624. On the other hand, the hyperbaric port $P_1$ is made communicatively connectible to the control pressure port $P_3$ through the communicating hole 624 by moving the drive piston 614 by means of an electromagnetic force of a solenoid, and the hyperbaric port $P_1$ is made communicatively connectible to the control pressure port $P_3$ through the communicating hole 624 by action of an external pressure from the input unit 633 on the drive piston 614 to move the external piston 613.

Therefore, even when a power supply system or control system is defective, by supplying an external pressure from the input unit 633 to the external pressure port $P_5$, the external piston 613 can be moved to communicatively connect the hyperbaric port $P_1$ and control pressure port $P_3$ through the communicating hole 624 of the drive piston 614 so that a hydraulic oil of the hyperbaric port $P_1$ can reliably be supplied to the control pressure port $P_3$ before being supplied to the pressure supply unit 632 as a control pressure. As a result, pressure control can properly be performed without using a switching mechanism or the like separately.

Also in the present embodiment, the support member 651 is freely movably fitted into the communicating hole 624 of the drive piston 614 from above and the return spring 619 is set between the drive piston 614 and support member 651 so that the drive piston 614 is supported by being energized downward with respect to the external piston 613 by energizing force of the return spring 619 via the support member 651. That is, with a pressure inside the communicating hole 624 of the drive piston 614 increased by the support member 651, the diameter of the communicating hole 624 (the support member 651) is designed in such a way that a driving force of the pressing piston 622 caused by an electromagnetic force and a reaction force of the drive piston 614 from an external pressure are balanced. Therefore, pressure control in accordance with an electromagnetic force can be performed.

Tenth Embodiment

Figure 11:
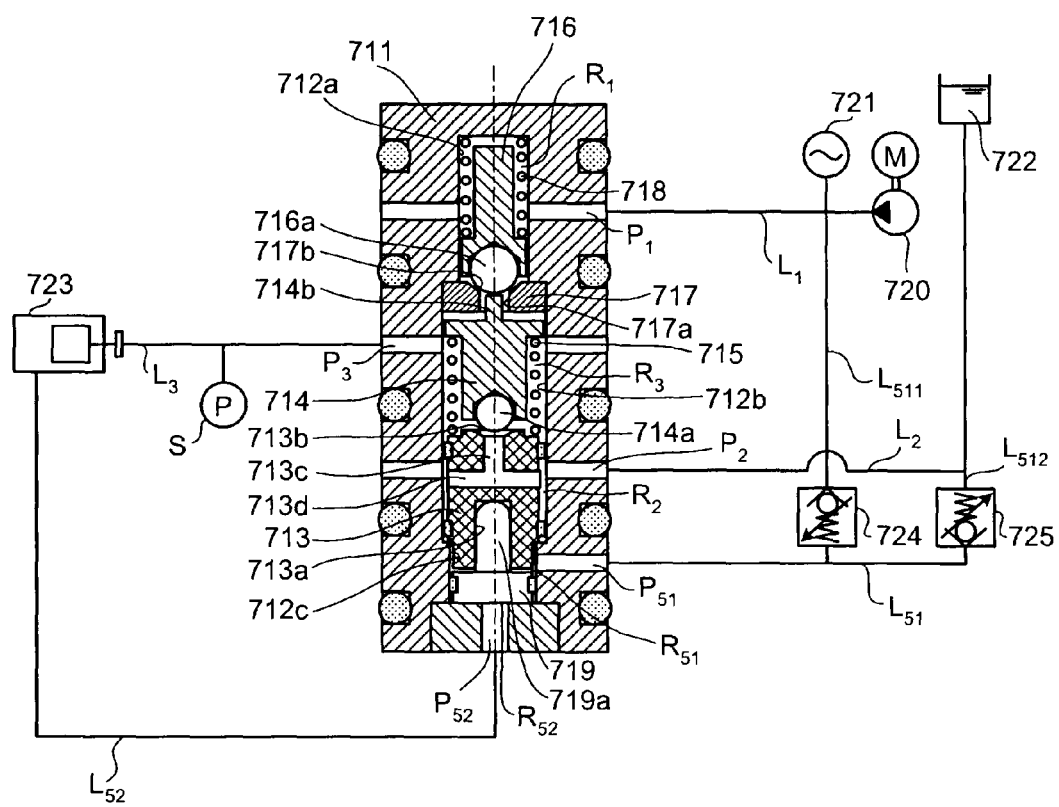
FIG. 11 is a schematic block diagram showing a pressure controller according to a tenth embodiment of the present invention.

FIG. 11 is a schematic block diagram showing a pressure controller according to a ninth embodiment of the present invention.

In a poppet type three-way valve as a pressure controller in the tenth embodiment, as shown in FIG. 11, a housing 711 has three consecutive bearing holes 712a, 712b, and 712c formed along the vertical direction inside the housing 711 and among the three bearing holes, the second bearing hole 712b has the largest diameter and the first bearing hole 712a has the smallest diameter. Then, a first drive piston 713 and an intermediate piston 714 are freely movably fitted into the second bearing hole 712b. The first drive piston 713 has a cylindrical shape and has a connection recess 713a formed at the lower and a valve seat 713b formed at the upper end. The intermediate piston 714 has a cylindrical shape and has a ball 714a to be seated in the valve seat 713b mounted at the lower end and a pressing part 714b formed at the upper end. In addition, a return spring (energizing unit) 715 is set between the first drive piston 713 and intermediate piston 714, and the ball 714a is separated from the valve seat 713b by the first drive piston 713 and intermediate piston 714 being energized in a direction to separate them by energizing force of the return spring 715.

A pressure control valve 716 is positioned above the intermediate piston 714 and freely movably supported by the first bearing hole 712a of the housing 711. The pressure control valve 716 has a cylindrical shape and has a ball 716a mounted at the lower end. In addition, a flange 717 is fixed to the second bearing hole 712b of the housing 711 between the intermediate piston 714 and pressure control valve 716, and the flange 717 has a through hole 717a formed therein and a valve seat 717b to be seated by the ball 716a formed on the outer circumferential surface of the through hole 717a. Also, a return spring (energizing unit) 718 is set between the housing 711 and pressure control valve 716 and the ball 716a is caused to be seated in the valve seat 717b by the pressure control valve 716 being supported by being energized toward the intermediate piston 714 by energizing force of the return spring 718. The intermediate piston 714 is also supported by being energized toward the pressure control valve 716 by energizing force of the return spring 715 and the pressing part 714b is in contact with the ball 716a through the through hole 717a. In this case, the energizing force of the return spring 718 is set to be larger that that of the return spring 715.

A second drive piston 719 is positioned below the first drive piston 713 and freely movably supported by the third bearing hole 712c of the housing 711. The second drive piston 719 has an integrally formed pressing part 719a directed upward and the pressing part 719a is fitted into the connection recess 713a of the first drive piston 713. In this case, the first drive piston 713 is supported by being energized toward the first drive piston 713 by energizing force of the return spring 715 and positioned at a position where the pressing part 719a is fitted into the connection recess 713a.

Since, in a pressure controller in the present embodiment, the first drive piston 713, intermediate piston 714, pressure control valve 716, and second drive piston 719 are freely movably supported inside the housing 711, as described above, the hyperbaric chamber $R_1$ demarcated by the housing 711 and pressure control valve 716, the decompression chamber $R_2$ demarcated by the housing 711 and first drive piston 713, and the pressure chamber $R_3$ demarcated by the housing 711 and intermediate piston 714 are provided.

Then, the hyperbaric port $P_1$ communicatively connected to the hyperbaric chamber $R_1$ is formed by cutting through the housing 711, and also the decompression port $P_2$ communicatively connected to the decompression chamber $R_2$ is formed by cutting through the housing 711. Also, the control pressure port $P_3$ communicatively connected to the pressure chamber $R_3$ is formed by cutting through the housing 711. In this case, the hyperbaric port $P_1$ and the decompression port $P_2$ function as the first port of the present invention and the control pressure port $P_3$ functions as the second port of the present invention. The hyperbaric port $P_1$ is connected to an oil pressure pump 720 and an accumulator 721 as hyperbaric sources via the hyperbaric line $L_1$, the decompression port $P_2$ is connected to a reservoir tank 722 via the decompression line $L_2$, and the control pressure port $P_3$ is connected to a brake master cylinder 723 as a pressure supply unit via the control line $L_3$. A pressure sensor S is provided for the control line $L_3$.

Since in this case the outside diameter of the pressing part 714a of the intermediate piston 714 is larger than the inside diameter of the through hole 717a, the hyperbaric chamber $R_1$ and pressure chamber $R_3$ can communicatively be connected by the through hole 717a, and the hyperbaric chamber $R_1$ and pressure chamber $R_3$ can be blocked by the ball 716a of the pressure control valve 716 being seated in the pressing part 714b of the external piston 714 after movement of the ball 716a. The first drive piston 713 also has a through hole 713c formed along the axial direction and a through hole 713d formed along the diameter direction to intersect the through hole 713c for communicative connection. The decompression chamber $R_2$ and the pressure chamber $R_3$ can be communicatively connected by the through holes 713c and 713d, and the decompression chamber $R_2$ and the pressure chamber $R_3$ can be blocked by the ball 714a of the intermediate piston 714 being seated in the valve seat 713b of the first drive piston 713 after movement of the first drive piston 713.

Also, the first external pressure chamber $R_{51}$ is demarcated by the housing 711, first drive piston 713, and second drive piston 719 to form a first external pressure port $P_{51}$ communicatively connected to the first external pressure chamber $R_{51}$ by cutting through the upper housing 711. Then, the first external pressure line $L_{51}$ is connected to the first external pressure port $P_{51}$ and the first external pressure line $L_{51}$ bifurcates, with one bifurcated line $L_{511}$ connected to the oil pressure pump 720 and accumulator 721 via a normally closed electromagnetic valve 724 and another bifurcated line $L_{512}$ connected to the reservoir tank 722 via a normally open electromagnetic valve 725.

Also, the second external pressure chamber $R_{52}$ is demarcated by the housing 711 and second drive piston 719 to form the second external pressure port $P_{52}$ communicatively connected to the second external pressure chamber $R_{52}$ by cutting through the upper housing 711. The second external pressure port $P_{52}$ is connected to an output port of the brake master cylinder 723 as an input unit (pressure control unit) via the second external pressure line $L_{52}$.

Therefore, when the electromagnetic valves 724 and 725 are not energized, the bifurcated line $L_{511}$ is closed and the bifurcated line $L_{512}$ is open and therefore, an oil pressure of the accumulator 721 is not supplied to the first external pressure chamber $R_{51}$ by passing through the first external pressure line $L_{51}$. Thus, the first drive piston 713 is positioned by energizing force of the return spring 715 by being in contact with the external piston 519, the passage is opened by the ball 714a of the intermediate piston 714 being separated from the valve seat 713b of the first drive piston 713, and the passage is blocked by the ball 716a being seated in the valve seat 717b by energizing force of the return spring 718.

Then, when the electromagnetic valves 724 and 725 are energized, the bifurcated line $L_{511}$ is opened and the bifurcated line $L_{512}$ is closed and thus, an oil pressure of the accumulator 721 is supplied to the first external pressure chamber $R_{51}$ via the first external pressure line $L_{51}$. Consequently, the first drive piston 713 moves upward against energizing force of the return spring 715 due to the oil pressure supplied to the first external pressure chamber $R_{51}$. Then, the ball 714a of the intermediate piston 714 is seated in the valve seat 713b of the first drive piston 713 so that the passage can be blocked. When the first drive piston 713 further moves upward, the first drive piston 713 moves upward together with the intermediate piston 714 and the pressing part 714b of the intermediate piston 714 presses against the pressure control valve 716 via the ball 716a. Then, the pressure control valve 716 moves upward against energizing force of the return spring 718 and the ball 716a is separated from the valve seat 717b so that the passage can be opened.

In the present embodiment, a first drive unit of the present invention includes the oil pressure pump 720, accumulator 721, and electromagnetic valves 724 and 725, and a second drive unit includes the brake master cylinder 723.

Here, pressure control by the aforementioned pressure controller in the present embodiment will be described in detail.

In a pressure controller in the present embodiment, when the electromagnetic valves 724 and 725 are demagnetized, the bifurcated line $L_{511}$ is closed and the bifurcated line $L_{51}$ is opened and thus, no oil pressure is supplied to the first external pressure chamber $R_{51}$, the valve seat 713b of the first drive piston 713 is positioned by the return spring 715 separated from the ball 714a and the ball 716a of the pressure control valve 716, on the other hand, is seated in the valve seat 717b due to energizing force of the return spring 718. Therefore, the hyperbaric chamber $R_1$ and the control pressure chamber $R_3$ are blocked and the control pressure port $P_3$ and the decompression port $P_2$ are communicatively connected.

If the electromagnetic valves 724 and 725 are energized in this state, the bifurcated line $L_{511}$ is opened and the bifurcated line $L_{512}$ is closed and thus, an oil pressure of the accumulator 721 is supplied to the first external pressure chamber $R_{51}$ via the first external pressure line $L_{51}$ and the first drive piston 713 moves upward against energizing force of the return spring 715. Then, when the first drive piston 713 moves upward, first the valve seat 713b is seated in the ball 714a of the intermediate piston 714 to block the through holes 713c and 713d and when the first drive piston 713 further moves upward, next the pressing part 714b of the intermediate piston 714 moves up the pressure control valve 716 against energizing force of the return spring 718. Then, the ball 716a of the pressure control valve 716 is separated from the valve seat 717b to open the through hole 717a.

Therefore, the decompression chamber $R_2$ and the control pressure chamber $R_3$ are blocked by the valve seat 713b of the first drive piston 713 being seated in the ball 714a of the intermediate piston 714, and the hyperbaric chamber $R_1$ and pressure chamber $R_3$ are communicatively connected by the ball 716a of the pressure control valve 716 being separated from the valve seat 717b. Thus, an oil pressure of the accumulator 721 acts on the hyperbaric chamber $R_1$ through the hyperbaric port $P_1$, and a high-pressure hydraulic oil flows to the pressure chamber $R_3$ by passing through a gap between the ball 716a of the pressure control valve 716 and valve seat 717b before being supplied to the brake master cylinder 723 as a control pressure from the control pressure port $P_3$ through the control line $L_3$.

Then, if the current value for energizing the electromagnetic valves 724 and 725 is reduced in this state, the bifurcated line $L_{511}$ is closed and the bifurcated line $L_{512}$ is opened, an oil pressure of the first external pressure chamber $R_{51}$ falls, a pressing force of the first drive piston 713 decreases, and the first drive piston 713 moves downward due to energizing force of the return springs 715 and 718. Then, while the through holes 713c and 713d remain blocked with the ball 714a of the intermediate piston 713 seated in the valve seat 713a of the drive piston 714, the pressure control valve 716 moves downward due to energizing force of the return spring 718 and the ball 716a is seated in the valve seat 717b to block the through hole 717a. When the first drive piston 713 further moves downward, the valve seat 713b is separated from the ball 714a of the intermediate piston 714 due to energizing force of the return spring 715 to open the through holes 713c and 713d.

Therefore, the hyperbaric chamber $R_1$ and the control pressure chamber $R_3$ are blocked by the ball 716a of the pressure control valve 716 being seated in the valve seat 717b, and the decompression chamber $R_2$ and pressure chamber $R_3$ are communicatively connected by the valve seat 713b of the first drive piston 713 being separated from the ball 714a of the intermediate piston 714. Thus, a control pressure acting on the brake master cylinder 723 from the pressure chamber $R_3$ through the control pressure port $P_3$ and the control line $L_3$, that is, a hydraulic oil flows from the through holes 713c and 713d to the decompression chamber $R_2$ by passing through a gap between the valve seat 713b of the first drive piston 713 and ball 714a of the intermediate piston 714 before being discharged to the reservoir tank 722 from the decompression port $P_2$ through the decompression line $L_2$.

If a power supply system or control system connected to the electromagnetic valve 724 or 725 is defective, the electromagnetic valve 724 or 725 cannot be energized, the first drive piston 713 and pressure control valve 716 cannot be moved, and no control pressure can be supplied to the brake master cylinder 723 by communicatively connecting the hyperbaric port $P_1$ and the pressure chamber $R_3$.

However, in the present embodiment, the second drive piston 719 is provided below the first drive piston 713 and the second drive piston 719 is pressed upward by outputting a high-pressure hydraulic oil from the brake master cylinder 723 to the second external pressure line $L_{52}$ before being supplied from the second external pressure port $P_{52}$ to the second external pressure chamber $R_{52}$. Then, the second drive piston 719 presses against the first drive piston 713 and the first drive piston 713 moves downward. Then, as described above, the valve seat 713b of the first drive piston 713 is seated in the ball 714a of the intermediate piston 714 to block the through holes 713c and 713d and the pressing part 714b of the intermediate piston 714 presses against the pressure control valve 716 so that the ball 716a is separated from the valve seat 717b to open the through hole 717a.

Therefore, while the decompression port $P_2$ and the control pressure port $P_3$ are blocked, the hyperbaric port $P_1$ and the control pressure port $P_3$ are communicatively connected, and a high-pressure hydraulic oil of the accumulator 721 is supplied to the hyperbaric chamber $R_1$ through the hyperbaric port $P_1$, which then flows to the pressure chamber $R_3$ by passing a gap between the ball 716a of the pressure control valve 716 and valve seat 717b before being supplied to the brake master cylinder 723 as a control pressure from the control pressure port $P_3$ through the control line $L_3$. Thus, even if a power supply system or control system is defective, pressure control can properly be performed.

In a pressure controller in the tenth embodiment as described above, the first drive piston 713, second drive piston 719, intermediate piston 714, and pressure control valve 716 are serially arranged inside the housing 711 in the axial center direction and freely movably supported, the pressure chamber $R_3$ and decompression chamber $R_2$ are supported by being energized so as to make them communicatively connectible, and the first drive piston 713 is moved by opening/closing the electromagnetic valves 724 and 725 to move the intermediate piston 714 and pressure control valve 716 to make the hyperbaric port $P_1$ and the control pressure port $P_3$ communicatively connectible. Also, the hyperbaric port $P_1$ and the control pressure port $P_3$ are made communicatively connectible by moving the second drive piston 719 by means of an oil pressure of the brake master cylinder 723 to move the intermediate piston 714 and pressure control valve 716 via the first drive piston 713.

Therefore, even when a power supply system or control system is defective, by supplying an oil pressure of the brake master cylinder 723 to the second external pressure chamber $R_5$, and moving the intermediate piston 714 and pressure control valve 716, each passage is opened and blocked so that a hydraulic oil of the hyperbaric port $P_1$ can reliably be supplied to the control pressure port $P_3$ before being supplied to the brake master cylinder 723 as a control pressure. As a result, pressure control can properly be performed without using a switching mechanism or the like separately.

Also in a pressure controller in the present embodiment, the first drive piston 713 is driven by an oil pressure without being driven by a solenoid and thus, the controller can be simplified to reduce costs.

Eleventh Embodiment

Figure 12:
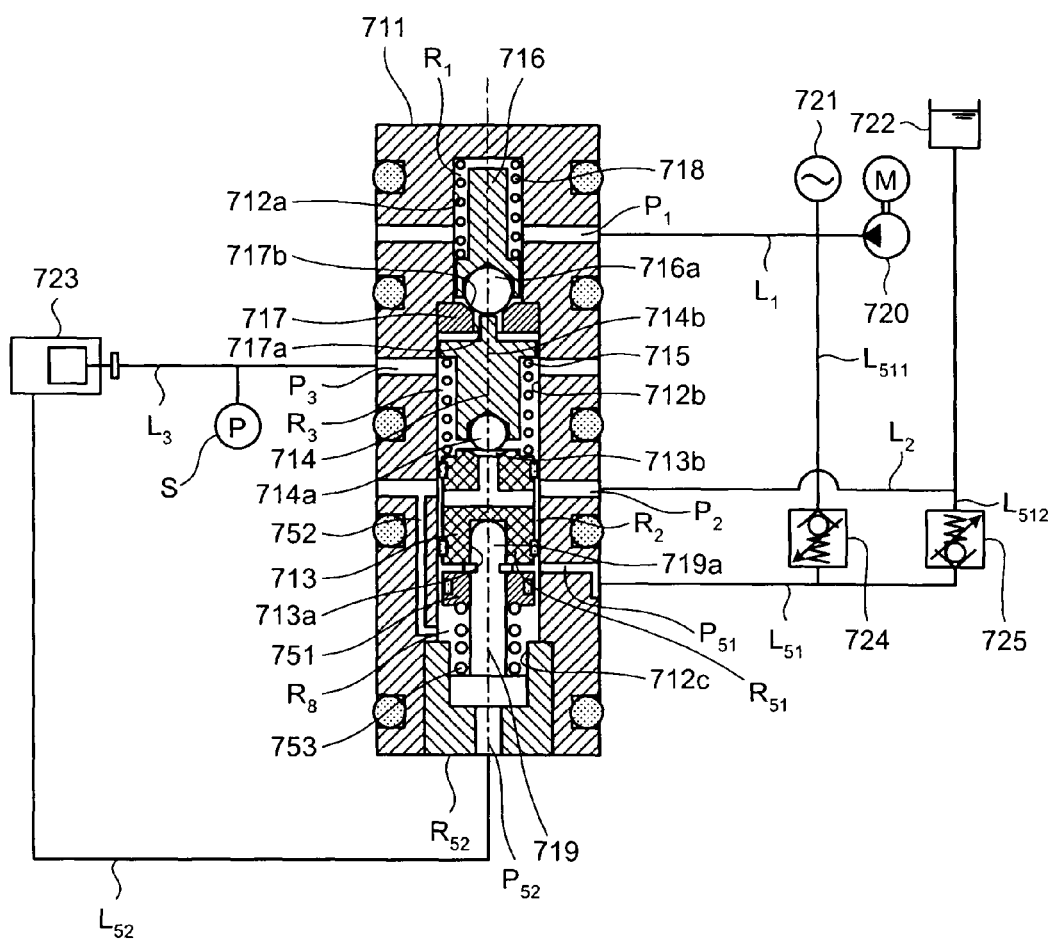
FIG. 12 is a schematic block diagram showing a pressure controller according to an eleventh embodiment of the present invention.

FIG. 12 is a schematic block diagram showing a pressure controller according to an eleventh embodiment of the present invention. The same numerals are attached to members having functions similar to those in the aforementioned embodiments to omit a duplicate description.

The basic structure of the pressure controller in the eleventh embodiment is almost the same as that of the pressure controller of the aforementioned tenth embodiment and the only difference lies in that a volume absorption mechanism for changing the volume of a first external pressure chamber in accordance with a first external pressure acting on the first external pressure chamber is provided.

In a poppet type three-way valve as a pressure controller in the tenth embodiment, as shown in FIG. 12, the first drive piston 713 and intermediate piston 714 are freely movably fitted into the second bearing hole 712b of the housing 711, the second drive piston 719 positioned below the first drive piston 713 is freely movably supported by the third bearing hole 712c and the pressing part 719a of the second drive piston 719 is fitted into the connection recess 713a of the first drive piston 713. Also, a ring-shaped volume absorption piston (volume absorption mechanism) 751 positioned between the first drive piston 713 and second drive piston 719 and on the outer circumference of the pressing part 719a of the second drive piston 719 is freely movably fitted into the second bearing hole 712b of the housing 711.

Moreover, the return spring 715 energized in a direction to separate the first drive piston 713 and intermediate piston 714 is set between them. Also, a return spring 753 energizing the volume absorption piston 751 toward the first drive piston 713 with respect to the second drive piston 719 is set between the volume absorption piston 751 and second drive piston 719.

Since, in a pressure controller in the present embodiment, the first drive piston 713, intermediate piston 714, pressure control valve 716, and second drive piston 719 are freely movably supported inside the housing 711, as described above, the hyperbaric chamber $R_1$ demarcated by the housing 711 and pressure control valve 716, the decompression chamber $R_2$ demarcated by the housing 711 and first drive piston 713, and the pressure chamber $R_3$ demarcated by the housing 711 and intermediate piston 714 are provided.

Then, the hyperbaric port $P_1$ communicatively connected to the hyperbaric chamber $R_1$ is formed by cutting through the housing 711, and also the decompression port $P_2$ communicatively connected to the decompression chamber $R_2$ is formed by cutting through the housing 711. Also, the control pressure port $P_3$ communicatively connected to the pressure chamber $R_3$ is formed by cutting through the housing 711. In this case, the hyperbaric port $P_1$ and the decompression port $P_3$ function as the first port of the present invention and the control pressure port $P_3$ functions as the second port of the present invention. The hyperbaric port $P_1$ is connected to the oil pressure pump 720 and accumulator 721 as hyperbaric sources via the hyperbaric line $L_1$, the decompression port $P_2$ connected to the reservoir tank 722 via the decompression line $L_2$, and the control pressure port $P_3$ is connected to the brake master cylinder 723 as a pressure supply unit via the control line $L_3$. The pressure sensor S is provided for the control line $L_3$.

Also, the first external pressure chamber $R_{51}$ is demarcated by the housing 711, first drive piston 713, and volume absorption piston 751 to form the first external pressure port $P_{51}$ communicatively connected to the first external pressure chamber $R_{51}$ by cutting through the upper housing 711. Also, a volume absorption chamber $R_8$ is demarcated by the volume absorption piston 751 and second drive piston 719 and the decompression port $P_2$ and the volume absorption chamber $R_8$ are communicatively connected through a communicating hole 752 and also the aforementioned return spring 753 is accommodated inside the volume absorption chamber $R_5$. Then, the first external pressure line $L_{51}$ is connected to the first external pressure port $P_{51}$ and the first external pressure line $L_{51}$ bifurcates, with one bifurcated line $L_{511}$ connected to the oil pressure pump 720 and accumulator 721 via the normally closed electromagnetic valve 724 and the other bifurcated line $L_{512}$ connected to the reservoir tank 722 via the normally open electromagnetic valve 725.

Also, the second external pressure chamber $R_{52}$ is demarcated by the housing 711 and second drive piston 719 to form the second external pressure port $P_{52}$ communicatively connected to the second external pressure chamber $R_{52}$ by cutting through the upper housing 711. The second external pressure port $P_{52}$ is connected to the output port of the brake master cylinder 723 as an input unit (pressure control unit) via the second external pressure line $L_{52}$.

Here, pressure control by the aforementioned pressure controller in the present embodiment will be described in detail.

In a pressure controller in the present embodiment, when the electromagnetic valves 724 and 725 are demagnetized, the bifurcated line $L_{511}$ is closed and the bifurcated line $L_{512}$ is opened and thus, no oil pressure is supplied to the first external pressure chamber $R_{51}$, the valve seat 713b of the first drive piston 713 is positioned by the return spring 715 separated from the ball 714a and the ball 716a of the pressure control valve 716, on the other hand, is seated in the valve seat 717b due to energizing force of the return spring 718. Therefore, the hyperbaric chamber $R_1$ and the control pressure chamber $R_3$ are blocked and the control pressure port $P_3$ and the decompression port $P_3$ are communicatively connected.

If the electromagnetic valves 724 and 725 are energized in this state, the bifurcated line $L_{511}$ is opened and the bifurcated line $L_{513}$ is closed and thus, an oil pressure of the accumulator 721 is supplied to the first external pressure chamber $R_{51}$ via the first external pressure line $L_{51}$ and the first drive piston 713 moves upward against energizing force of the return spring 715. Then, when the first drive piston 713 moves upward, first the valve seat 713b is seated in the ball 714a of the intermediate piston 714 to block the through holes 713c and 713d and when the first drive piston 713 further moves upward, next the pressing part 714b of the intermediate piston 714 moves up the pressure control valve 716 against energizing force of the return spring 718. Then, the ball 716a of the pressure control valve 716 is separated from the valve seat 717b to open the through hole 717a.

In this case, the first drive piston 713 moves upward against energizing force of the return spring 715 and the volume absorption piston 751 moves downward against energizing force of the return spring 753 with an increase in pressure of the first external pressure chamber $R_{51}$ when an external oil pressure is supplied to the first external pressure chamber $R_{51}$. Thus, a portion of oil pressure acting by rigidity of the first external pressure chamber $R_{51}$ being reduced will be absorbed.

Therefore, the decompression chamber $R_2$ and the control pressure chamber $R_3$ are blocked by the valve seat 713b of the first drive piston 713 being seated in the ball 714a of the intermediate piston 714, and the hyperbaric chamber $R_1$ and pressure chamber $R_3$ are communicatively connected by the ball 716a of the pressure control valve 716 being separated from the valve seat 717b. Thus, an oil pressure of the accumulator 721 acts on the hyperbaric chamber $R_1$ through the hyperbaric port $P_1$, and a high-pressure hydraulic oil flows to the pressure chamber $R_3$ by passing through a gap between the ball 716a of the pressure control valve 716 and valve seat 717b before being supplied to the brake master cylinder 723 as a control pressure from the control pressure port $P_3$ through the control line $L_3$.

Also, if a power supply system or control system connected to the electromagnetic valve 724 or 725 is defective, the second drive piston 719 is pressed upward by outputting a high-pressure hydraulic oil from the brake master cylinder 723 to the second external pressure line $L_{52}$ before being supplied from the second external pressure port $P_{52}$ to the second external pressure chamber $R_{52}$. Then, the second drive piston 719 presses against the first drive piston 713 and the first drive piston 713 moves downward. Then, as described above, the valve seat 713b of the first drive piston 713 is seated in the ball 714a of the intermediate piston 714 to block the through holes 713c and 713d and, the pressing part 714b of the intermediate piston 714 presses against the pressure control valve 716 to separate the ball 716a from the valve seat 717b to open the through hole 717a.

Therefore, while the decompression port $P_2$ and the control pressure port $P_3$ are blocked, the hyperbaric port $P_1$ and the control pressure port $P_3$ are communicatively connected, and a hydraulic oil of the accumulator 721 is supplied to the hyperbaric chamber $R_1$ through the hyperbaric port $P_1$, which then flows to the pressure chamber $R_3$ by passing a gap between the ball 716a of the pressure control valve 716 and valve seat 717b before being supplied to the brake master cylinder 723 as a control pressure from the control pressure port $P_3$ through the control line $L_3$. Thus, even if a power supply system or control system is defective, pressure control can properly be performed.

In a pressure controller in the eleventh embodiment as described above, the first drive piston 713, second drive piston 719, intermediate piston 714, and pressure control valve 716 are serially arranged in the axial center direction and freely movably supported in the housing 711, the volume absorption piston 751 is freely movably supported between the first drive piston 713 and second drive piston 719, and the first external pressure chamber $R_{51}$ is provided between the first drive piston 713 and volume absorption piston 751.

Therefore, when an external oil pressure is provided to the first external pressure chamber $R_{S1}$, the pressure in the first external pressure chamber $R_{S1}$ increases and thus, the first drive piston 713 moves upward against energizing force of the return spring 715 and the volume absorption piston 751 moves downward against energizing force of the return spring 753. Consequently, a portion of an oil pressure acting on the first external pressure chamber $R_{S1}$ can be absorbed by reducing rigidity of the first external pressure chamber $R_{S1}$, leading to improved controllability.

Twelfth Embodiment

Figure 13:
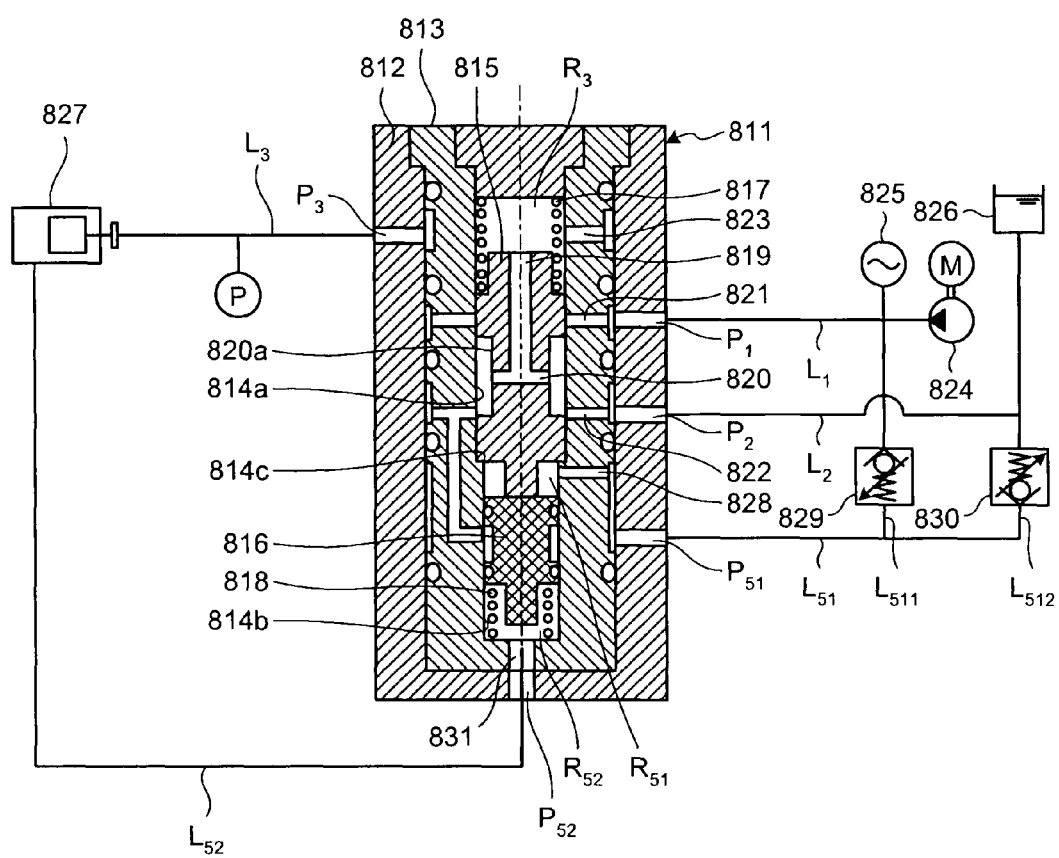
FIG. 13 is a schematic block diagram showing a pressure controller according to a twelfth embodiment of the present invention.

FIG. 13 is a schematic block diagram showing a pressure controller according to a twelfth embodiment of the present invention.

In a spool type three-way valve as a pressure controller in the twelfth embodiment, as shown in FIG. 13, a housing 811 is constructed by an internal housing 813 being fitted into an external housing 812. The internal housing 813 has a first bearing hole 814a and a second bearing hole 814b, which is smaller than the first bearing hole 814a in diameter, along the vertical direction formed therein, a first drive piston 815 in a cylindrical shape is freely movably supported along the axial direction by the first bearing hole 814a, a second drive piston 816 is freely movably supported along the axial direction by the second bearing hole 814b, and the first drive piston 815 and second drive piston 816 are serially arranged in the axial center direction.

Then, a return spring (energizing unit) 817 is set between the first drive piston 815 and internal housing 813, and the first drive piston 815 is energized downward by energizing force of the return spring 817 and positioned by being in contact with a stepped portion 814c of the first bearing hole 814a and second bearing hole 814b. On the other hand, a return spring (energizing unit) 818 is set between the second drive piston 816 and internal housing 813, and the second drive piston 816 is energized upward by energizing force of the return spring 818 and positioned by being in contact with the lower end of the first drive piston 815. In this case, the energizing force of the return spring 817 is set to be larger than that of the return spring 818.

Since, in a pressure controller in the present embodiment, the first drive piston 815 and the second drive piston 816 are freely movably supported inside the housing 811, the pressure chamber $R_3$ demarcated by the housing 811 and first drive piston 815 is provided. Also, the first drive piston 815 has a communicating hole 819 formed in the central part thereof along the axial direction and also has a communicating hole 820 communicatively connected to the communicating hole 819 along the diameter direction. In addition, the first drive piston 815 has a connection port 820a formed on the outer circumference thereof along the circumferential direction to communicatively connect to the communicating hole 820.

Moreover, the hyperbaric port $P_1$ cutting through the housing 811 from the outside to the first bearing hole 814a, the decompression port $P_2$, and the control pressure port $P_3$ are formed. In this case, the hyperbaric port $P_1$ and the decompression port $P_2$ function as the first port of the present invention and the control pressure port $P_3$ functions as the second port of the present invention. Further, the internal housing 813 has three connection holes 821, 822, and 823 cutting through from inside to outside. The hyperbaric port $P_1$ is communicatively connectible to the connection port 820a via the connection hole 821, the decompression port $P_2$ is communicatively connectible to the connection port 820a via the connection hole 822, and the control pressure port $P_3$ is communicatively connected to the pressure chamber $R_3$ via the connection hole 823.

Then, the hyperbaric port $P_1$ is connected to an oil pressure pump 824 and an accumulator 825 as hyperbaric sources via the hyperbaric line $L_1$, the decompression port $P_2$ is connected to a reservoir tank 826 via the decompression line $L_2$, and the control pressure port $P_3$ is connected to a brake master cylinder 827 as a pressure supply unit via the control line $L_3$.

Also, the first external pressure chamber $R_{S1}$ is demarcated by the housing 811, first drive piston 815, and second drive piston 816 to form the first external pressure port $P_{S1}$ by cutting through the upper housing 811 and also a connection hole 828 communicatively connecting the first external pressure port $P_{S1}$ and first external pressure chamber $R_{S1}$ is formed in the internal housing 813. Then, the first external pressure line $L_{S1}$ is connected to the first external pressure port $P_{S1}$ and the first external pressure line $L_{S1}$ bifurcates, with one bifurcated line $L_{S11}$ connected to the oil pressure pump 824 and accumulator 825 via a normally closed electromagnetic valve 829 and another bifurcated line $L_{S12}$ connected to the reservoir tank 826 via a normally open electromagnetic valve 830.

Also, the second external pressure chamber $R_{S2}$ is demarcated by the housing 811 and second drive piston 816 to form the second external pressure port $P_{S2}$ by cutting through the upper housing 811, a connection hole 831 communicatively connecting the second external pressure port $P_{S2}$ and second external pressure chamber $R_{S2}$ is formed inside the internal housing 813, and the second external pressure port $P_{S2}$ is connected to an output port of the brake master cylinder 827 as an input unit (pressure control unit) via the second external pressure line $L_{S2}$.

Also in the present embodiment, as described above, the second drive piston 816 is supported by being energized by energizing force of the return spring 818 at a position in contact with the first drive piston 815 and therefore, the second drive piston 816 is used also as a volume absorption piston (volume absorption mechanism) and the second external pressure chamber $R_{S5}$ is used also as a volume absorption chamber.

Here, pressure control by the aforementioned pressure controller in the present embodiment will be described in detail.

In a pressure controller in the present embodiment, when the electromagnetic valves 829 and 830 are demagnetized, the bifurcated line $L_{S11}$ is closed and the bifurcated line $L_{S12}$ is opened and thus, no oil pressure is supplied to the first external pressure chamber $R_{S1}$, the first drive piston 815 is positioned by the return spring 817 by being in contact with the stepped portion 814c, and the communicating hole 819 is communicatively connected to the control pressure chamber $R_3$ and also to the decompression port $P_2$. Therefore, while the decompression port $P_2$ and the control pressure port $P_3$ are communicatively connected by the control pressure chamber $R_3$ and communicating hole 819, the hyperbaric port $P_1$ and control pressure port $P_3$ are blocked.

If the electromagnetic valves 829 and 830 are energized in this state, the bifurcated line $L_{S11}$ is opened and the bifurcated line $L_{S12}$ is closed and thus, an oil pressure of the accumulator 825 is supplied to the first external pressure chamber $R_{S1}$ via the first external pressure line $L_{S1}$ and the first drive piston 815 moves upward against energizing force of the return spring 817. Then, when the first drive piston 816 moves upward, the communicating hole 819 is communicatively connected after being switched from the decompression port $P_2$ to the hyperbaric port $P_1$ by the connection port 820a being cut off from the connection hole 821 and communicatively connected to the connection hole 822 while the communicating hole 819 of the first drive piston 815 remains communicatively connected to the pressure chamber $R_3$. Thus, while the hyperbaric port $P_1$ and control pressure port $P_3$ are communicatively connected by the pressure chamber $R_3$ and communicating hole 819, the decompression port $P_2$ and control pressure port $P_3$ are blocked.

In this case, the first drive piston 815 moves upward against energizing force of the return spring 817 and the second drive piston 816 moves downward against energizing force of the return spring 818 with an increase in pressure of the first external pressure chamber $R_{51}$ when an external oil pressure is supplied to the first external pressure chamber $R_{51}$. Thus, a portion of oil pressure acting by rigidity of the first external pressure chamber $R_{51}$ being reduced will be absorbed.

Therefore, after flowing through the hyperbaric port $P_1$, an oil pressure of the accumulator 825 flows from the connection hole 821 to the communicating hole 819 by passing through the connection port 820a and connection hole 823 and then from the communicating hole 819 to the pressure chamber $R_3$ before being supplied to the brake master cylinder 827 as a control pressure from the control pressure port $P_3$ through the control line $L_3$.

Then, if the current value for energizing the electromagnetic valves 829 and 830 is reduced in this state, the bifurcated line $L_{511}$ is closed and the bifurcated line $L_{512}$ is opened, an oil pressure of the first external pressure chamber $R_{51}$ falls, a pressing force of the first drive piston 815 decreases, and the first drive piston 815 moves downward due to energizing force of the return spring 817. Then, the communicating hole 819 is communicatively connected after being switched from the hyperbaric port $P_1$ to the decompression port $P_2$ by the connection port 820a being cut off from the connection hole 822 and communicatively connected to the connection hole 821 while the communicating hole 819 remains communicatively connected to the pressure chamber $R_3$. Accordingly, while the decompression port $P_2$ and the control pressure port $P_3$ are communicatively connected to the pressure chamber $R_3$ and the communicating hole 819, the high pressure port $P_1$ and the control pressure port $P_3$ are blocked Therefore, a control pressure acting on the brake master cylinder 827 from the pressure chamber $R_3$ through the control pressure port $P_3$ and control line $L_3$, that is, a hydraulic oil flows from the pressure chamber $R_3$ to the decompression port $P_2$ by passing through the connection holes 819 and 820, connection port 820a, and connection hole 822 before being discharged to the reservoir tank 826 from the decompression port $P_2$ through the decompression line $L_2$.

Also, if a power supply system or control system connected to the electromagnetic valve 829 or 830 is defective, the second drive piston 816 is pressed upward by outputting a high-pressure hydraulic oil from the brake master cylinder 827 to the second external pressure line $L_{52}$ before being supplied from the second external pressure port $P_{52}$ to the second external pressure chamber $R_{52}$. Then, the second drive piston 816 presses against the first drive piston 815 and the first drive piston 815 moves upward. Then, as described above, while the communicating hole 819 of the first drive piston 815 remains communicatively connected to the pressure chamber $R_3$, the decompression port $P_2$ is switched to the hyperbaric port P.

Therefore, after flowing through the hyperbaric port $P_1$, an oil pressure of the accumulator 825 flows from the connection hole 821 to the communicating hole 819 by passing through the connection port 820a and communicating hole 823 and then from the communicating hole 819 to the pressure chamber $R_3$ before being supplied to the brake master cylinder 827 as a control pressure from the control pressure port $P_3$ through the control line $L_3$. Thus, even if a power supply system or control system is defective, pressure control can properly be performed.

In a pressure controller in the twelfth embodiment as described above, the first drive piston 815 and second drive piston 816 are serially arranged in the axial center direction and freely movably supported in the housing 811, the first drive piston 815 and second drive piston 816 are supported by being energized by the return spring 817 and return spring 818, the second drive piston 816 is used also as a volume absorption piston, and the first external pressure chamber $R_{51}$ is provided between the first drive piston 815 and second drive piston 816.

Therefore, when an external oil pressure is provided to the first external pressure chamber $R_{51}$, the pressure in the first external pressure chamber $R_{51}$ increases and thus, the first drive piston 815 moves upward against energizing force of the return spring 817 and the second drive piston 816 moves downward against energizing force of the return spring 818. Consequently, a portion of an oil pressure acting on the first external pressure chamber $R_{51}$ can be absorbed by reducing rigidity of the first external pressure chamber $R_{51}$, leading to improved controllability. Also, by using the second drive piston 816 also as a volume absorption piston, the controller can be simplified and also the second drive piston 816 can be prevented from being stuck to the housing 811.

Thirteenth Embodiment

Figure 14:
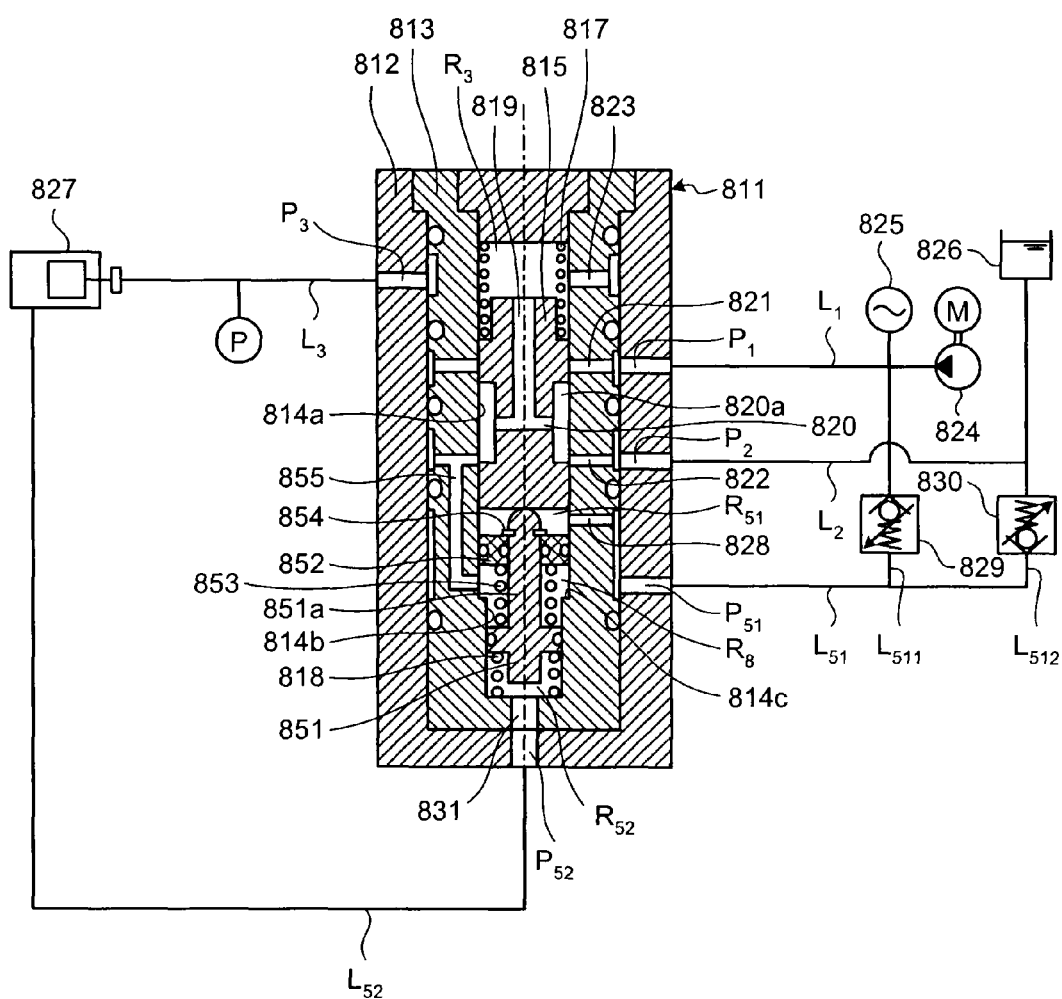
FIG. 14 is a schematic block diagram showing a pressure controller according to a thirteenth embodiment of the present invention.

FIG. 14 is a schematic block diagram showing a pressure controller according to a thirteenth embodiment of the present invention. The same numerals are attached to members having functions similar to those in the aforementioned embodiments to omit a duplicate description.

The basic structure of the pressure controller in the thirteenth embodiment is almost the same as that of the pressure controller of the aforementioned twelfth embodiment and the only difference lies in the configuration of the volume absorption mechanism for changing the volume of the first external pressure chamber in accordance with a first external pressure acting on the first external pressure chamber.

In a spool type three-way valve as a pressure controller in the thirteenth embodiment, as shown in FIG. 14, the housing 811 has the first bearing hole 814a and the second bearing hole 814b formed therein, the first drive piston 815 is freely movably supported by the first bearing hole 814a, and a second drive piston 851 is freely movably supported by the second bearing hole 814b. Also, a ring-shaped volume absorption piston (volume absorption mechanism) 852 positioned between the first drive piston 815 and second drive piston 851 and on the outer circumference of a pressing part 851a of the second drive piston 851 is freely movably fitted into the first bearing hole 814a of the housing 811.

Then, the first drive piston 815 is energized downward by energizing force of the return spring 817 and the second drive piston 851 is energized upward by energizing force of the return spring 818. Also, the volume absorption piston 852 is supported by being energized upward by energizing force of a return spring 853 set between the volume absorption piston 852 and second drive piston 851. In this case, the first drive piston 815 and second drive piston 851 are positioned by energizing forces of the return spring 817 and return spring 818 at a contact position of each end respectively, and the volume absorption piston 852 is positioned by energizing force of the return spring 853 by being in contact with a stopper 854 fixed to the second drive piston 851.

Since, in a pressure controller in the present embodiment, the first drive piston 815 and the second drive piston 851 are freely movably supported inside the housing 811, the pressure chamber $R_3$ demarcated by the housing 811 and first drive piston 815 is provided. Also, the first drive piston 815 has the communicating hole 819 formed in the central part thereof along the axial direction and also has the communicating hole 820 communicatively connected to the communicating hole 819 along the diameter direction. In addition, the first drive piston 815 has the connection port 820a formed on the outer circumference thereof along the circumferential direction to communicatively connect to the communicating hole 820.

Moreover, the hyperbaric port $P_1$ cutting through the housing 811 from the outside to the first bearing hole 814a, the decompression port $P_2$, and the control pressure port $P_3$ are formed. Further, the internal housing 813 has three connection holes 821, 822, and 823 cutting through inside and outside. The hyperbaric port $P_1$ is communicatively connectible to the connection port 820a via the connection hole 821, the decompression port $P_2$ is communicatively connectible to the connection port 820a via the connection hole 822, and the control pressure port $P_3$ is communicatively connected to the pressure chamber $R_3$ via the connection hole 823.

Then, the hyperbaric port $P_1$ is connected to the oil pressure pump 824 and accumulator 825 as hyperbaric sources via the hyperbaric line $L_1$, the decompression port $P_2$ is connected to the reservoir tank 826 via the decompression line $L_2$, and the control pressure port $P_3$ is connected to an input side of the brake master cylinder 827 as a pressure supply unit via the control line $L_3$.

Also, the first external pressure chamber $R_{51}$ is demarcated by the housing 811, first drive piston 815, second drive piston 851, and volume absorption piston 852 to form the first external pressure port $P_{51}$ by cutting through the upper housing 811 and also the connection hole 828 communicatively connecting the first external pressure port $P_{51}$ and first external pressure chamber $R_{51}$ is formed in the internal housing 813. Also, the volume absorption chamber $R_8$ is demarcated by the volume absorption piston 852 and second drive piston 851 and the decompression port $P_2$ and the volume absorption chamber $R_9$ are communicatively connected through a communicating hole 855 and also the aforementioned return spring 853 is accommodated inside the volume absorption chamber R. Then, the first external pressure line $L_{51}$ is connected to the first external pressure port $P_{51}$ and the first external pressure line $L_{51}$ bifurcates, with one bifurcated line $L_{511}$ connected to the oil pressure pump 824 and accumulator 825 via the normally closed electromagnetic valve 829 and the other bifurcated line $L_{512}$ connected to the reservoir tank 826 via the normally open electromagnetic valve 830.

Also, the second external pressure chamber $R_{52}$ is demarcated by the housing 811 and second drive piston 851 to form the second external pressure port $P_{52}$ by cutting through the upper housing 811, the connection hole 831 communicatively connecting the second external pressure port $P_{52}$ and second external pressure chamber $R_{52}$ is formed inside the internal housing 813, and the second external pressure port $P_{52}$ is connected to the output port of the brake master cylinder 827 as an input unit (pressure control unit) via the second external pressure line $L_{52}$.

Here, pressure control by the aforementioned pressure controller in the present embodiment will be described in detail.

In a pressure controller in the present embodiment, when the electromagnetic valves 829 and 830 are demagnetized, the bifurcated line $L_{511}$ is closed and the bifurcated line $L_{512}$ is opened and thus, no oil pressure is supplied to the first external pressure chamber $R_{51}$, the first drive piston 815 is positioned by the return spring 817 by being in contact with the stepped portion 814c, and the communicating hole 819 is communicatively connected to the control pressure chamber $R_3$ and also to the decompression port $P_2$. Therefore, while the decompression port $P_2$ and the control pressure port $P_3$ are communicatively connected by the control pressure chamber $R_3$ and communicating hole 819, the hyperbaric port $P_1$ and control pressure port $P_3$ are blocked.

If the electromagnetic valves 829 and 830 are energized in this state, the bifurcated line $L_{511}$ is opened and the bifurcated line $L_{512}$ is closed and thus, an oil pressure of the accumulator 825 is supplied to the first external pressure chamber $R_{51}$ via the first external pressure line $L_{51}$ and the first drive piston 815 moves upward against energizing force of the return spring 817. Then, when the first drive piston 816 moves upward, the communicating hole 819 is communicatively connected after being switched from the decompression port $P_2$ to the hyperbaric port $P_1$ by the connection port 820a being cut off from the connection hole 821 and communicatively connected to the connection hole 822 while the communicating hole 819 of the first drive piston 815 remains communicatively connected to the pressure chamber $R_3$. Thus, while the hyperbaric port $P_1$ and control pressure port $P_3$ are communicatively connected by the pressure chamber $R_3$ and communicating hole 819, the decompression port $P_2$ and control pressure port $P_3$ are blocked.

In this case, the first drive piston 815 moves upward against energizing force of the return spring 817 and the volume absorption piston 852 moves downward against energizing force of the return spring 853 with an increase in pressure of the first external pressure chamber $R_{51}$ when an external oil pressure is supplied to the first external pressure chamber $R_{51}$. Thus, a portion of oil pressure acting by rigidity of the first external pressure chamber $R_{51}$ being reduced will be absorbed.

Therefore, after flowing through the hyperbaric port $P_1$, an oil pressure of the accumulator 825 flows from the connection hole 821 to the communicating hole 819 by passing through the connection port 820a and connection hole 823 and then from the communicating hole 819 to the pressure chamber $R_3$ before being supplied to the brake master cylinder 827 as a control pressure from the control pressure port $P_3$ through the control line $L_3$.

Also, if a power supply system or control system connected to the electromagnetic valve 829 or 830 is defective, the second drive piston 851 is pressed upward by outputting a high-pressure hydraulic oil from the brake master cylinder 827 to the second external pressure line $L_{52}$ before being supplied from the second external pressure port $P_{52}$ to the second external pressure chamber $R_{52}$. Then, the second drive piston 851 presses against the first drive piston 815 and the first drive piston 815 moves upward. Then, as described above, while the communicating hole 819 of the first drive piston 815 remains communicatively connected to the pressure chamber $R_3$, the decompression port $P_2$ is switched to the hyperbaric port $P_1$.

Therefore, after flowing through the hyperbaric port $P_1$, an oil pressure of the accumulator 825 flows from the connection hole 821 to the communicating hole 819 by passing through the connection port 820a and communicating hole 823 and then from the communicating hole 819 to the pressure chamber $R_3$ before being supplied to the brake master cylinder 827 as a control pressure from the control pressure port $P_3$ through the control line $L_3$. Thus, even if a power supply system or control system is defective, pressure control can properly be performed.

In a pressure controller in the thirteenth embodiment as described above, the first drive piston 815 and second drive piston 851 are serially arranged in the axial center direction and freely movably supported in the housing 811, the volume absorption piston 852 is freely movably supported between the first drive piston 815 and second drive piston 851, and the first external pressure chamber $R_{51}$ is provided between the first drive piston 815 and volume absorption piston 852.

Therefore, when an external oil pressure is supplied to the first external pressure chamber $R_{51}$, the first drive piston 815 moves upward against energizing force of the return spring 817 and the volume absorption piston 852 moves downward against energizing force of the return spring 853 with an increase in pressure of the first external pressure chamber $R_{51}$ and thus, a portion of an oil pressure acting on the first external pressure chamber $R_{51}$ can be absorbed by reducing rigidity of the first external pressure chamber $R_{51}$, leading to improved controllability. In this case, the second drive piston 851 can be prevented from being stuck to the housing 811 because the second drive piston 816 also moves downward in accordance with an introduced pressure into the first external pressure chamber $R_{51}$.

Fourteenth Embodiment

Figure 15:
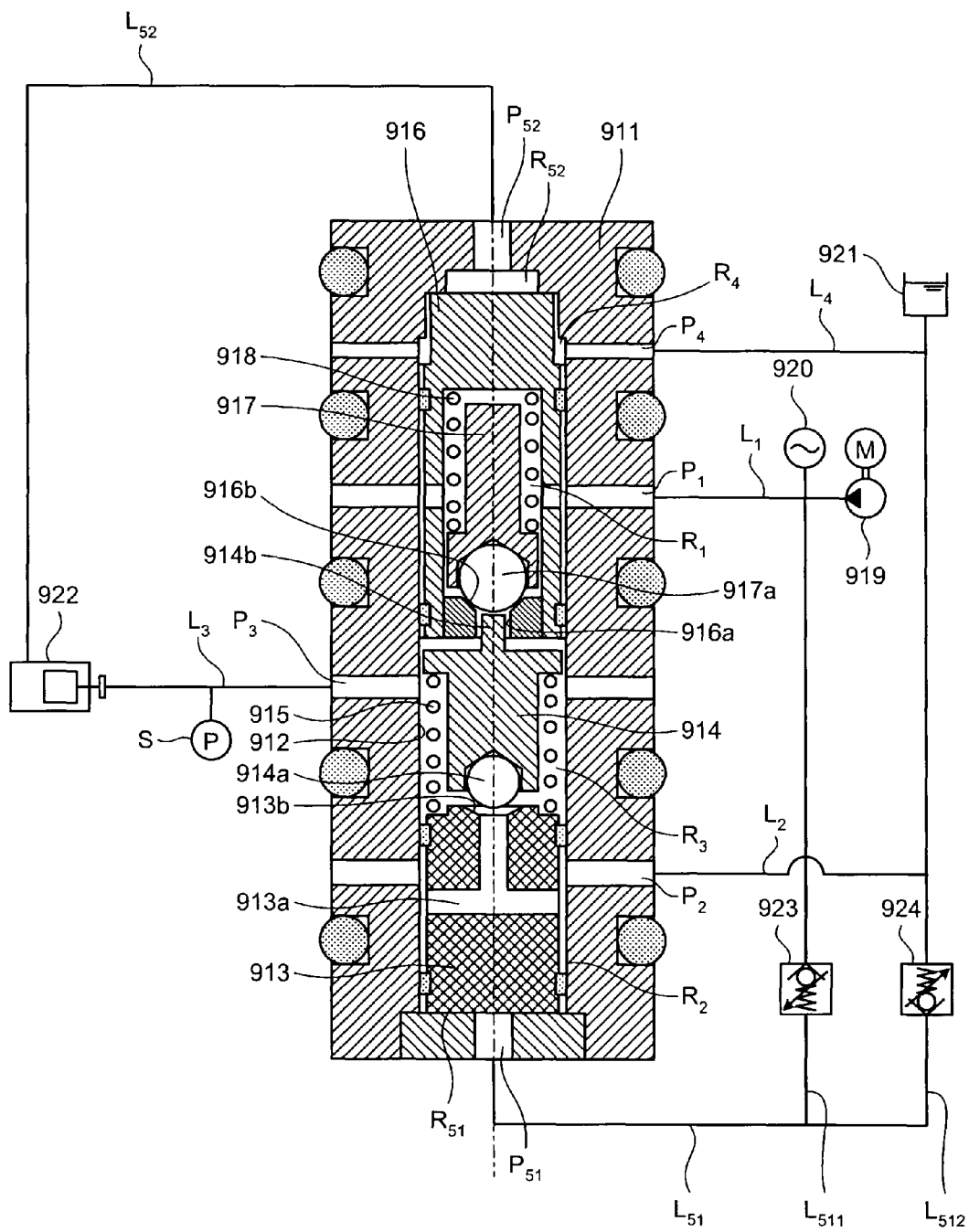
FIG. 15 is a schematic block diagram showing a pressure controller according to a fourteenth embodiment of the present invention.

FIG. 15 is a schematic block diagram showing a pressure controller according to a fourteenth embodiment of the present invention.

In a poppet type three-way valve as a pressure controller in the fourteenth embodiment, as shown in FIG. 15, a first drive piston 913 and an intermediate piston 914 are freely movably fitted into a bearing hole 912 of a housing 911 in a hollow cylindrical shape. The first drive piston 913 has a through hole 913*a* formed therein and also a valve seat 913*b* formed at the upper end thereof. The intermediate piston 914 has a ball 914*a* to be seated in the valve seat 913*b* mounted at the lower end thereof and a pressing part 914*b* formed at the upper end thereof. Then, a return spring (energizing unit) 915 is set between the drive piston 913 and intermediate piston 914 to energize them in a direction to separate them.

Moreover, a second drive piston 916 positioned above the intermediate piston 914 is freely movably fitted into the bearing hole 912 of the housing 911 and a pressure control valve 917 is disposed in the central part of the second drive piston 916. The second drive piston 916 has a through hole 916*a* formed at the lower end thereof and also has a valve seat 916*b*. The pressure control valve 917 is accommodated inside the second drive piston 916 and has a ball 917*a* to be seated in the valve seat 916*b* mounted at the lower end thereof. Then, a return spring (energizing unit) 918 is set between the second drive piston 916 and pressure control valve 917 to energize them in a direction to separate them. Also, the intermediate piston 914 is supported by being energized upward by the return spring 915 and the pressing part 914*b* is in contact with the ball 917*a* through the through hole 916*a*.

Since, in a pressure controller in the present embodiment, the first drive piston 913, intermediate piston 914, second drive piston 916, and pressure control valve 917 are freely movably supported inside the housing 911, the hyperbaric chamber $R_1$, decompression chamber $R_2$, and pressure chamber $R_3$ are provided. In addition, the hyperbaric port $P_1$ communicatively connected to the hyperbaric chamber $R_1$, the decompression port $P_2$ communicatively connected to the decompression chamber $R_2$, and the control pressure port $P_3$ communicatively connected to the pressure chamber $R_3$ are formed in the housing 911. The hyperbaric port $P_1$ is connected to an oil pressure pump 919 and an accumulator 920 as hyperbaric sources via the hyperbaric line $L_1$, the decompression port $P_2$ is connected to a reservoir tank 921 via the decompression line $L_2$, and the control pressure port $P_3$ is connected to an input side of a brake master cylinder 922 as a pressure supply unit via the control line $L_3$. The pressure sensor S is provided for the control line $L_3$.

Also, the first external pressure chamber $R_{51}$ is demarcated by the housing 911 and first drive piston 913 to form the first external pressure port $P_{51}$ communicatively connected to the first external pressure chamber $R_{51}$ by cutting through the housing 911. Then, the first external pressure line $L_{51}$ is connected to the first external pressure port $P_{51}$ and the first external pressure line $L_{51}$ bifurcates, with one bifurcated line $L_{511}$ connected to the oil pressure pump 919 and accumulator 920 via a normally closed electromagnetic valve 923 and another bifurcated line $L_{512}$ connected to the reservoir tank 921 via a normally open electromagnetic valve 924.

Also, the second external pressure chamber $R_{52}$ is demarcated by the housing 911 and second drive piston 916 to form the second external pressure port $P_{52}$ communicatively connected to the second external pressure chamber $R_{52}$ by cutting through the upper housing 911, and the second external pressure port $P_{52}$ is connected to an output port of the brake master cylinder 922 as an input unit (pressure control unit) via the second external pressure line $L_{52}$.

In this case, in the present embodiment, the first drive piston 913, intermediate piston 914, second drive piston 916, and pressure control valve 917 are relatively freely movably supported coaxially inside the housing 911, the first external pressure chamber $R_{51}$ is provided on the drive piston 913 side in the housing 911, and the second external pressure chamber $R_{52}$ is provided on the second drive piston 916 side in the housing 911.

Therefore, when the electromagnetic valves 923 and 924 are demagnetized, the bifurcated line $L_{511}$ is closed and the bifurcated line $L_{512}$ is opened and thus, no oil pressure is supplied to the first external pressure chamber $R_{51}$, the valve seat 913*b* of the first drive piston 913 is positioned by the return spring 915 separated from the ball 914*a*, and the pressure control valve 917 is positioned by energizing force of the return spring 918*b* with the ball 917*a* seated in the valve seat 916*b*. Therefore, the hyperbaric port $P_1$ and pressure port $P_3$ are blocked and the pressure port $P_3$ and the decompression port $P_2$ are communicatively connected.

If the electromagnetic valves 923 and 924 are energized in this state, the bifurcated line $L_{511}$ is opened and the bifurcated line $L_{512}$ is closed and thus, an oil pressure of the accumulator 920 is supplied to the first external pressure chamber $R_{51}$ via the first external pressure line $L_{51}$ and the first drive piston 913 moves upward against energizing force of the return spring 915. Then, when the first drive piston 913 moves upward, the valve seat 913*b* is seated in the ball 914*a* of the intermediate piston 914 to block the through hole 913*a* and thereafter, the pressing part 914*b* of the intermediate piston 914 moves up the pressure control valve 917 against energizing force of the return spring 918. Then, the ball 917*a* of the pressure control valve 917 is separated from the valve seat 916*b* to open the through hole 916*a*.

Therefore, the decompression chamber $R_3$ and the pressure chamber $R_3$ are blocked by the valve seat 913*b* of the first drive piston 913 being seated in the ball 914*a* of the intermediate piston 914, and the hyperbaric chamber $R_1$ and pressure chamber $R_3$ are communicatively connected by the ball 917*a* of the pressure control valve 917 being separated from the valve seat 916b of the second drive piston 916. Thus, an oil pressure of the accumulator 920 acts on the hyperbaric chamber $R_1$ through the hyperbaric port $P_1$, and a high-pressure hydraulic oil flows to the pressure chamber $R_3$ by passing through a gap between the ball 917a of the pressure control valve 917 and valve seat 916b before being supplied to the brake master cylinder 922 as a control pressure from the control pressure port $P_3$ through the control line $L_3$.

Also, if a power supply system or control system connected to the electromagnetic valve 923 or 924 is defective, the second drive piston 916 moves downward together with the pressure control valve 917 by outputting a high-pressure hydraulic oil from the brake master cylinder 922 to the second external pressure line $L_{52}$ before being supplied from the second external pressure port $P_{52}$ to the second external pressure chamber $R_{52}$. Then, the second drive piston 916 and pressure control valve 917 move downward against energizing force of the return spring 918 while pressing against the intermediate piston 914, the ball 914a of the intermediate piston 914 is seated in the valve seat 913b of the first drive piston 913 to block the through hole 913a and, the pressing part 914b of the intermediate piston 914 presses against the ball 917a against energizing force of the return spring 918 to separate the ball 917a from the valve seat 916b to open the through hole 916a.

Therefore, like the foregoing, while the decompression port $P_2$ and the pressure port $P_3$ are blocked, the hyperbaric port $P_1$ and the pressure port $P_3$ are communicatively connected, an oil pressure of the accumulator 920 acts on the hyperbaric chamber $R_1$ through the hyperbaric port $P_1$, a high-pressure hydraulic oil flows to the pressure chamber $R_3$ by passing a gap between the ball 917a of the pressure control valve 917 and valve seat 916b before being supplied to the brake master cylinder 922 as a control pressure from the control pressure port $P_3$ through the control line $L_3$. Thus, even if a power supply system or control system is defective, pressure control can properly be performed.

In a pressure controller in the fourteenth embodiment as described above, the first drive piston 913, intermediate piston 914, second drive piston 916, and pressure control valve 917 are relatively freely movably supported in the axial center direction in the housing 911, the pressure chamber $R_3$ and decompression chamber $R_2$ are supported by being energized so as to make them communicatively connectible, and the first drive piston 913 is moved by opening/closing the electromagnetic valves 923 and 924 to move the intermediate piston 914 and pressure control valve 917 to make the hyperbaric port $P_1$ and the control pressure port $P_3$ communicatively connectible. Also, the hyperbaric port $P_1$ and the pressure port $P_3$ are made communicatively connectible by moving the second drive piston 916 by means of an oil pressure of the brake master cylinder 922 to move the intermediate piston 914 and pressure control valve 917.

Therefore, even when a power supply system or control system is defective, by supplying an oil pressure of the brake master cylinder 922 to the second external pressure chamber $R_{52}$ and moving the second drive piston 916, each passage is opened and blocked so that a hydraulic oil of the hyperbaric port $P_1$ can reliably be supplied to the control pressure port $P_3$ before being supplied to the brake master cylinder 922 as a control pressure. As a result, pressure control can properly be performed without using a switching mechanism or the like separately.

Fifteenth Embodiment

Figure 16:
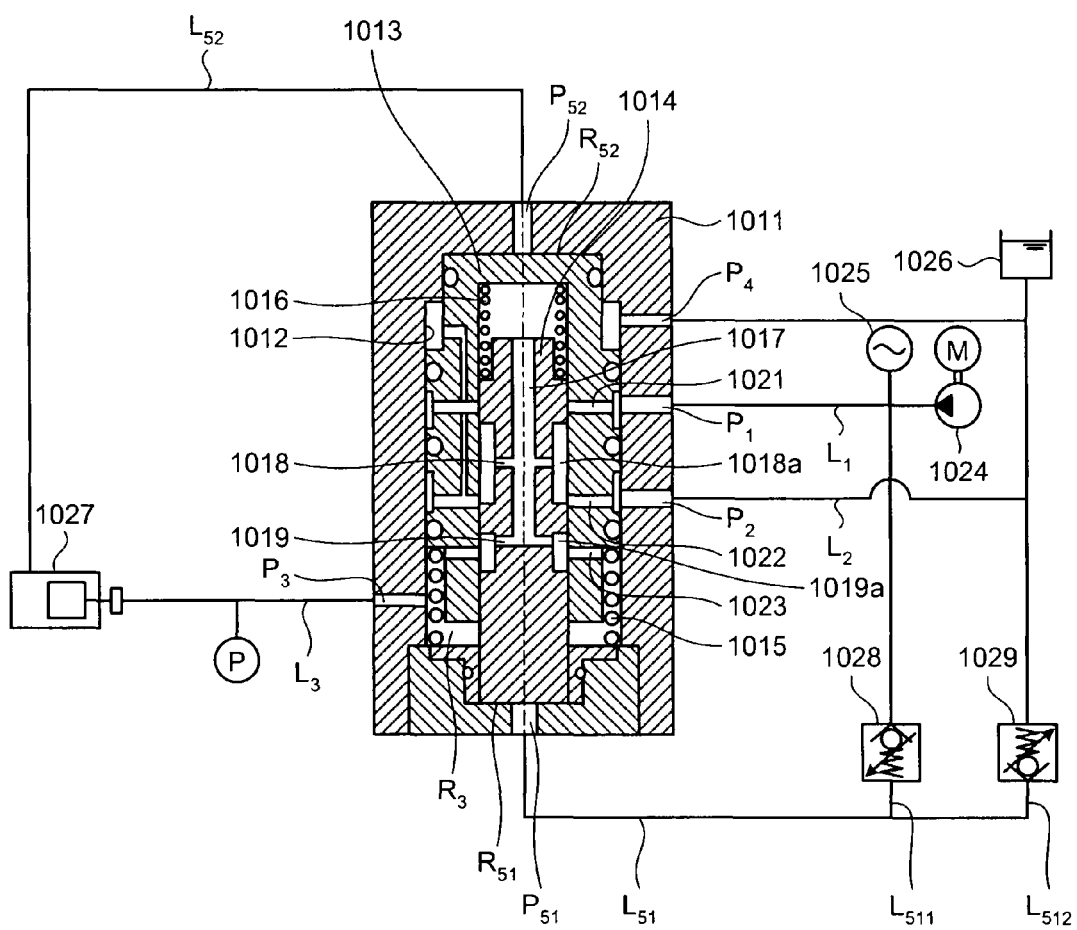
FIG. 16 is a schematic block diagram showing a pressure controller according to a fifteenth embodiment of the present invention.

FIG. 16 is a schematic block diagram showing a pressure controller according to a fifteenth embodiment of the present invention.

In a spool type three-way valve as a pressure controller in the fifteenth embodiment, as shown in FIG. 16, a second drive piston 1013 in a cylindrical shape is freely movably supported by a bearing hole 1012 of a housing 1011 and a first drive piston 1014 in a cylindrical shape is freely movably supported inside the second drive piston 1013. The second drive piston 1013 is supported by being energized upward by energizing force of a return spring (energizing unit) 1015 and the first drive piston 1014 is supported by being energized downward by energizing force of a return spring (energizing unit) 1016.

The pressure chamber $R_3$ demarcated by the second drive piston 1013 and first drive piston 1014 is provided in the housing 1011. The first drive piston 1014 has a communicating hole 1017 formed along the axial direction and also two communicating holes 1018 and 1019 communicatively connected to the communicating hole 1017 along the diameter direction. In addition, the first drive piston 1014 has connection ports 1018a and 1019a communicatively connected to the communicating holes 1018 and 1019 respectively in the outer circumference thereof along the circumferential direction.

Moreover, the hyperbaric port $P_1$ cutting through the housing 1011 from the outside to the bearing hole 1012, the decompression port $P_2$, and the control pressure port $P_3$ are formed. Further, the second drive piston 1013 has three connection holes 1021, 1022, and 1023 cutting through from inside to outside. The hyperbaric port $P_1$ is communicatively connectible to the connection port 1018a via the connection hole 1021, the decompression port $P_2$ is communicatively connectible to the connection port 1018a via the connection hole 1022, the control pressure port $P_3$ is communicatively connected to the pressure chamber $R_3$, and the pressure chamber $R_3$ is communicatively connected to the connection port 1019a via the connection hole 1023.

Then, the hyperbaric port $P_1$ is connected to an oil pressure pump 1024 and an accumulator 1025 as hyperbaric sources via the hyperbaric line $L_1$, the decompression port $P_2$ is connected to a reservoir tank 1026 via the decompression line $L_2$, and the control pressure port $P_3$ is connected to an input side of a brake master cylinder 1027 as a pressure supply unit via the control line $L_3$.

Also, the first external pressure chamber $R_{51}$ is demarcated by the housing 1011 and first drive piston 1014 to form the first external pressure port $P_{51}$ by cutting through the upper housing 1011. Then, the first external pressure line $L_{51}$ is connected to the first external pressure port $P_{51}$ and the first external pressure line $L_{51}$ bifurcates, with one bifurcated line $L_{511}$ connected to the oil pressure pump 1024 and accumulator 1025 via a normally closed electromagnetic valve 1028 and another bifurcated line $L_{512}$ connected to the reservoir tank 1026 via a normally open electromagnetic valve 1029.

Also, the second external pressure chamber $R_{52}$ is demarcated by the housing 1011 and second drive piston 1013 to form the second external pressure port $P_{52}$ by cutting through the upper housing 1011. The second external pressure port $P_{52}$ is connected to an output port of the brake master cylinder 1027 as an input unit (pressure control unit) via the second external pressure line $L_{52}$.

Therefore, when the electromagnetic valves 1028 and 1029 are demagnetized, the bifurcated line $L_{511}$ is closed and the bifurcated line $L_{512}$ is opened and thus, no oil pressure is supplied to the first external pressure chamber $R_{51}$, the first drive piston 1014 is supported by being energized by the return spring 1016, and the communicating hole 1017 is communicatively connected to the pressure chamber $R_3$ and also to the decompression port $P_2$. Therefore, while the decompression port $P_2$ and the control pressure port $P_3$ are communicatively connected by the pressure chamber $R_3$ and communicating hole 1017, the hyperbaric port $P_1$ and control pressure port $P_3$ are blocked.

If the electromagnetic valves 1028 and 1029 are energized in this state, the bifurcated line $L_{511}$ is opened and the bifurcated line $L_{512}$ is closed and thus, an oil pressure of the accumulator 1025 is supplied to the first external pressure chamber $R_{51}$ via the first external pressure line $L_{51}$ and the first drive piston 1014 moves upward against energizing force of the return spring 1016. Then, when the first drive piston 1014 moves upward, the communicating hole 1017 is communicatively connected after being switched from the decompression port $P_2$ to the hyperbaric port $P_1$ by the communicating hole 1017 being cut off from the connection hole 1022 and communicatively connected to the connection hole 1021 while the communicating hole 1017 remains communicatively connected to the pressure chamber $R_3$. Thus, while the hyperbaric port $P_1$ and control pressure port $P_3$ are communicatively connected by the pressure chamber $R_3$ and communicating hole 1017, the decompression port $P_2$ and control pressure port $P_3$ are blocked.

Therefore, after flowing through the hyperbaric port $P_1$, an oil pressure of the accumulator 1025 flows from the connection hole 1017 to the communicating hole 1017 by passing through the connection port 1018a and communicating hole 1018 and then from the communicating hole 1017 to the pressure chamber $R_3$ before being supplied to the brake master cylinder 1027 as a control pressure from the control pressure port $P_3$ through the control line $L_3$.

Also, if a power supply system or control system connected to the electromagnetic valve 1028 or 1029 is defective, a high-pressure hydraulic oil from the brake master cylinder 1027 is output to the second external pressure line $L_{52}$ before being supplied to the second external pressure chamber $R_{52}$ from the second external pressure port $P_{52}$ to move the second drive piston 1013 downward. Then, as described above, the communicating hole 1017 of the first drive piston 1014 is switched from the decompression port $P_2$ to the hyperbaric port $P_1$ while the communicating hole 1017 remains communicatively connected to the pressure chamber $R_3$.

Therefore, after flowing through the hyperbaric port $P_1$, an oil pressure of the accumulator 1025 flows from the connection hole 1017 to the communicating hole 1017 by passing through the connection port 1018a and communicating hole 1018 and then from the communicating hole 1017 to the pressure chamber $R_3$ before being supplied to the brake master cylinder 1027 as a control pressure from the control pressure port $P_3$ through the control line $L_3$. Thus, even if a power supply system or control system is defective, pressure control can properly be performed.

In a pressure controller in the fifteenth embodiment as described above, the first drive piston 1014 and second drive piston 1013 are relatively freely movably supported in the axial center direction in the housing 10111, the pressure chamber $R_3$ and decompression chamber $R_2$ are supported by being energized so as to make them communicatively connectible, and the first drive piston 1014 is moved by opening/closing the electromagnetic valves 1028 and 1029 to make the hyperbaric port $P_1$ and the control pressure port $P_3$ communicatively connectible. Also, the hyperbaric port $P_1$ and pressure port $P_3$ are made communicatively connectible by moving the second drive piston 1013 by means of an oil pressure of the brake master cylinder 1027.

Therefore, even when a power supply system or control system is defective, by supplying an oil pressure of the brake master cylinder 1027 to the second external pressure chamber $R_{52}$ and moving the second drive piston 1013, each passage is opened and blocked so that a hydraulic oil of the hyperbaric port $P_1$ can reliably be supplied to the control pressure port $P_3$ before being supplied to the brake master cylinder 1027 as a control pressure. As a result, pressure control can properly be performed without using a switching mechanism or the like separately.

In each of the above embodiments, a pressure controller of the present invention has been applied to a poppet type or spool type three-way valve, but applying a pressure controller of the present invention to a two-way valve also provides operation effects similar to those described above.

INDUSTRIAL APPLICABILITY

As described above, a pressure controller according to the present invention enables proper pressure control by readily moving a drive valve using a pressure from outside even when a power supply is defective and can suitably be used in any type of pressure controller.

The invention claimed is:

1. A pressure controller comprising:
a housing in a hollow shape having a plurality of ports;
a drive valve freely movably supported in the housing;
an energizing unit communicatively connecting or blocking the plurality of ports by energizing the drive valve in a direction in which the drive valve is caused to approach a valve seat or separate from the valve seat;
a solenoid controlling a differential pressure by communicatively connecting or blocking the plurality of ports with a movement of the drive valve by means of an electromagnetic force against an energizing force of the energizing unit;
an external piston capable of pressing the drive valve against the energizing force of the energizing unit from outside the housing; and
a pressure control unit performing pressure control so that a control pressure acting on the external piston from a side of the drive valve is equal to or greater than an external pressure acting from outside, wherein
the drive valve includes an axial communicating path that communicates the control pressure acting on the external piston from the side of the drive valve.

2. The pressure controller according to claim 1, wherein the pressure control unit performs pressure control so that the control pressure acting on the external piston from the side of the drive valve is equivalent to the external pressure acting on the external piston from outside.

3. The pressure controller according to claim 1, wherein the plurality of ports include a hyperbaric port, a decompression port, and a control pressure port,
a pressure control valve positioned in front of the direction of movement of a least one of the drive valve and a first piston in the housing is freely movably supported by being energized in the direction blocking the hyperbaric port and the control pressure port, and at least one of the drive valve and the first piston is moved by an electromagnetic force of the solenoid to press against the pressure control valve to block the decompression port and the control pressure port and to make the hyperbaric port and the control pressure port communicatively connectible, at least one of the drive valve and the first piston is moved by a reduced electromagnetic force of the solenoid to reduce a pressing force of the pressure control valve to communicatively connect the decompression port and the control pressure port and to make the hyperbaric port and the control pressure port blockable, and at least one of the drive valve and the first piston is moved by the external piston to press against the pressure control valve to block the decompression port and the control pressure port and to make the hyperbaric port and the control pressure port communicatively connectible.

4. The pressure controller according to claim 1, wherein
the drive valve includes a first piston in an annular shape freely movable along an inner surface of the housing and movable by the solenoid and a piston freely movable relative to the first piston along the inner surface of the first piston, and
a redoubling unit that redoubles a driving force of the drive valve is provided between the first piston and the second piston.

5. The pressure controller according to claim 4, further comprising
a front pressure chamber and a rear pressure chamber provided in front and in rear of the direction of movement of the second piston, wherein
the front pressure chamber and the rear pressure chamber are communicatively connected by the communicating path, and a control pressure acts on the rear pressure chamber.

6. The pressure controller comprising:
a housing in a hallow shape having a first port and a second port;
a drive valve freely movably supported in the housing;
an energizing unit communicatively connecting or blocking the first port and the second port by energizing the drive valve in a direction in which the drive valve is caused to approach a valve seat or separate from the valve seat;
a solenoid controlling a differential pressure by communicatively connecting or blocking the first port and the second port with a movement of the drive valve by means of an electromagnetic force against an energizing force of the energizing unit;
an external piston capable of pressing the drive valve against the energizing force of the energizing unit from outside the housing; and
a pressure control unit performing pressure control so that a control pressure acting on the external piston from a side of the drive valve is equal to or greater than an external pressure acting from outside, wherein
the drive valve includes a first piston in an annular shape freely movable along an inner surface of the housing and movable by the solenoid and a second piston freely movable relative to the first piston along the inner surface of the piston, and
a redoubling unit that redoubles a driving force of the drive valve is provided between the first piston and the second piston.

7. The pressure controller according to claim 6, further comprising
a front pressure chamber and a rear pressure chamber provided in front and in rear of the direction of movement of the second piston, wherein
the front pressure chamber and the rear pressure chamber are communicatively connected by a communicating path formed inside the first piston, and a control pressure acts on the rear pressure chamber.

* * * * *